(12) United States Patent
Takasawa et al.

(10) Patent No.: US 8,321,880 B2
(45) Date of Patent: Nov. 27, 2012

(54) DISC CHANGER

(75) Inventors: Takeharu Takasawa, Kanagawa (JP);
Takeshi Kubo, Kanagawa (JP);
Naofumi Goto, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/112,044

(22) Filed: May 20, 2011

(65) Prior Publication Data
US 2011/0296446 A1 Dec. 1, 2011

(30) Foreign Application Priority Data

May 28, 2010 (JP) .................... 2010-123334
Nov. 11, 2010 (JP) .................... 2010-253067

(51) Int. Cl.
*G11B 17/04* (2006.01)
*G11B 23/03* (2006.01)
(52) U.S. Cl. ............. 720/615; 369/30.83; 369/30.53
(58) Field of Classification Search ............. 369/30.4, 369/30.42, 30.53, 30.65, 30.66, 30.68, 30.69, 369/30.77, 30.78, 30.83, 30.84, 30.96; 720/728, 720/740, 614, 615, 735
See application file for complete search history.

(56) References Cited

U.S. PATENT DOCUMENTS

| | | | | |
|---|---|---|---|---|
| 5,532,985 A * | 7/1996 | Nakamichi | ............... | 369/30.32 |
| 5,561,657 A * | 10/1996 | Ogawa | ............... | 369/179 |
| 5,682,364 A * | 10/1997 | Ogawa | ............... | 369/30.81 |
| 6,122,244 A * | 9/2000 | Kikuchi | ............... | 369/30.84 |
| 6,178,152 B1 * | 1/2001 | Becker et al. | ............... | 369/30.83 |
| 6,341,119 B1 * | 1/2002 | Ezawa et al. | ............... | 369/30.83 |
| 6,430,147 B1 * | 8/2002 | Goto et al. | ............... | 720/720 |
| 7,227,816 B2 * | 6/2007 | Weisser et al. | ............... | 369/30.77 |
| 7,698,717 B2 | 4/2010 | Asakura et al. | | |
| 2004/0027933 A1 * | 2/2004 | Togashi et al. | ............... | 369/30.77 |
| 2007/0201320 A1 * | 8/2007 | Suzuki et al. | ............... | 369/30.78 |
| 2007/0211581 A1 * | 9/2007 | Yoshida et al. | ............... | 369/30.85 |
| 2010/0172221 A1 * | 7/2010 | Osada | ............... | 369/30.85 |

FOREIGN PATENT DOCUMENTS

JP 2007-052849 A 3/2007

* cited by examiner

*Primary Examiner* — Brian Miller
(74) *Attorney, Agent, or Firm* — Wolf, Greenfield & Sacks, P.C.

(57) ABSTRACT

A disc changer includes a disc cartridge having an insertion hole, a case body into which the disc cartridge is inserted, having first and second shells which can be separated in which a plurality of disc-shaped recording media are storable by being arrayed in the axial direction of the center axis, and a lock lever for locking the shells in a connected state; and a disc holder to hold the inserted disc cartridge, including an unlocking piece which unlocks locking between the shells by being inserted into the insertion hole when the disc cartridge is inserted into the disc holder to press the lock lever, and a restricting lever supported by the unlocking piece, including a restricting portion engaged with the case body when the unlocking piece is inserted into the insertion hole, so that locking between the shells is unlocked, the restricting lever restricting movement in the extracting direction.

8 Claims, 43 Drawing Sheets

DISC CHANGER

BACKGROUND OF THE INVENTION

1. Field of the Invention

The present invention relates to a technical field regarding disc changers, and more specifically relates to a technical field wherein there is provided a restricting lever for restricting movement of a disc cartridge when locking between a first shell and a second shell of a disc cartridge is unlocked, thereby securing a suitable holding state of the disc cartridge by a disc holder.

2. Description of the Related Art

There is a disc charger wherein multiple disc-shaped recording media are storable within a disc cartridge by being arrayed in the axial direction of the center axis, a desired disc-shaped recording medium is ejected from the disc cartridge, whereby recording or playback of information signals as to this disc-shaped recording medium can be performed at a drive unit.

Of disc cartridges used for such a disc changer, there is a disc cartridge wherein a part of the case body is openable or separable, and a locking lever for locking the case body in a closed state or connected state is disposed in the case body (e.g., see Japanese Unexamined Patent Application Publication No. 2007-52849).

A disc holder for holding a disc cartridge to be inserted is disposed in the disc changer, and an unlocking piece for unlocking locking of the case body is provided to the disc holder. Accordingly, locking of the case body by the locking lever is unlocked by the unlocking piece when the disc cartridge is inserted into the disc holder, whereby the case body can proceed to an opened state or separated state.

SUMMARY OF THE INVENTION

However, with the disc changer described in Japanese Unexamined Patent Application Publication No. 2007-52849, in a state in which the disc cartridge is inserted into the disc holder, the disc cartridge is movable in the extracting direction where the disc cartridge is pulled out from the disc holder. Accordingly, in a state in which locking of the case body is unlocked, the disc cartridge may move in the extracting direction. For example, due to application of external force as to the disc cartridge, occurrence of vibrations, a user's intention, or the like, the disc cartridge may move in the extracting direction by a predetermined stroke as to a state in which the disc cartridge is inserted into the disc holder.

In the event that such movement of the disc cartridge in the extracting direction occurs, the holding state of the disc cartridge as to the disc holder may become unstable, or the case body may proceed to a locked state, and accordingly, suitable holding state of the disc cartridge as to the disc holder fails to be secured.

It has been found desirable to secure a suitable holding state of the disc cartridge by the disc holder when the disc cartridge is inserted into the disc holder and locking is unlocked.

A disc changer according to an embodiment of the present invention includes: a disc cartridge, in which an insertion hole for unlocking is formed, a case body, into which the disc cartridge is inserted, the case body having a first shell and a second shell which can be separated in the axial direction in which a plurality of disc-shaped recording media are storable by being arrayed in the axial direction of the center axis, and a lock lever for locking the first shell and the second shell in a connected state; and a disc holder configured to hold the inserted disc cartridge, including an unlocking piece which unlocks locking between the first shell and the second shell by being inserted into the insertion hole when the disc cartridge is inserted into the disc holder to press the lock lever, and a restricting lever supported by the unlocking piece, including a restricting portion which is engaged with the case body when the unlocking piece is inserted into the insertion hole, so that locking between the first shell and the second shell is unlocked, the restricting lever restricting movement in the extracting direction opposite to an insertion direction of the disc cartridge as to the disc holder.

Accordingly, with the disc changer, movement of the disc cartridge in the extracting direction as to the disc holder is restricted by the restricting lever when locking between the first shell and the second shell is unlocked by the unlocking piece.

The restricting lever may be movable as to the unlocking piece in an operating direction orthogonal to the axial direction and also orthogonal to the insertion direction; with the restricting lever being pressed to one direction in the operating direction by a spring; the restricting portion of the restricting lever being engaged with the case body to restrict movement of the disc cartridge; and a slanting edge being formed on the restricting portion of the restricting lever, which slidably comes into contact with the case body when movement force in the extracting direction is applied to the disc cartridge in a state in which the restricting lever is inserted into the insertion hole, to allow movement in the extracting direction of the disc cartridge.

The slanting edge which slidably comes into contact with the case body when movement force in the extracting direction is applied to the disc cartridge, and allows movement of the disc cartridge in the extracting direction, is formed, whereby the slanting edge slidably comes into contact with the case body, and restriction of movement in the extracting direction by the restricting lever as to the disc holder is released.

There may be provided a releasing lever configured to release restriction as to the disc cartridge by the restricting lever when the disc cartridge is moved in the extracting direction as to the disc holder.

The releasing lever for releasing restriction as to the disc cartridge by the restricting lever when the disc cartridge is moved in the extracting direction as to the disc holder, is provided, whereby engagement of the restricting portion of the releasing lever as to the case body is released when the disc cartridge moves in the extracting direction.

There may be provided a pressure lever configured to press the disc cartridge in the extracting direction when restriction as to the disc cartridge by the restricting lever is released by the releasing lever.

There is provided the pressure lever for pressing the disc cartridge in the extracting direction when restriction as to the disc cartridge is released, thereby preventing movement of the disc cartridge in the extracting direction from interference by the restricting lever.

The unlocking piece and the restricting lever may be configured so as to be inserted into the insertion hole of the case body.

The unlocking piece and the restricting lever are inserted into the insertion hole of the case body, whereby unlocking of the case body, and holding by the restricting lever of the disc cartridge are performed at the same time.

The unlocking piece and the restricting lever may both be formed in a plate shape, and both may be disposed in a state in contact in the thickness direction.

The unlocking piece and the restricting lever are both formed in a plate shape, and both are disposed in a state in contact in the thickness direction, thereby reducing the disc changer in thickness.

A rotatable roller may be provided to the disc holder, so as to come in contact with the outer face of the disc cartridge inserted into the disc holder; with the roller being rotated in a state in which the outer face of the disc cartridge is apart from the inner face of the disc holder, thereby moving the disc cartridge in the insertion direction or the extracting direction.

The roller is rotated in a state in which the outer surface of the disc cartridge is apart from the inner surface of the disc holder, and the disc cartridge is moved in the insertion direction or extracting direction, whereby the roller is rotated in a state in which the disc cartridge is not in contact with the disc holder at the time of movement of the disc cartridge.

A spring may be provided to a face facing a face where the roller in the disc holder is provided, which presses the disc cartridge against the roller.

The spring which presses the disc cartridge against the roller is provided to a surface facing a surface where the roller in the disc holder is provided, whereby the disc cartridge is moved in a state pressed by the spring.

A disc changer according to an embodiment of the present invention includes: a disc cartridge, in which an insertion hole for unlocking is formed, a case body, into which the disc cartridge is inserted, the case body having a first shell and a second shell which can be separated in the axial direction in which a plurality of disc-shaped recording media are storable by being arrayed in the axial direction of the center axis, and a lock lever for locking the first shell and the second shell in a connected state; and a disc holder configured to hold the inserted disc cartridge, including an unlocking piece which unlocks locking between the first shell and the second shell by being inserted into the insertion hole when the disc cartridge is inserted into the disc holder to press the lock lever, and a restricting lever supported by the unlocking piece, including a restricting portion which is engaged with the case body when the unlocking piece is inserted into the insertion hole, so that locking between the first shell and the second shell is unlocked, the restricting lever restricting movement in the extracting direction opposite to an insertion direction of the disc cartridge as to the disc holder.

Accordingly, the disc cartridge is prevented from moving in the extracting direction in an unlocked state, and is prevented from proceeding to an unintentionally locked state, whereby the suitable holding state of the disc cartridge by the disc holder can be secured.

The restricting lever may be movable as to the unlocking piece in an operating direction orthogonal to the axial direction and also orthogonal to the insertion direction; with the restricting lever being pressed to one direction in the operating direction by a spring; the restricting portion of the restricting lever being engaged with the case body to restrict movement of the disc cartridge; and a slanting edge being formed on the restricting portion of the restricting lever, which slidably comes into contact with the case body when movement force in the extracting direction is applied to the disc cartridge in a state in which the restricting lever is inserted into the insertion hole, to allow movement in the extracting direction of the disc cartridge.

Accordingly, significant load is not applied to the disc cartridge and the disc changer when significant movement force in the extracting direction is applied to the disc cartridge, whereby damage to the disc cartridge and the disc changer can be prevented.

There may be provided a releasing lever configured to release restriction as to the disc cartridge by the restricting lever when the disc cartridge is moved in the extracting direction as to the disc holder.

Accordingly, pullout of the disc cartridge from the disc holder can be performed in a smooth and sure manner.

There may be provided a pressure lever configured to press the disc cartridge in the extracting direction when restriction as to the disc cartridge by the restricting lever is released by the releasing lever.

Accordingly, the disc cartridge can be pulled out from the disc holder without interference by the restricting lever, and pullout of the disc cartridge from the disc holder can be performed in a smooth and sure manner.

The unlocking piece and the restricting lever may configured so as to be inserted into the insertion hole of the case body.

Accordingly, unlocking of the case body, and holding of the disc cartridge by the restricting lever are performed at the same time, whereby improvement in operating reliability, and speed-up of operation can be realized.

The unlocking piece and the restricting lever may both be formed in a plate shape, with both being disposed in a state in contact in the thickness direction.

Accordingly, reduction in the size of the disc cartridge can be realized, and also entry of moisture and dust from the insertion hole can be suppressed.

A rotatable roller may be provided to the disc holder, so as to come into contact with the outer face of the disc cartridge inserted into the disc holder; with the roller being rotated in a state in which the outer face of the disc cartridge is apart from the inner face of the disc holder, thereby moving the disc cartridge in the insertion direction or the extracting direction.

Accordingly, the disc cartridge can be moved in the insertion direction and extracting direction as to the disc holder in a smooth manner.

A spring may be provided to a face facing a face where the roller in the disc holder is provided, which presses the disc cartridge against the roller.

Accordingly, the disc cartridge can be in contact with the roller in a sure manner, and stability of the movement state of the disc cartridge can be realized.

DESCRIPTION OF THE PREFERRED EMBODIMENTS

Figure 1:
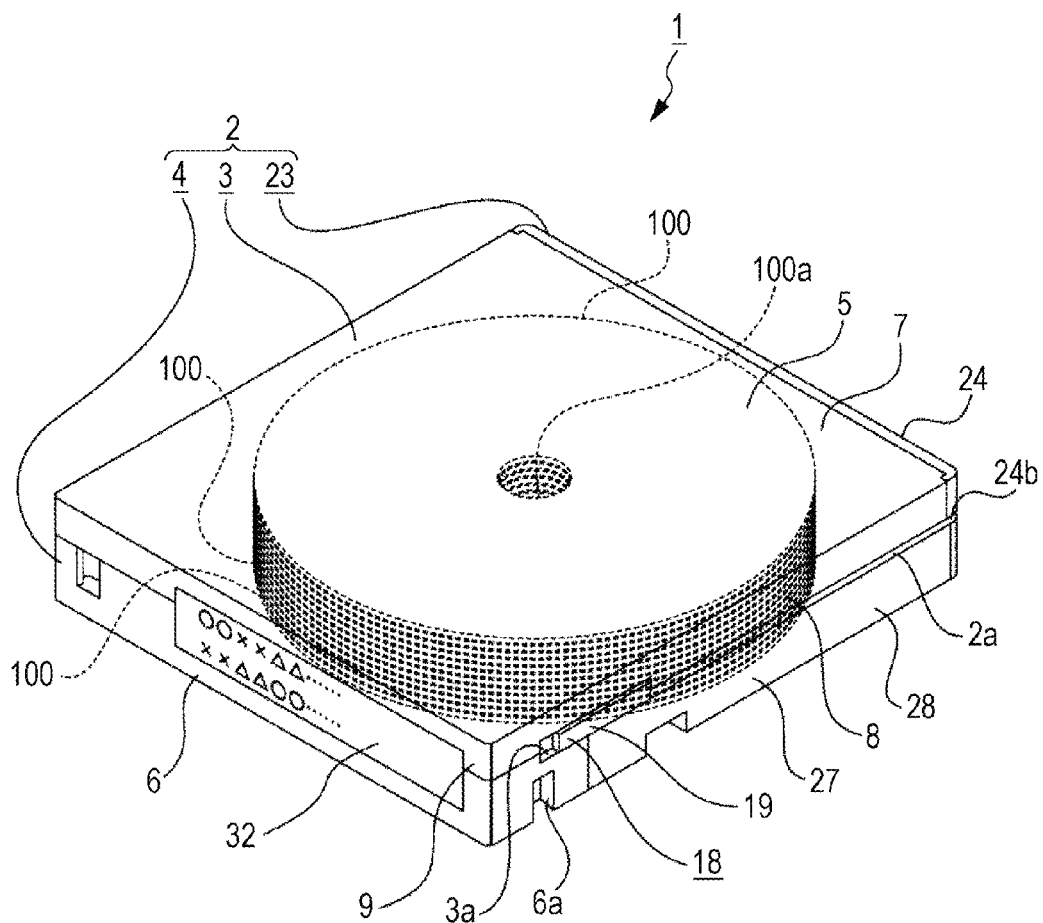
FIG. 1 illustrates an embodiment of a disc changer according to the present invention along with FIGS. 2 through 43, and is a perspective view of a disc cartridge used for the disc changer.

Now, embodiments of a disc changer according to the present invention will be described in accordance with appended drawings.

With the following description, directions of front, back, up, down, left, and right are illustrated with a direction where a disc cartridge is inserted into a cartridge insertion/detachment opening of the disc changer, as the front.

Note that directions of front, back, up, down, left, and right illustrated below are for convenience of description, and embodiments of the present invention are not restricted to these directions.

Overall Configuration of Disc Cartridge

First, the configuration of a disc cartridge used for the disc changer will be described (see FIGS. 1 through 8).

A disc cartridge 1 is configured so that the components are disposed within a case body 2, and the case body 2 has a first shell 3 and a second shell 4. Multiple disc-shaped recording media 100 are storable with an equal interval in the vertical direction.

Figure 2:
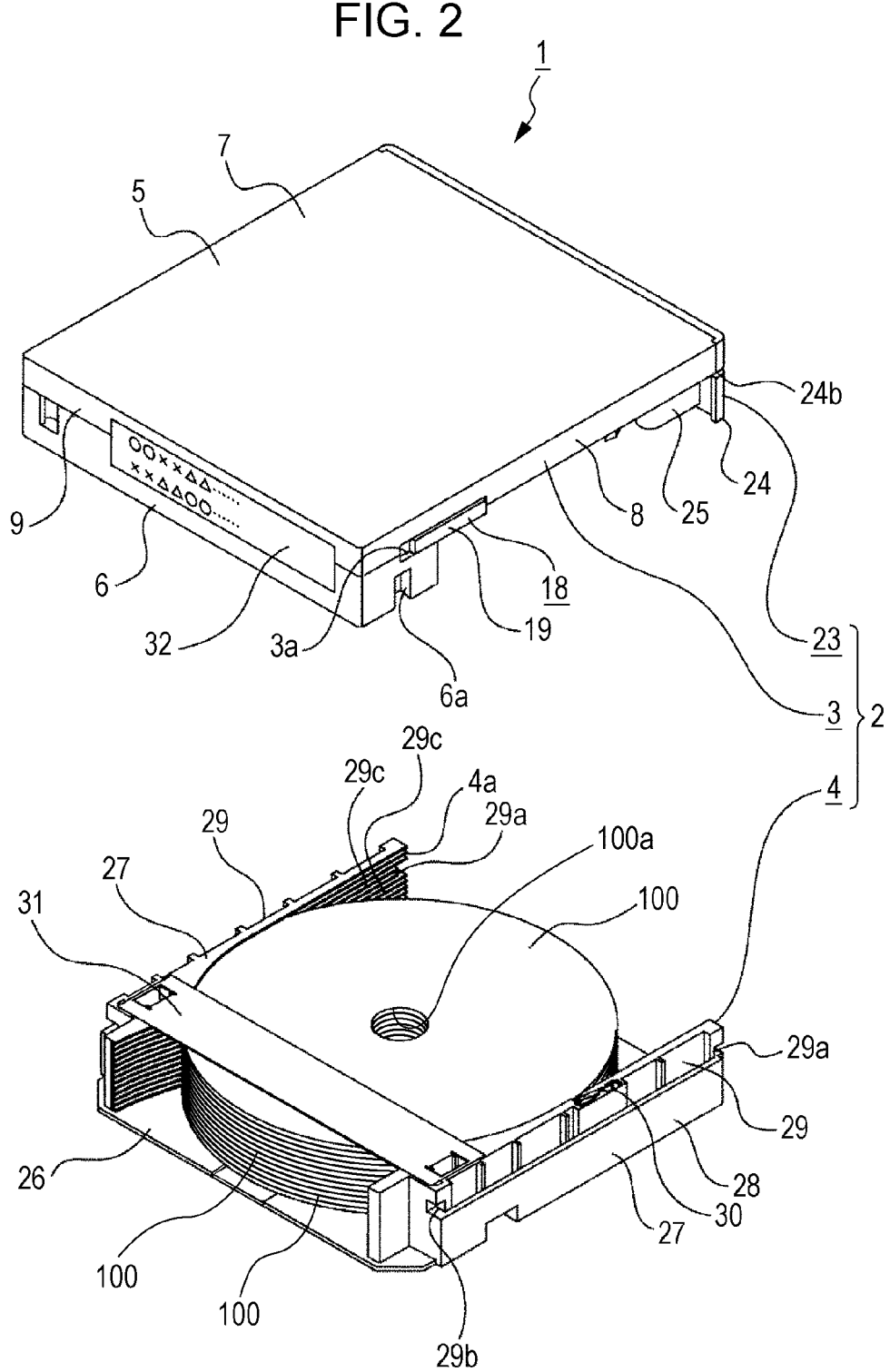
FIG. 2 is a perspective view of the disc cartridge, which illustrates a separated state between a first shell and a second shell.
Figure 3:
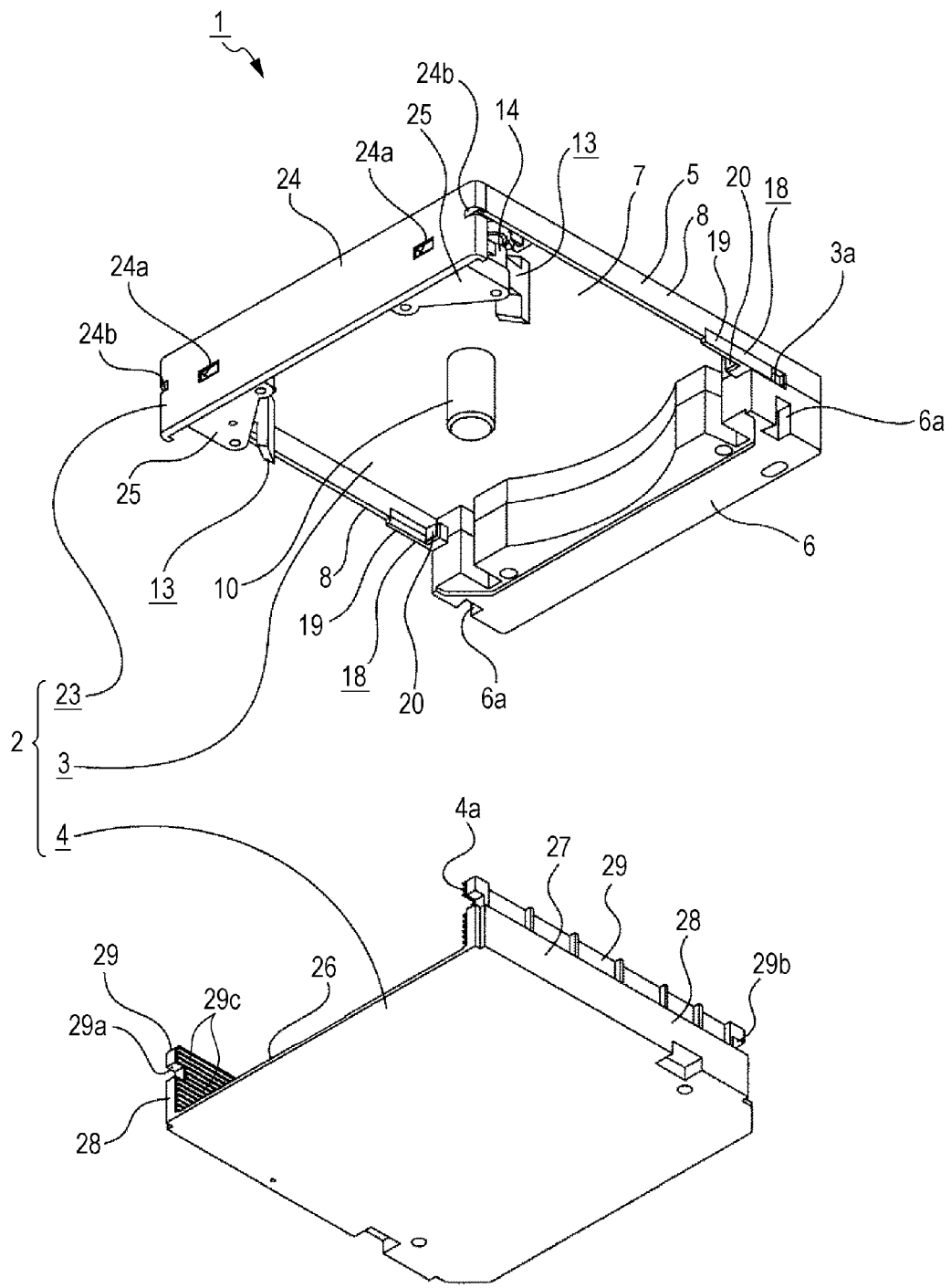
FIG. 3 is a perspective view of the disc cartridge, which illustrates a separated state between the first shell and the second shell in a state viewed from a different direction from FIG. 2.

The first shell 3 and the second shell 4 are configured so as to be connected or separated in the vertical direction, for example (see FIGS. 1 through 3). Note that, in the event that the case body 2 is configured in a vertically long shape, the first shell 3 and the second shell 4 are connected or separated in the horizontal direction.

The first shell 3 is formed of a resin material, and is configured by a base member 5 and an auxiliary base 6 attached to the rear edge portion of the base member 5 being connected in the vertical direction.

Figure 4:
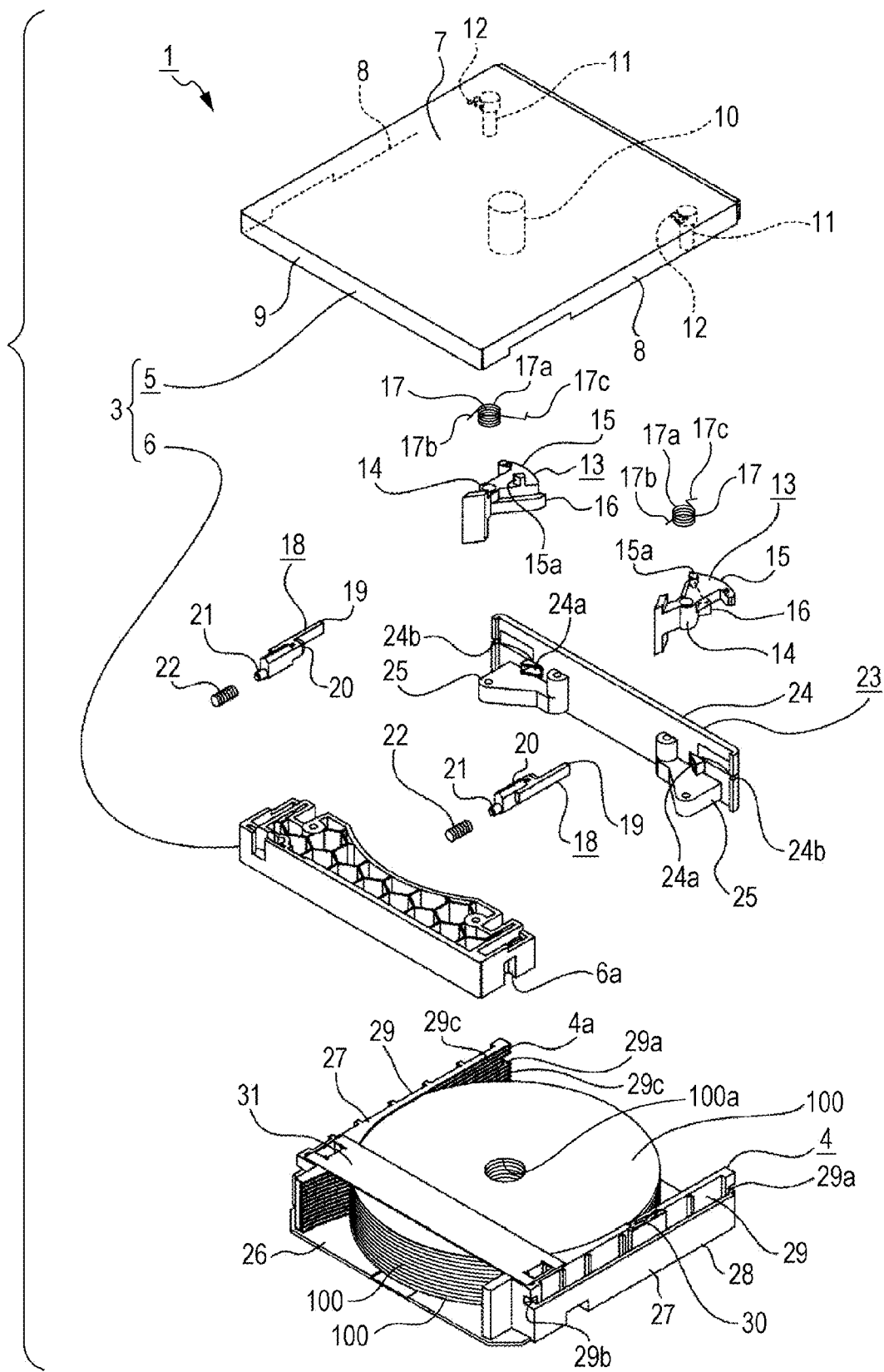
FIG. 4 is an exploded perspective view of the disc cartridge.
Figure 5:
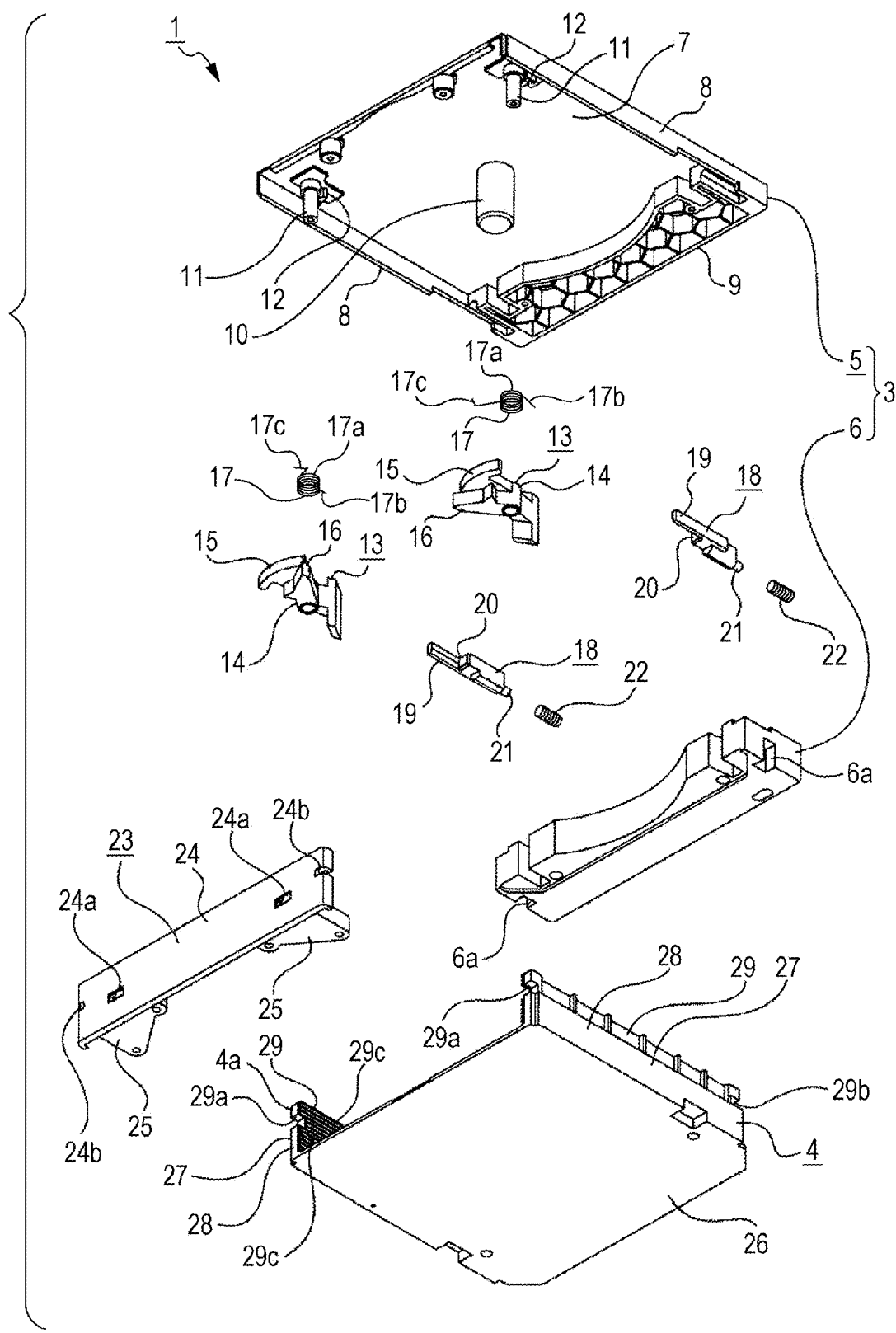
FIG. 5 is an exploded perspective view of the disc cartridge illustrated in a state viewed from a different direction from FIG. 4.

The base member 5 includes, as illustrated in FIGS. 4 and 5, a base face portion 7 facing the vertical direction, side face portions 8 each protruding downward from both side edge portions of this base face portion 7, and a rear face portion 9 protruding downward from the rear edge portion of the base face portion 7.

A cylindrical shaft-shaped center pin 10 protruding downward is provided to the central portion of the base face portion 7.

Support shafts 11 protruding downward are provided to front edge-sided portions of the base face portion 7 in a horizontally separated manner. Spring hook protrusions 12 are provided to nearby positions of the support shafts 11 in the lower face of the base face portion 7, respectively.

Groove-shaped grippers 6a opened sideward and downward are formed on the lower edge portions of the both side edge portions of the auxiliary base 6, respectively.

Slider support portions 3a are formed in the rear edge-sided positions of the both side face portions of the first shell 3, respectively (see FIGS. 1 through 3).

Locking levers 13 are supported by the support shafts 11 of the first shell 3 so as to freely turn (see FIGS. 3 through 5).

Figure 6:
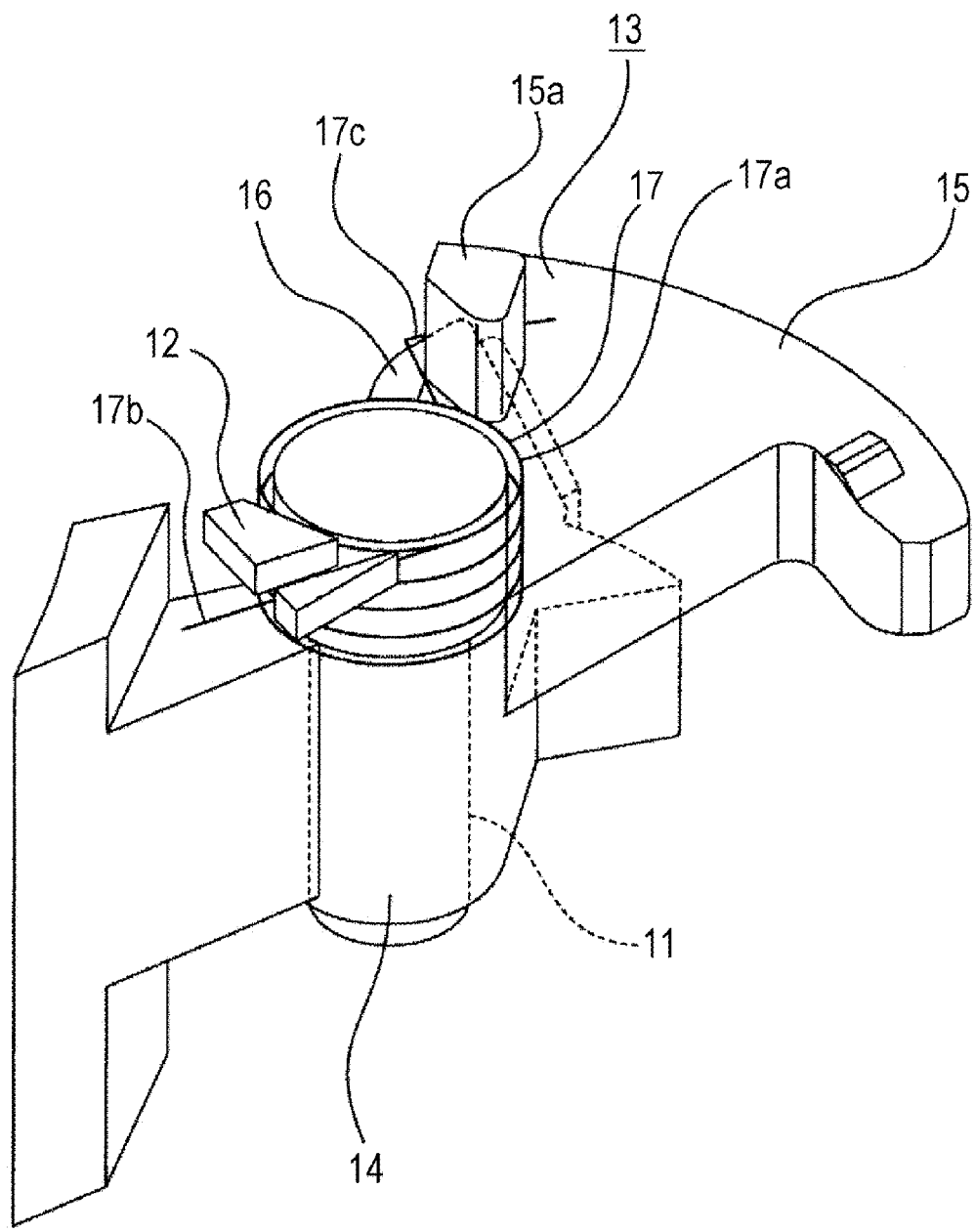
FIG. 6 is an enlarged perspective view illustrating a locking lever supported by a support shaft along with a pressing spring.

The locking levers 13 include, as illustrated in FIGS. 4 through 6, a cylindrical-shaped supported portion 14 supported by the support shaft 11 being inserted thereinto, a locking portion 15 protruding generally forward from a generally upper half portion of the supported portion 14, and an unlocking portion 16 protruding obliquely forward from a generally lower half portion of the supported portion 14.

The locking portion 15 includes a protruding portion 15a at the tip portion. A spring support protruding portion 15b protruding upward is provided to the locking portion 15.

With the locking levers 13, the support shafts 11 are inserted into the supported portions 14 respectively, and the locking levers 13 are configured so as to turn with each center shaft of the support shafts 11 as the center (see FIG. 6). In a state in which the locking levers 13 are supported by the support shafts 11, with the locking levers 13, protruding portions 15a of the locking portions 15 are pressed in a direction approaching the side face portions 8 by pressing springs 17, respectively.

The pressing springs 17 are, for example, torsion coil springs, and are made up of a pair of arm portions 17c protruding coil portions 17a respectively. With the pressing springs 17, the coil portion 17a is supported by the support shaft 11, one of the arm portions 17b is engaged with a spring hook protruding portion 12 provided to the base face portion 7 of the first shell 3, and the other arm portion 17c is engaged with a spring support protruding portion 15b provided to the locking portion 15 of the locking lever 13.

Locking sliders 18 are slidably supported in the forward/backward direction by the slider support portions 3a of the first shell 3 (see FIGS. 3 through 5).

The locking sliders 18 are made up of a spring support shaft portion 21 protruding backward from the rear face of locking portions 20 protruding inward from a portion except for the front edge portions of supported portions 19 extending forward and backward.

With the locking sliders 18, the supported portions 19 are slidably supported by the slider supporting portions 3a of the first shell 3 respectively, and coil springs 22 are supported by the spring support shaft portions 21 respectively. With the coil springs 22, both edges are in contact with the rear face of the locking portion 20, and a rear face where the slider support portion 3a is formed, respectively. Accordingly, the locking sliders 18 are pressed forward by the coil springs 22.

An opening/closing panel 23 is attached to the front edge portion of the first shell 3 (see FIGS. 1 through 3). The opening/closing panel 23 includes, as illustrated in FIGS. 4 and 5, panel portions 24 formed in a horizontally long rectangular plate shape facing the forward/backward direction, and attached protruding portions 25 protruding backward from the lower edge portion in the rear faces of panel portions 24.

Insertion holes 24a are formed in the panel portions 24 with a horizontal elongation. Notches 24b for insertion opened outward are formed on both side edge portions of the panel portions 24, respectively.

The attached protruding portions 25 are provided with a horizontal elongation.

The opening/closing panel 23 is attached to the first shell 3 by the tip portions of the attached protruding portions 25 being screwed to the lower faces of the support shafts 11 provided to the base face portion 7 respectively.

In a state in which the opening/closing panel 23 is attached to the first shell 3, the attached protruding portions 25 are screwed below the support shafts 11 respectively, and accordingly, the locking levers 13, and the pressing springs 17 supported by the support shafts 11 are prevented from falling out.

In a state in which the opening/closing panel 23 is attached to the first shell 3, unlocking portions 16 of the locking levers 13 are positioned right behind the insertion holes 24a.

Figure 7:
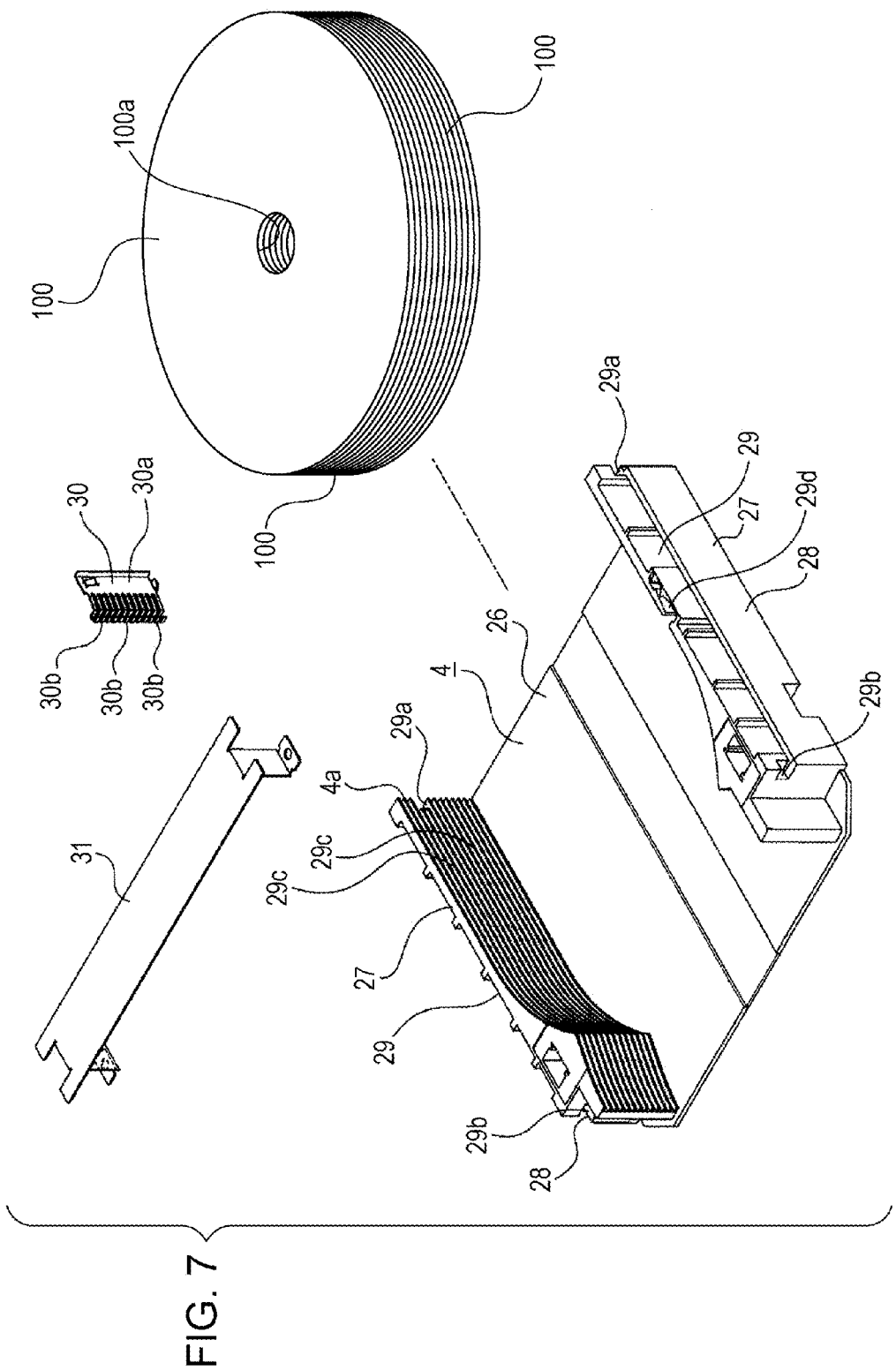
FIG. 7 is an exploded perspective view illustrating the second shell, a bridge member, a hold-down spring, and disc-shaped recording media.

The second shell 4 is formed of a resin material, and is configured by side face portions 27 protruding upward from both side portions of base face portions 26 facing the vertical direction being formed in an integral manner (see FIGS. 3, 5, and 7).

The side face portions 27 are made up of an outer side wall portion 28, and an inner side wall portion 29 positioned in the inner side of the outer side wall portion 28. With the outer side wall portion 28, the height is set to generally a half of the height of the inner side wall portion 29, and the upper face is set to be lower than the upper face of the inner side wall portion 29.

A first recessed portion 29a for locking opened forward and horizontally penetrated is formed in the front edge portion of the inner side wall portion 29. A second recessed portion 29b for locking opened backward and outward is formed in a position close to the rear edge of the inner side wall portion 29.

Holding slots 29c are formed in the inner face of the inner side wall portion 29, and the holding slots 29c are positioned in the vertical direction with an elongation of an equal interval.

A spring attachment recessed portion 29d is formed on one of the inner side wall portions 29. The spring attachment recessed portion 29d is opened upward and inward.

A hold-down spring 30 is inserted and attached to the spring attachment recessed portion 29d (see FIGS. 2 and 4). The hold-down spring 30 is configured, as illustrated in FIG. 7, by spring portions 30b protruding from the rear edges of the vertically long plate shaped attached portions 30a being formed of a metal material in an integral manner. The springs 30b are provided with an elongation of an equal interval in the vertical direction with the same interval as the vertical interval of the holding slots 29c, of which the number to be provided is the same as the number of the holding slots 29c.

The hold-down spring 30 is inserted into the spring attachment recessed portion 29d, and the tip portions of the spring portions 30b protrude in the inner side of the inner side wall portion 29.

A bridge member 31 is attached to a position close to the rear edge between the side face portions 27 of the second shell 4 (see FIGS. 2 and 7).

The bridge member 31 is formed by a plate-shaped metal material being folded in a predetermined shape. The bridge member 31 is attached between the side face portions 27, whereby high strength serving as the entirety of the second shell 4 can be secured.

With the disc cartridge 1, for example, an information input sheet 32 is adhered to the rear face of the case body 2 as information input medium. Predetermined information, for example, information relating to pitch between disc-shaped recording media 100 to be stored in the case body 2, and the number of stored disc-shaped recording media 100 is input to the information input sheet 32.

Note that the information input medium are not restricted to the information input sheet 32, and an appropriate medium may be employed, for example, such as printed information such as a barcode printed on the case body 2, or a recording chip embedded in the case body 2, or the like.

With the disc cartridge 1 configured as described above, the disc-shaped recording media 100 are held in the case body 2 (see FIGS. 1 and 2). With the disc-shaped recording media 100, in a state in which the first shell 3 and the second shell 4 are separated, the outer portion is inserted into the holding slots 29c formed in the side face portions 27 of the second shell 4 from the front, and is held in the case body 2. Accordingly, an opening positioned in the front edge of the second shell 4 is formed as a disc insertion/ejection opening 4a where insertion and ejection as to the second shells 4 of the disc-shaped recording media 100.

In a state in which the case body 2 is configured by the first shell 3 and the second shell 4 being connected, and the opening/closing panel 23 being attached to the first shell 3, insertion slots 2a each extending forward and backward are formed between the lower faces of the side face portion 8 of the first shell 3, and the upper faces of the outer side wall portions 28 of the second shell 4 (see FIG. 1). With the insertion slots 2a, the rear edges are each continued to the slider support portions 3a of the first shell 3, and the front edges are each continued to the notches 24b for insertion formed in the panel portion 24 of the opening/closing panel 23.

Coupled State of Disc Cartridge

Figure 8:
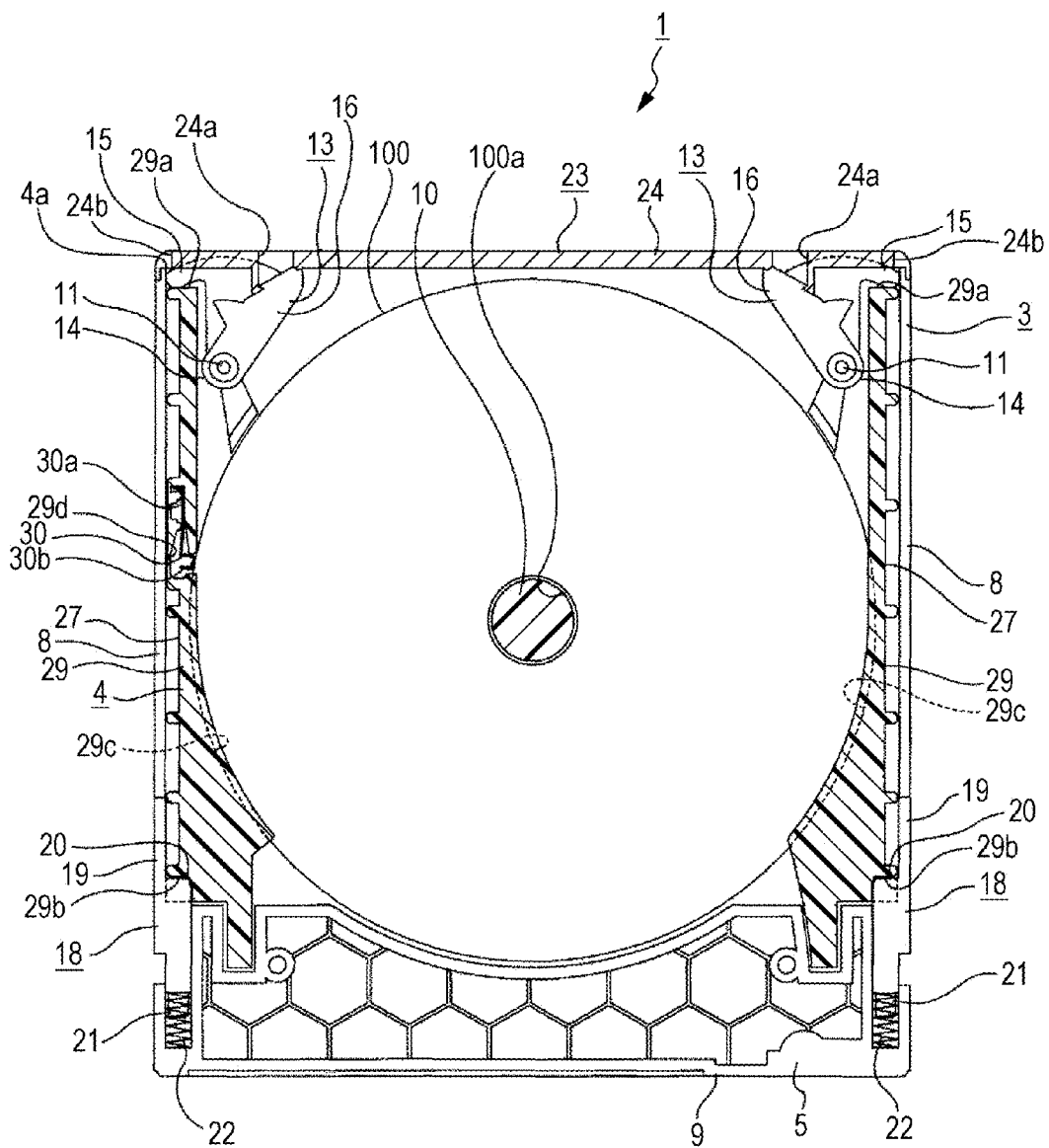
FIG. 8 is an enlarged cross-sectional view illustrating a state in which the first shell and the second shell are locked by a locking slider.

Hereafter, a coupled state of the disc cartridge 1 will be described (see FIG. 8).

The first shell 3 and the second shell 4 are coupled in a state in which the base face portion 7 and the base face portion 26 of the base body 5 are vertically faced.

In a state the first shell 3 and the second shell 4 are coupled, the first shell 3 and the second shell 4 are locked by the locking levers 13, and the locking sliders 18.

The locking levers 13 are positioned in turning edges in a direction (outward) where the tip portions of the locking portions 15 are mutually separated by pressing force of the pressing springs 17, and the protruding portions 15a for locking of the locking portions 15 are inserted into first recessed portions 29a for locking formed in the side face portions 27 of the second shell 4 and engaged therewith, respectively.

The locking sliders 18 are positioned in front movement edges by pressing force of the coil springs 22, and the locking portions 20 are inserted into second recessed portions 29b for locking formed in the side face portions 27 of the second shell 4 and engaged therewith, respectively.

As described above, in a state in which the first shell 3 and the second shell 4 are coupled and locked, and the disc-shaped recording media 100 are held in the case body 2, a part of the outer faces of the disc-shaped recording media 100 are in contact with the spring portions 30b of the hold-down spring 30, and are held down, respectively. At this time, a part of the holding slots 29c are pressed with other portions of the outer faces of the disc-shaped recording media 100, and the disc-shaped recording media 100 are positioned in normal positions within the case body 2.

In a state in which the first shell 3 and the second shell 4 are coupled, with the disc-shaped recording media 100, the center pin 10 provided to the first shell 3 is inserted into center holes 100a.

Overall Configuration of Disc Changer

Next, the configuration of a disc changer 40 will be described (see FIGS. 9 through 17).

The disc changer 40 is configured so that the components are disposed within an outer casing 41.

Figure 9:
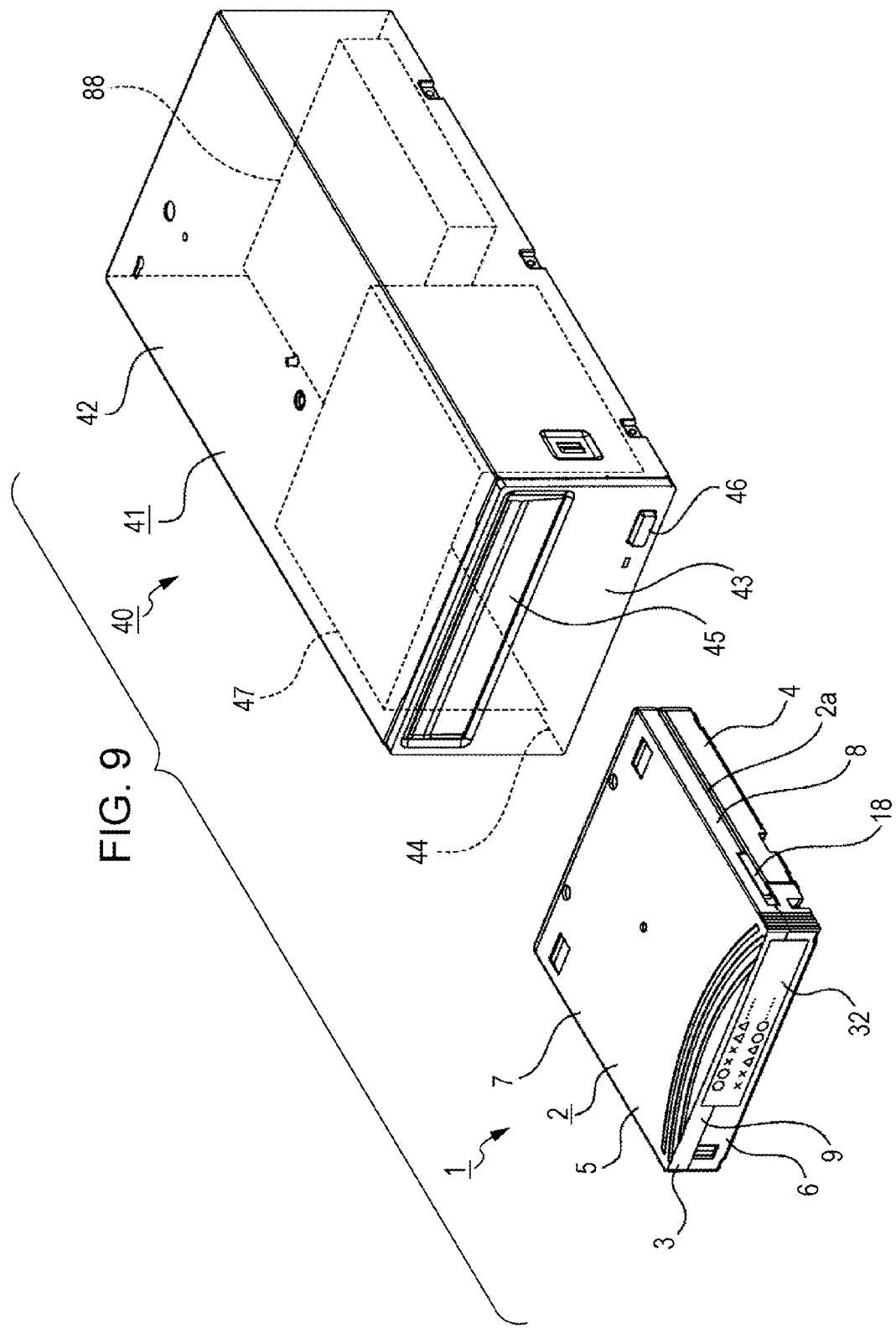
FIG. 9 is a perspective view illustrating the disc changer along with the disc cartridge.

The outer casing 41 is configured of, as illustrated in FIG. 9, an outer frame 42 opened backward and downward, a panel 43 facing the forward/backward direction, attached to the rear edge portion of the outer frame 42, and a base frame 44 facing the vertical direction, attached to the lower edge portion of the outer frame 42.

A cartridge insertion/ejection opening penetrated forward and backward is formed in the upper edge portion of the panel 43, and the cartridge insertion/ejection opening can be opened and closed by a shutter 45. An ejection button 46 is disposed on the lower edge portion of the panel 43.

A holder cover 47 is disposed in the outer casing 41. The holder cover 47 is made up of a top panel portion 48, side plate portions 49 protruding downward from each of the both side edges of the top panel portion 48, and a protruding plate portion 50 protruding downward from the front edge of the top panel portion 48 (see FIGS. 9 through 11).

Figure 12:
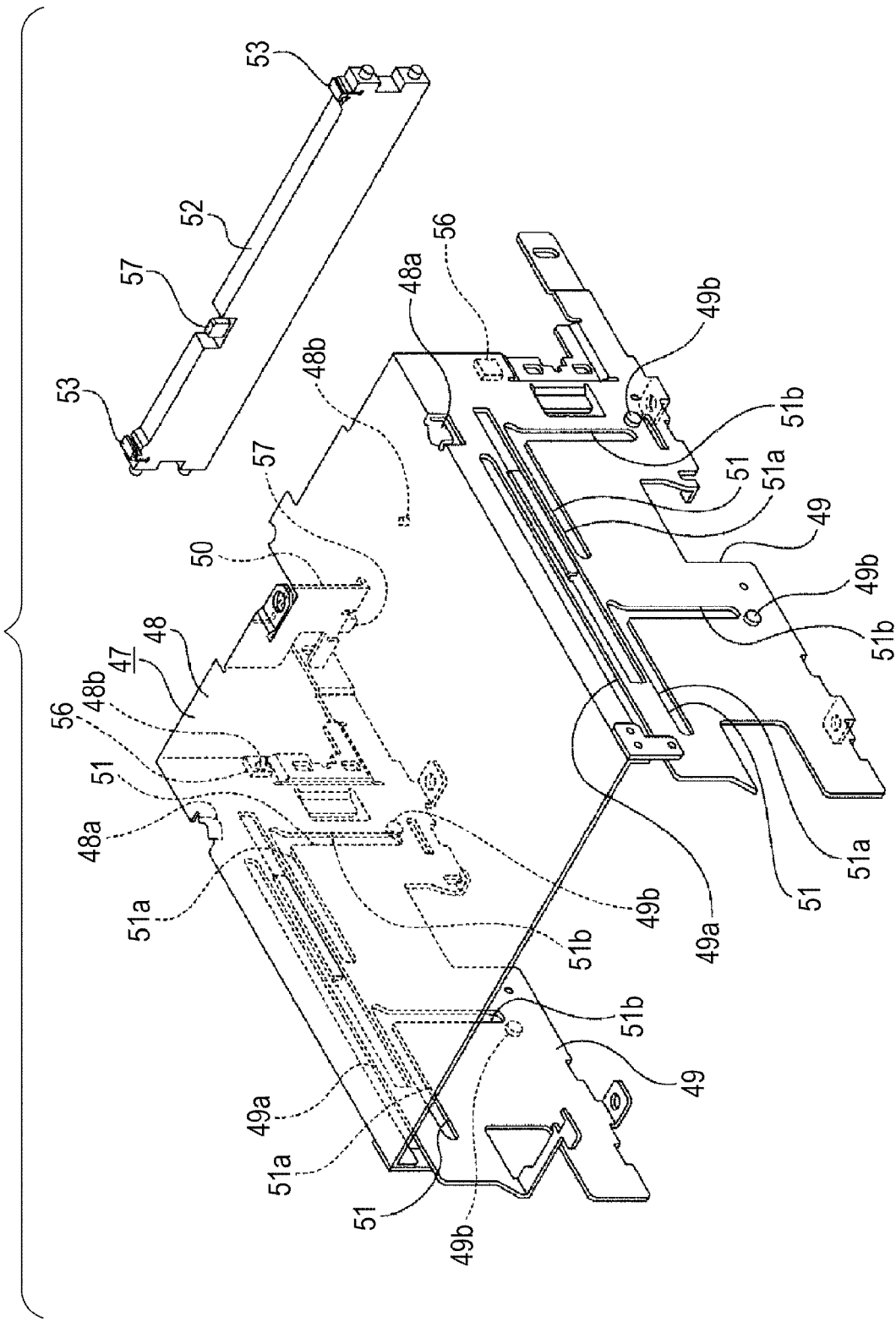
FIG. 12 is an exploded perspective view illustrating a holder cover, a connecting member, and a holding member.

Cam protruding pieces 48a, and pressure pins 48b are provided to positions close to the front edge of the top panel portion 48 in a horizontally separated manner, respectively (see FIG. 12). The cam protruding pieces 48a are provided to both side edge portions of the top panel portion 48 in a state protruding inward, and the pressure points 48b are provided to the inner sides of the cam protruding pieces 48a in a state protruding downward, respectively.

A support hole 49a extending forward and backward is formed in the upper edge portion of the side plate portion 49.

Cam support holes 51 are formed in the side plate portion 49 in a state separated forward and backward. The cam support holes 51 are made up of a horizontal portion 51a extending forward and backward, and a vertical portion 51b vertically extending, and the front edge portion of the horizontal portion 51a, and the upper edge portion of the vertical portion 51b are continued.

Support protruding pins 49b protruding outward are provided to the lower edge portion of the side plate portion 49 in a state separated forward and backward.

A connecting member 52 is attached to the front edge portion of the holder cover 47. The connecting member 52 is formed vertically long, and both side edge portions are attached to the front edge portions of the side plate portions 49 of the holder cover 47, respectively.

Figure 13:
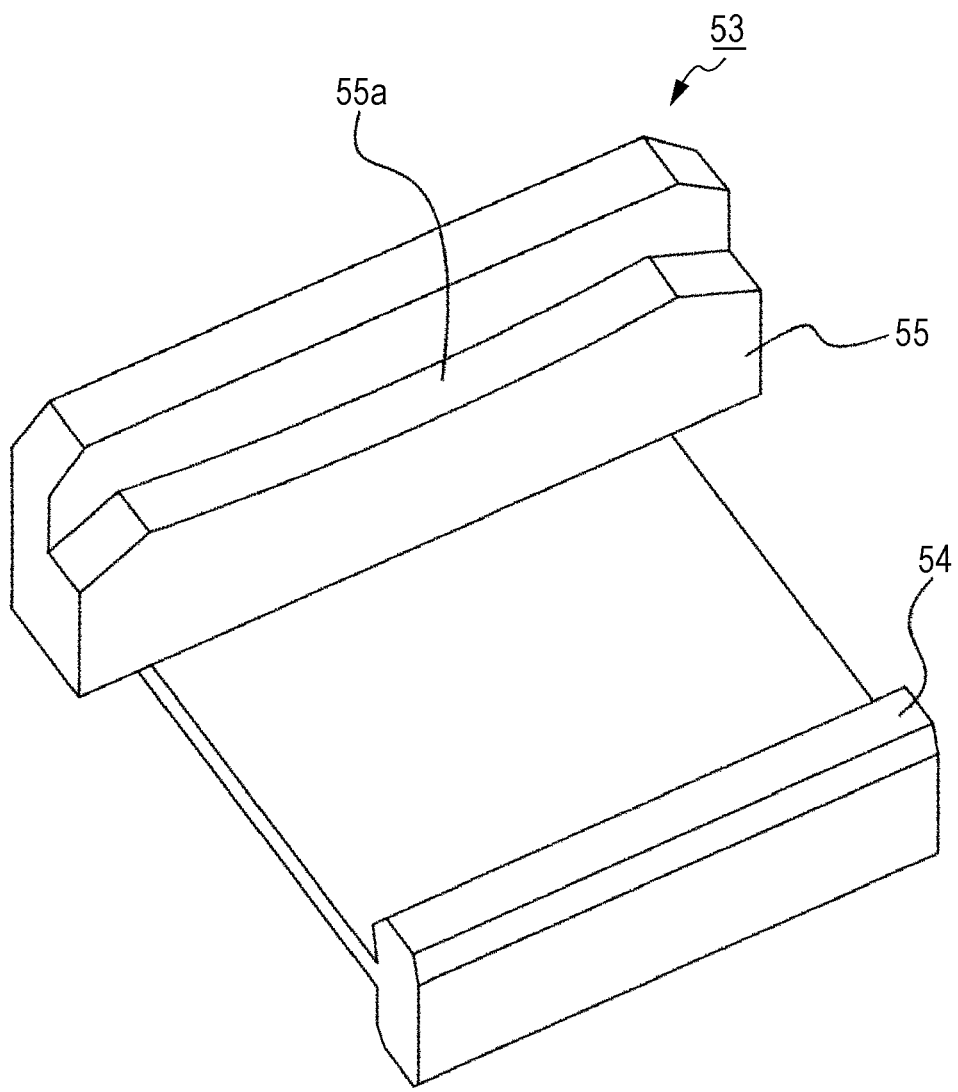
FIG. 13 is an enlarged perspective view of the holding member.

Holding members 53 are attached to both side edge portions of the upper face of the connecting member 52. The holding members 53 are each vertically extending as illustrated in FIG. 13, and are made up of attached portions 54 attached to the connecting member 52, and holding protruding portions 55 protruding in a mutually approaching direction from the upper edge portions of the attached portions 54, and holding faces 55a are formed on faces where the holding protruding portions 55 mutually face, respectively. The holding faces 55a are each formed in an arc face shape protruding outward. The curvatures of the holding faces 55a are set to be smaller than the curvatures of the disc-shaped recording media 100. Distance between the holding members 53 is set slightly smaller than the diameters of the disc-shaped recording media 100.

Elements 56 for detection are disposed in the inner faces of the front edge portions of the side plate portions 49, respectively (see FIG. 12). With the elements 56 for detection, for example, one is a light emitting element, and the other is a light receiving element.

Sensors 57 are disposed on the lower edge portion of the protruding plate portion 50, and the upper edge portion of the connecting member 52, respectively. With the sensors 57, for example, one is a light emitting element, and the other is a light receiving element.

Figure 10:
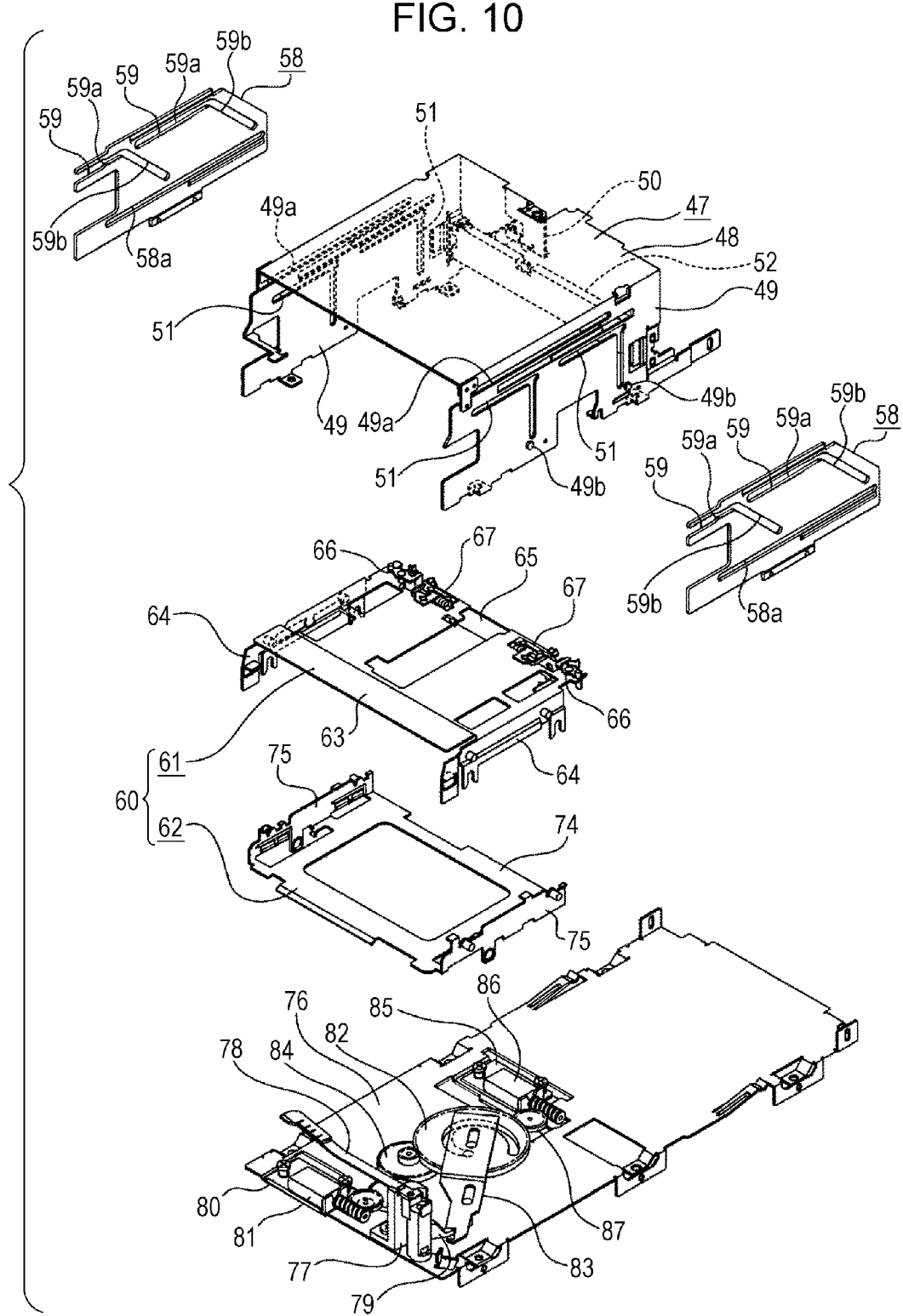
FIG. 10 is an exploded perspective view illustrating the internal configuration of the disc changer.

Sliders 58 are supported on the outer face sides of the side plate portions 49 of the holder cover 47 so as to freely move in the forward/backward direction (see FIG. 10).

Cam holes 59 are formed in the sliders 58 in a state separated forward and backward. The cam holes 59 are made up of a straight line portion 59a extending forward and backward, and a slanting portion 59b tilted so as to be displaced downward as it goes ahead, and the front edge portion of the straight line portion 59a, and the upper edge portion of the slanting portion 59b are continued. A supported hole 58a extending forward and backward is formed on the lower edge portion of the sliders 58.

With the sliders 58, support protruding pins 49b are slidably engaged with the supported hole 58a, and the sliders 58 are supported by the side plate portion 49 of the holder cover 47 so as to freely move in the forward/backward direction.

Figure 11:
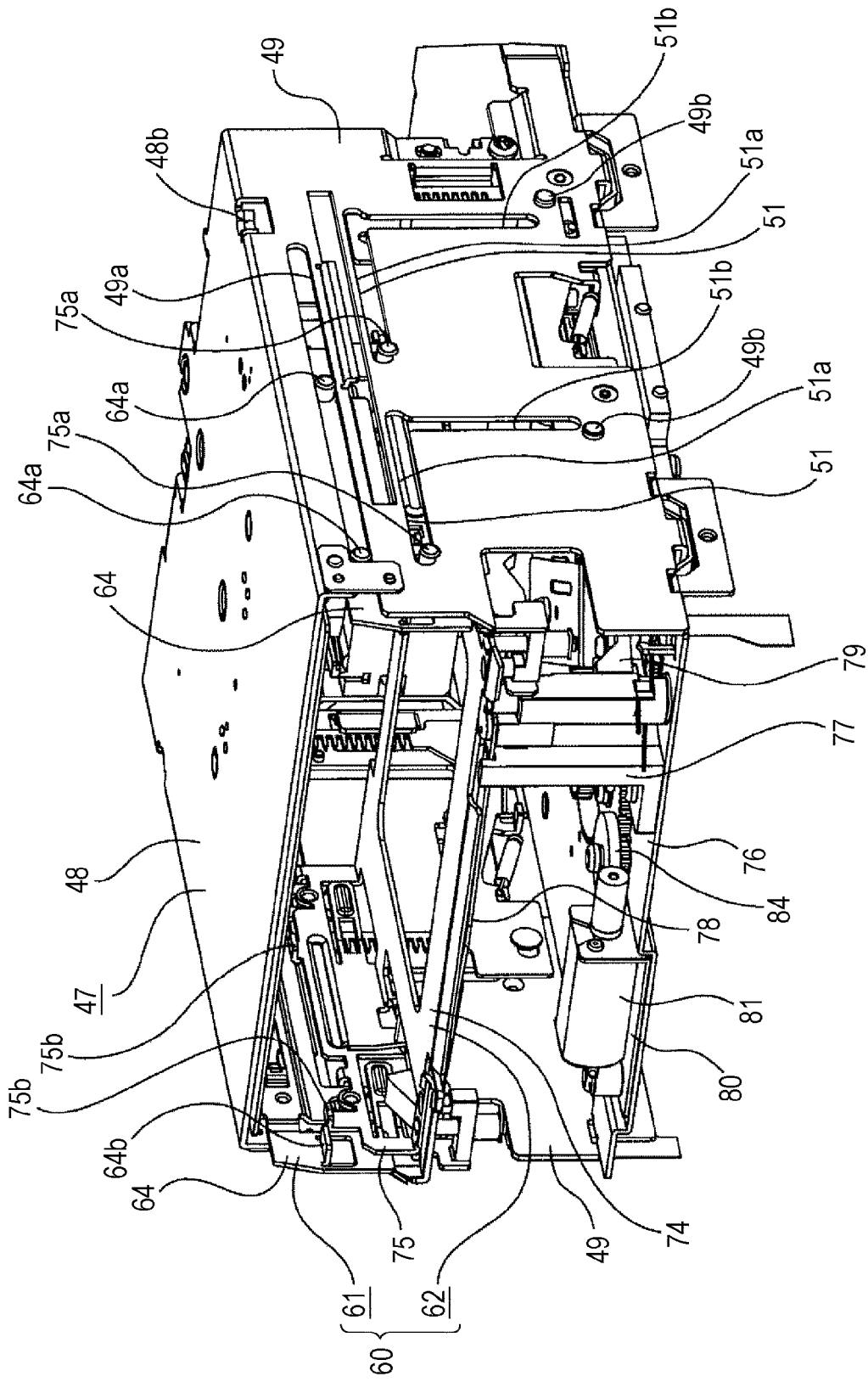
FIG. 11 is a perspective view illustrating the internal configuration of the disc changer.

The disc holder 60 is movably supported by the holder cover 47 (see FIGS. 10 and 11). The disc holder 60 is made up of an upper holder 61 and a lower holder 62 (see FIGS. 14 and 15).

Figure 14:
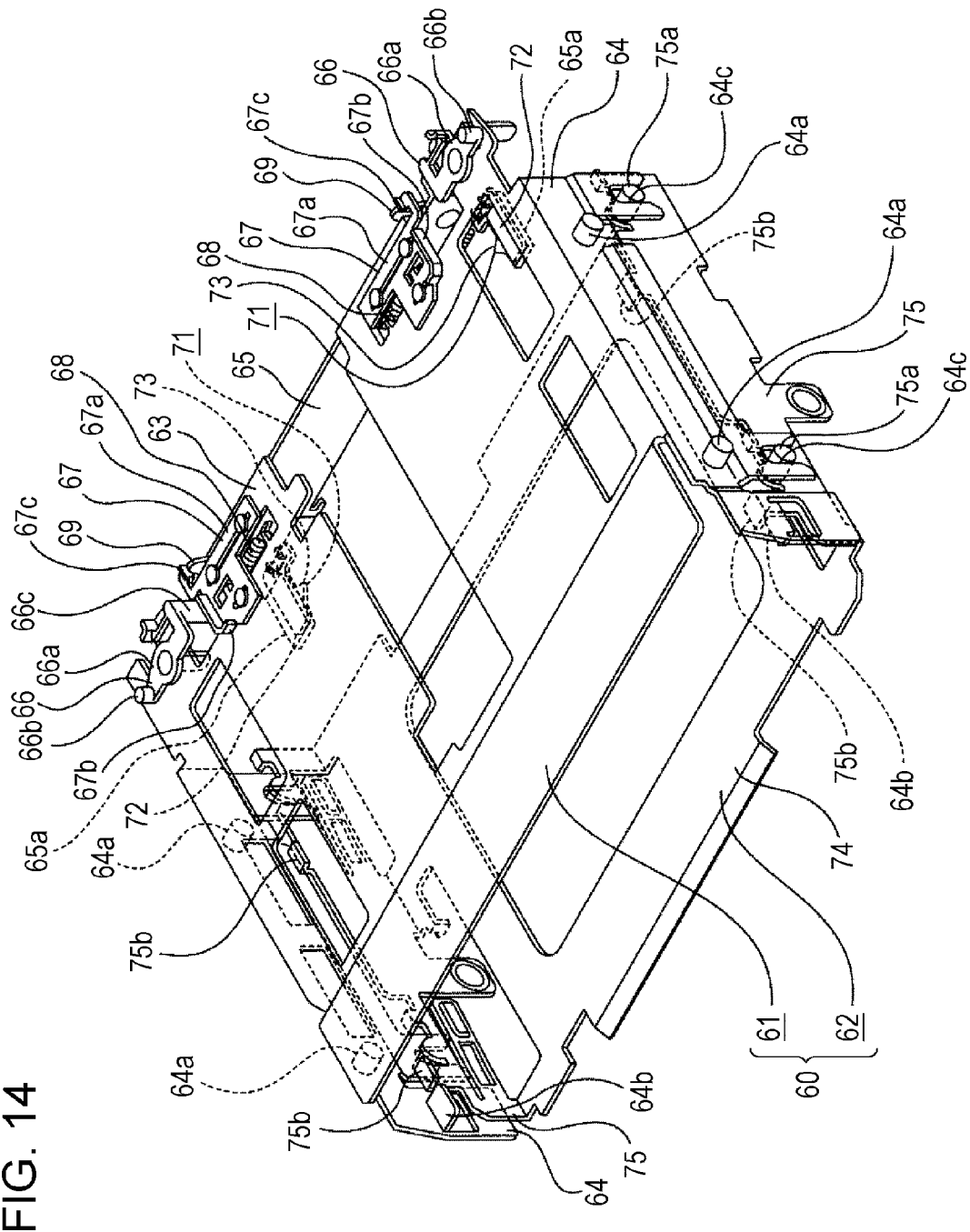
FIG. 14 is a perspective view of a disc holder and so forth.
Figure 15:
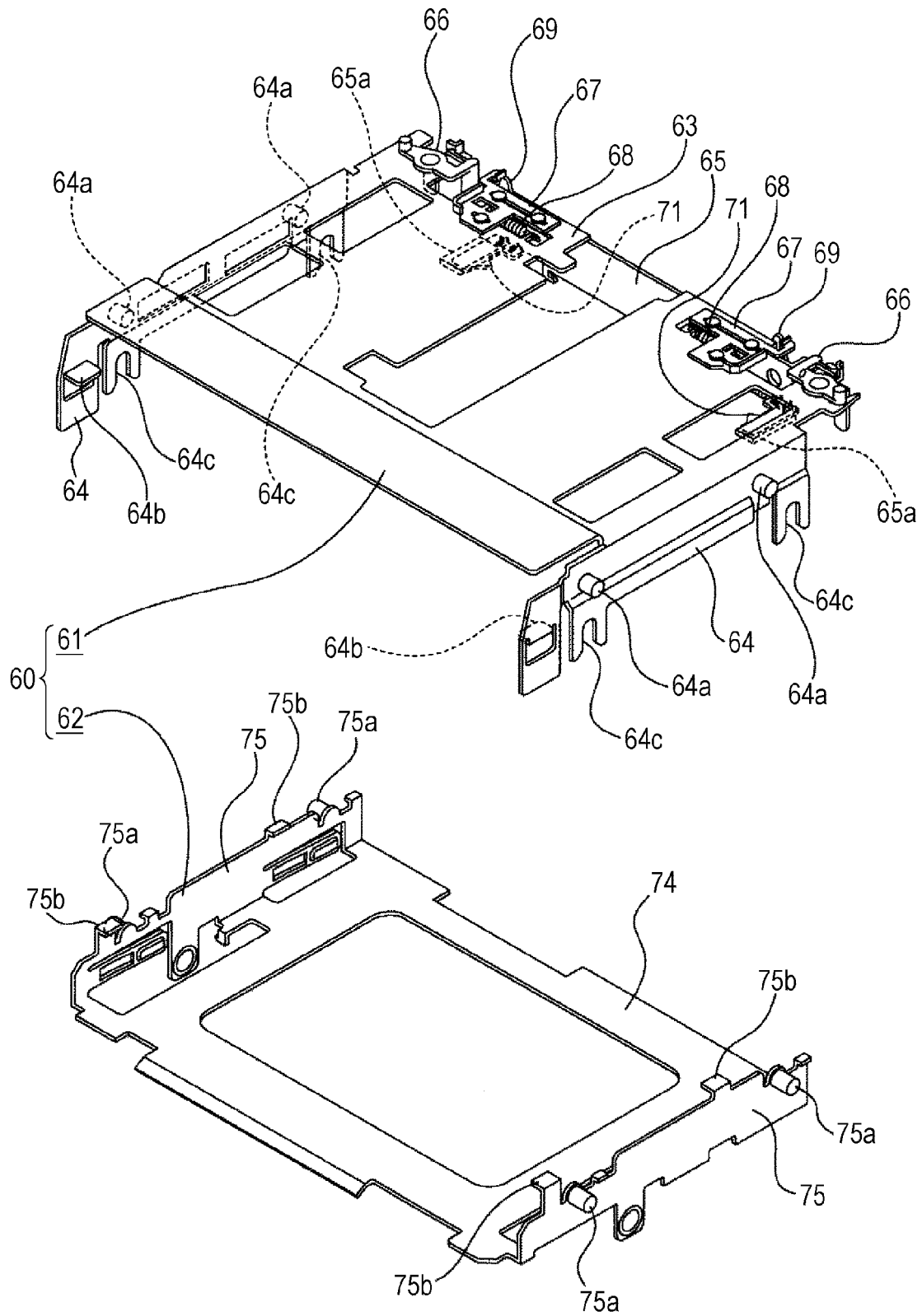
FIG. 15 is a perspective view illustrating the disc holder and so forth by being separated.
Figure 16:
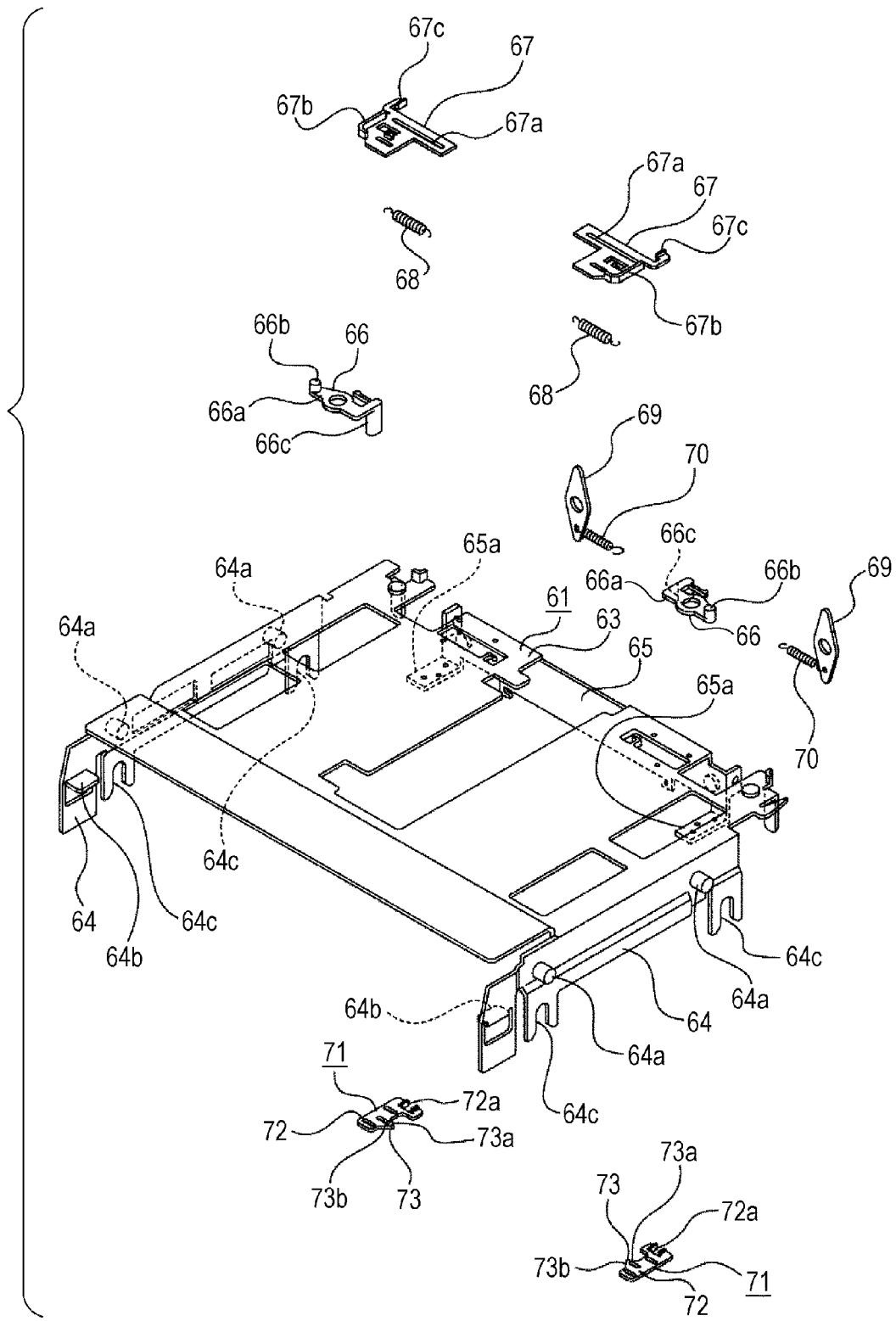
FIG. 16 is an exploded perspective view illustrating an upper holder, and each lever supported by the upper holder.

The upper holder 61 is, as illustrated in FIGS. 14 through 16, made up of a top face portion 63 facing the vertical direction, lateral face portions 64 protruding downward from both side edges of the top face portion 63 respectively, and a lever support portion 65 protruding downward from the front edge of the top face portion 63.

With the top face of the top face portion 63, pressure levers 66 are supported by both side edge portions of the front edge portion so as to freely turn, respectively. The pressure levers 66 are made up of a turning face portion 66a facing the vertical direction, a slide protruding portion 66b protruding upward from the outer side edge portion of the turning face portion 66a, and a pressure shaft portion 66c protruding downward from the front edge portion of the turning face portion 66a. With the pressure levers 66, a turning supporting point is provided to the turning face portion 66a, and the pressure shaft portion 66c is moved generally in the forward/backward direction in front of the top face portion 63. With the pressure levers 66, the pressure shaft portion 66c is pressed in a direction moving generally forward by an unshown spring member.

With the front edge portion of the top face of the top face portion 63, actuating levers 67 are supported in the inner sides of the pressure levers 66 so as to freely move in the horizontal direction. The actuating levers 67 are made up of a plate-shaped moving face portion 67a facing the vertical direction, an activating face portion 67b protruding upward from the outer side edge portion of the moving face portion 67a, and an activating protruding portion 67c protruding forward from the outer side edge portion of the moving face portion 67a. With the actuating levers 67, the moving face portion 67a and the activating face portion 67b are disposed on the top face portion 63, and the activating protruding portion 67c protrudes forward from the top face portion 63. The actuating levers 67 are pressed in a mutually approaching direction by extension coil springs 68 supported between the top face portion 63, respectively.

Slide pins 64a protruding sideward are provided to the outer faces of the lateral face portions 64 so as to be separated forward and backward. Releasing pieces 64b protruding in a mutually approaching direction are provided to the rear edge portions of the lateral face portions 64. Connecting grooves 64c opened downward are formed in the lower edge portions of the lateral face portions 64 so as to be separated forward and backward.

Unlocking pieces 65a are provided to the lever support portion 65 so as to be horizontally separated. The unlocking pieces 65a are provided in a state protruding backward.

Releasing levers 69 are turnably supported on the front face of the lever support portion 65 in a state horizontally separated. The releasing levers 69 are formed in a shape extending generally upward and downward, and a turning supporting point is provided to the central portion of the vertical direction. The releasing levers 69 are pressed in a direction where the lower edge portions mutually approach by springs 70 supported between the lever support portion 65.

Restricting levers 71 are supported on the lower faces of the unlocking pieces 65a so as to freely move in the horizontal direction, respectively. The restricting levers 71 are formed in a plate shape, and are each made up of base portions 72, and restricting portions 73 protruding in a mutually approaching direction from positions close to the rear edges of the base portions 72.

An engagement recessed portion 72a opened forward is formed on the front edge portions of the base portions 72.

The restricting portions 73 are formed in a triangular shape where the width becomes narrow as it approaches the protruding direction from the base portions 72, where a side edge positioned on the front side is formed as a first slanting edge 73a tilted so as to displace backward as it recedes from the base portions 72, and a side edge positioned on the rear side is formed as a second slanting edge 73b tilted so as to displace forward as it recedes from the base portions 72.

With the restricting levers 71, the lower edge portions of the releasing levers 69 are engaged with the engagement recessed portions 72a of the base portions 72, respectively. Accordingly, pressing force of the springs 70 is applied to the restricting levers 71 via the releasing levers 69, and the restricting levers 71 are pressed in a mutually approaching direction.

With the upper holder 61, the slide pins 64a are inserted into the support holes 49a from the inner face sides of the side plate portions 49 respectively, and are supported by the holder cover 47 so as to freely move in the forward/backward direction.

The lower holder 62 is made up of a lower plate portion 74 facing the vertical direction, and lateral plate portions 75 each protruding upward from both side edges of the lower plate portion 74 (see FIGS. 14 and 15).

Slide pins 75a protruding sideward are provided to the outer faces of the lateral plate portions 75 in a state separated forward and backward. Holding pieces 75b protruding inward are provided to the upper edge portions of the lateral plate portions 75 in a state separated forward and backward.

With the lower holder 62, the slide pins 75a are inserted into the cam support holes 51, and the cam holes 59 from the inner face sides of the side plate portions 49, and are supported by the holder cover 47 and the sliders 58 so as to freely move in the forward/backward direction and the vertical direction, respectively.

With the upper holder 61 and the lower holder 62, the slide pins 75a are inserted into the connecting grooves 64c from the lower side, and engaged therewith, thereby being connected in the vertical direction (see FIG. 14).

A chassis 76 is attached onto the base frame 44 of the outer casing 41 (see FIGS. 10 and 11).

Figure 17:
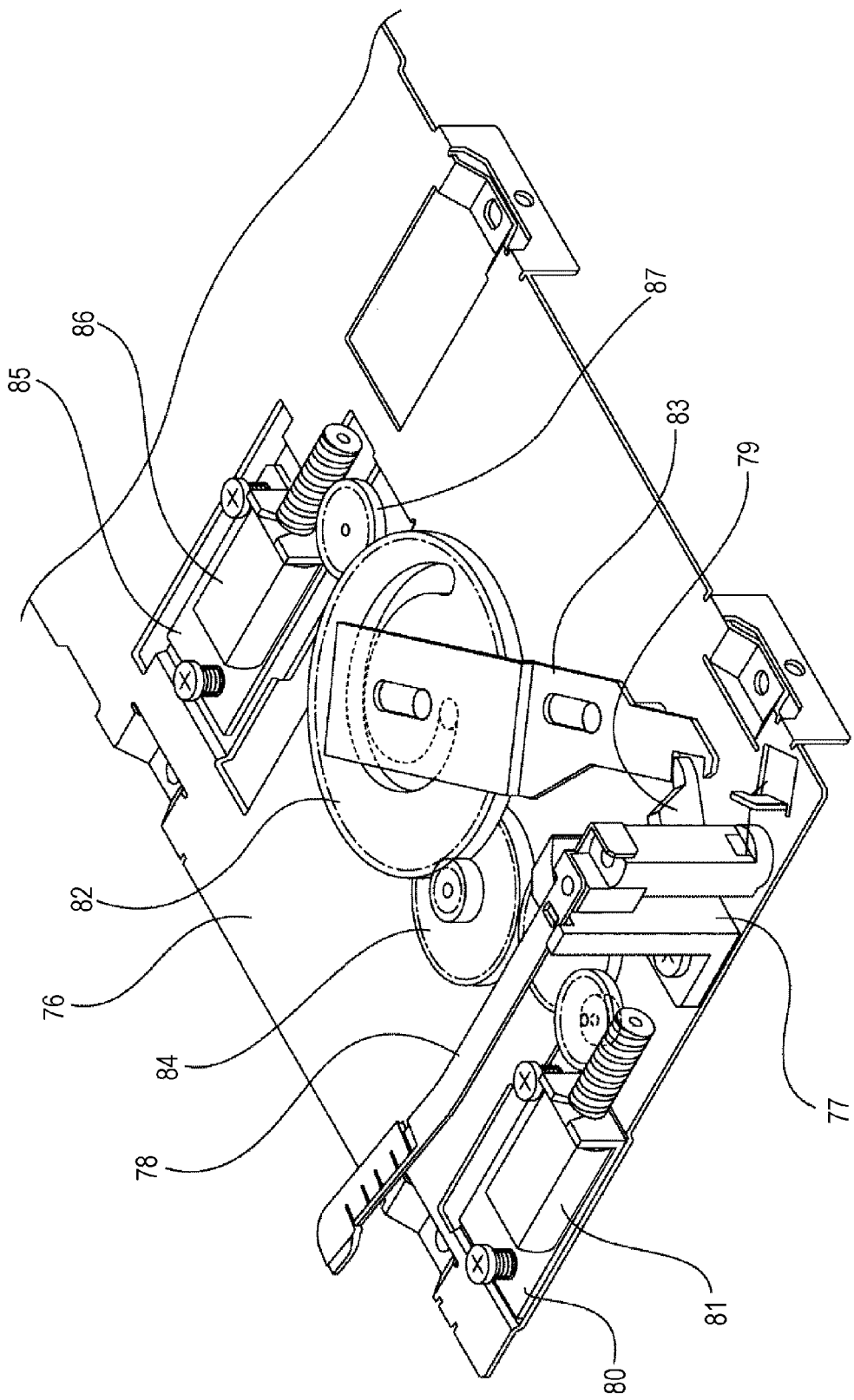
FIG. 17 is a perspective view illustrating a chassis, and each unit disposed in the chassis.

A support member 77 protruding upward is attached to the rear edge portion of the chassis 76 (see FIG. 17). An ejection lever 78 capable of turning in the horizontal direction is supported on the upper edge portion of the support member 77. The ejection lever 78 is connected with an activated member 79, and the lower edge portion of the activated member 79 is disposed on the chassis 76.

A first motor support plate 80 is disposed on the chassis 76, and a first driving motor 81 is attached onto the first motor support plate 80.

A rotating cam 82 is supported by the chassis 76, and the rotating cam 82 is connected with an arm lever 83. One edge portion of the arm lever 83 is connected to the lower edge portion of the activated member 79.

The rotating cam 82 is rotated by driving force of the first driving motor 81 being propagated via a first reduction gear group 84 supported onto the chassis 76, and the arm lever 83 is operated along with rotation of the rotating cam 82. Upon the arm lever 83 being operated, the activated member 79 is operated, and the ejection lever 78 is turned as to the support member 77.

Unshown rack gears each attached to the sliders 58 are disposed on the bottom face side of the chassis 76.

A second motor support plate 85 is disposed in front of the first driving motor 81 on the chassis 76, and a second driving motor 86 is attached onto the second motor support plate 85.

A second reduction gear group 87 is supported by the chassis 76, and the second reduction gear group 87 except for a part of this is supported on the lower face side of the chassis 76. The second reduction gear group 87 is geared with the rack gears each attached to the sliders 58.

The sliders 58 are moved in the forward/backward direction by driving force of the second driving motor 86 being propagated to the rack gears via the second reduction gear group 87. Upon the sliders 58 being moved in the forward/backward direction, as described later, the lower holder 62 of the disc holder 60 is moved in the vertical direction.

Accordingly, the second driving motor 86 and the second reduction gear group 87 serve as a moving mechanism for moving the disc holder 60 (lower holder 62). The moving mechanism includes an unshown encoder, and uses the encoder to determine a stop position in the vertical direction of the lower holder 62 based on information input to the information input sheet 32 serving as an information input medium added to the disc cartridge 1.

A drive unit 88 for performing recording or playback of information signals as to the disc-shaped recording media 100 is disposed on the lower edge portion on the front side within the outer casing 2 (see FIG. 9).

Operation of Disc Changer

Hereafter, operation of the disc changer 40 will be described (see FIGS. 18 through 42).

First, an initial state before the disc cartridge 1 is inserted into the disc changer 40 will be described (see FIGS. 18 through 20).

Figure 18:
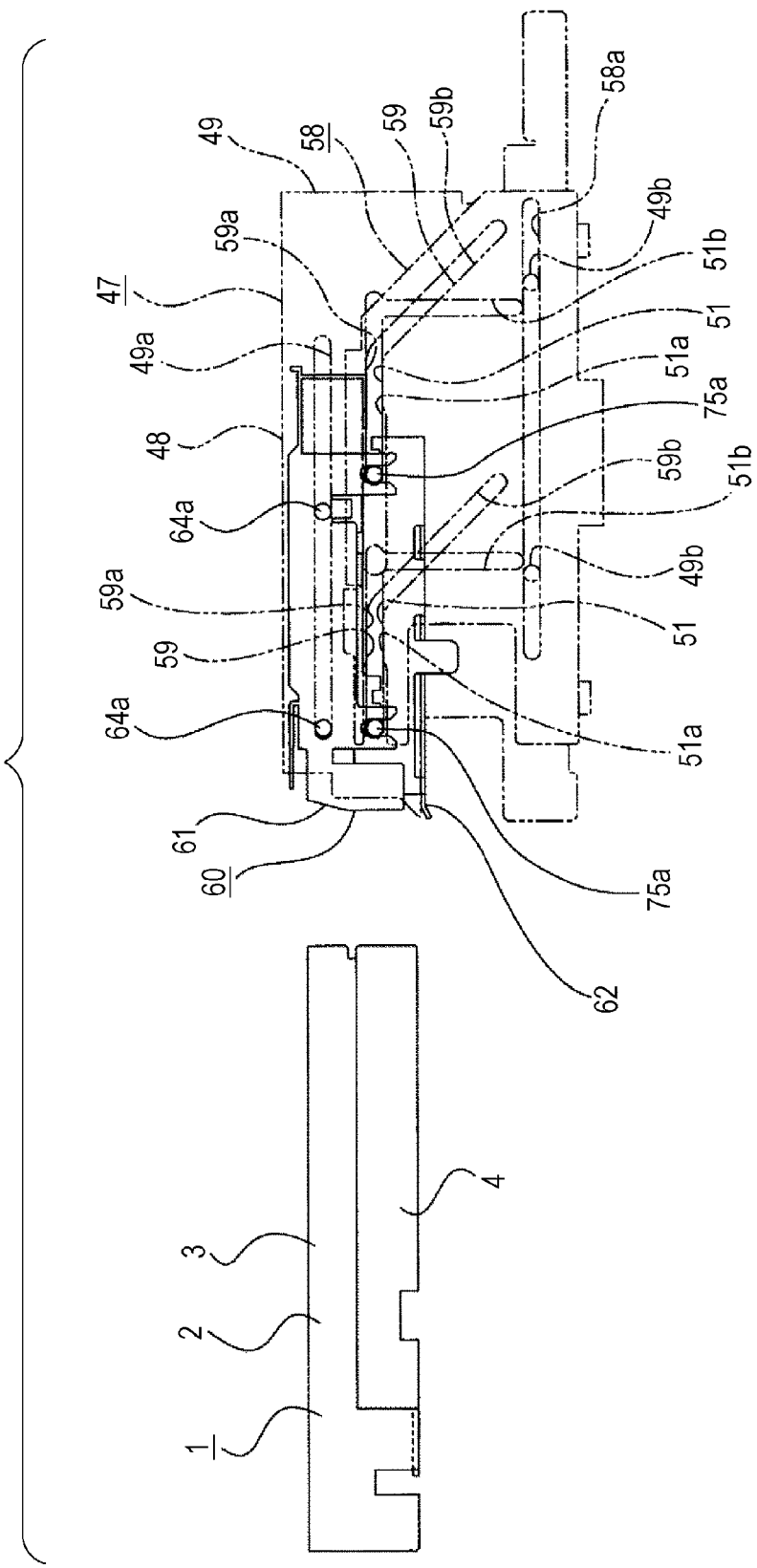
FIG. 18 illustrates the operation of the disc changer along with FIGS. 19 through 24, and is a schematic side view illustrating a state before the disc cartridge is inserted into the disc changer.

In the initial state, the slider 58 is positioned in the front movement edge, and the disc holder 60 is positioned in the rear movement edge (see FIG. 18).

At this time, with the upper holder 61, the slide pin 64a on the rear side is engaged with the rear edge portion of the support hole 49a in the holder cover 47. With the lower holder 62, the slide pin 75a is engaged with the rear edge portion of the horizontal portion 51a of the cam support hole 51 in the holder cover 47, and the rear edge portion of the straight line portion 59a of the cam hole 59 in the slider 58.

Figure 19:
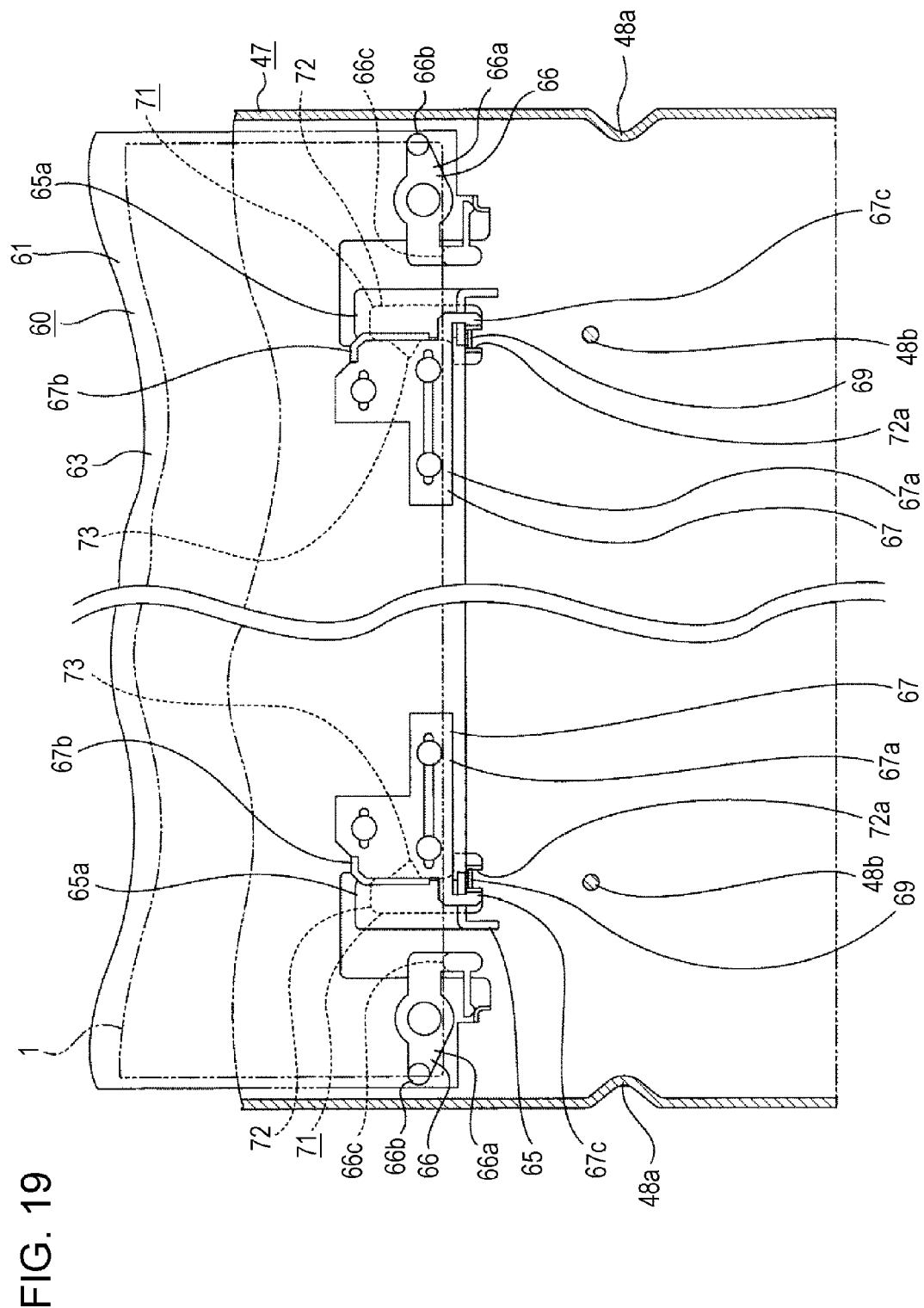
FIG. 19 is an enlarged plan view illustrating the initial state of each lever.
Figure 20:
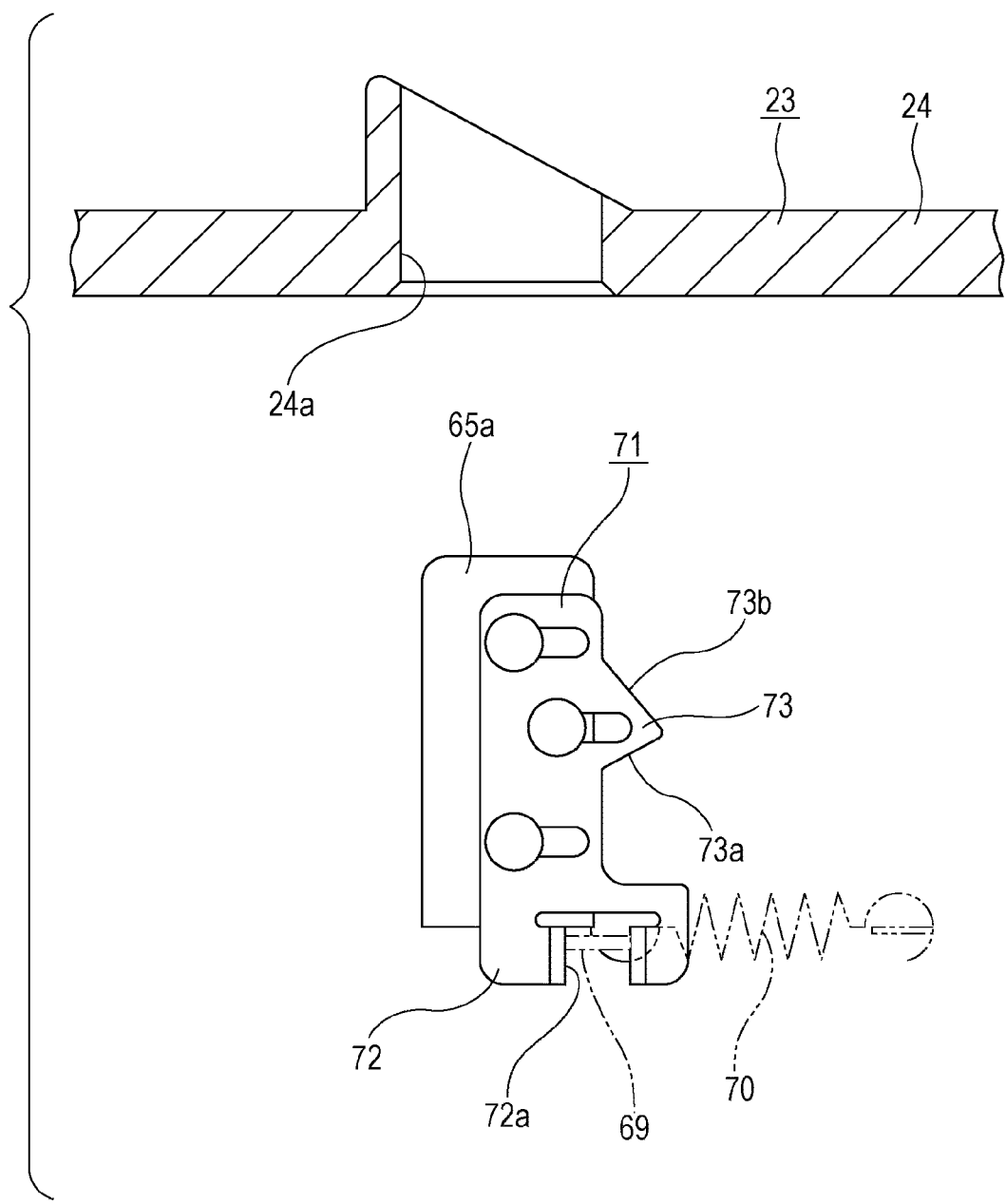
FIG. 20 is an enlarged plan view illustrating the initial state of a restricting lever, of which a part is illustrated with a cross section.

In the initial state, the pressure lever 66 supported by the disc holder 60 is in a state in which the pressure shaft portion 66c is positioned in the movement edge of the front side by pressing force of a spring member (see FIG. 19).

In the initial state, the releasing lever 69 supported by the disc holder 60 is positioned in a perpendicular state by pressing force of the spring 70. Accordingly, as illustrated in FIG. 20, the restricting lever 71 is held in the movement edge of the inner side, and the an actuating lever 67 is positioned in the movement edge of the outer side engaged by the activating protruding portion 67c is engaged with the upper edge portion of the restricting lever 71 from the outer side due to pressing force of the extension coil spring 68 (see FIG. 19).

In the initial state, the ejection lever 78 supported by the upper edge portion of the support member 77 is held in a state extending generally in the horizontal direction.

Figure 21:
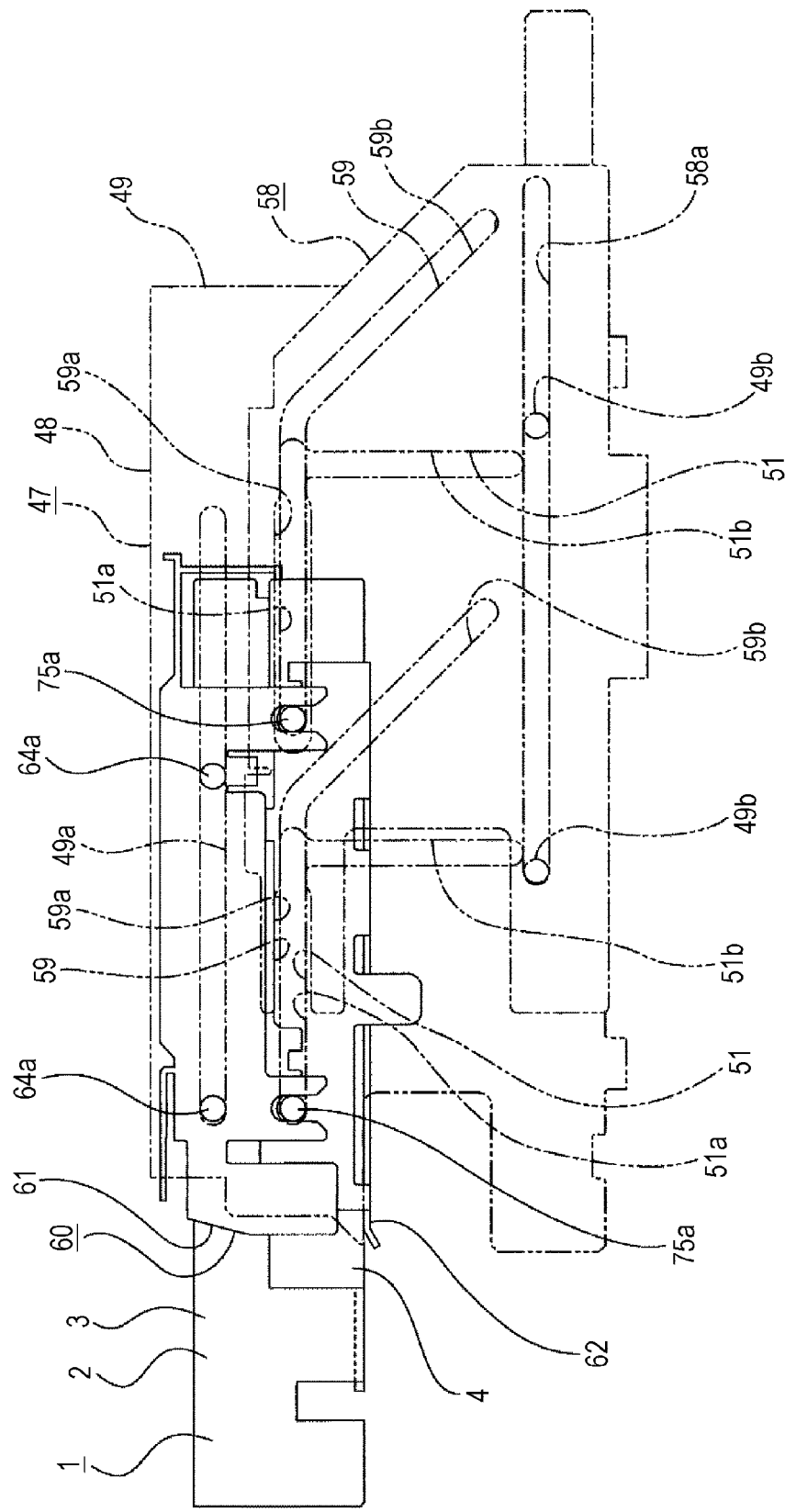
FIG. 21 is a schematic side view illustrating a state in which the disc cartridge is inserted into the disc changer.

In the above initial state, upon the disc cartridge 1 being inserted into the cartridge insertion/ejection opening of the panel 43, the disc cartridge 1 is inserted into the disc holder 60 from backward (see FIG. 21). When the disc cartridge 1 is gradually inserted from the cartridge insertion/ejection opening of the panel 43, the shutter 45 is pressed and turned.

Upon the disc cartridge 1 being gradually inserted into the disc holder 60 from behind, the releasing pieces 64b of the upper holder 61, and the holding pieces 75b of the lower holder 62 are inserted into the insertion slots 2a formed in the case body 2, respectively.

Upon the releasing pieces 64b being inserted into the insertion slots 2a respectively, when the disc cartridge 1 is moved to the depth side of the disc holder 60, the supported portions 19 of the locking sliders 18 are pressed by the releasing pieces 64b, respectively. Upon the supported portions 19 being pressed backward by the releasing pieces 64b respectively, the locking sliders 18 are moved backward against pressing force of the coil springs 22 respectively, and the locking portions 20 are pulled out from the second recessed portions 29b for locking of the second shell 4, respectively. Upon the locking portions 20 being pulled out from the second recessed portions 29b for locking respectively, locking between the first shell 3 and the second shell 4 by the locking sliders 18 is unlocked.

Figure 22:
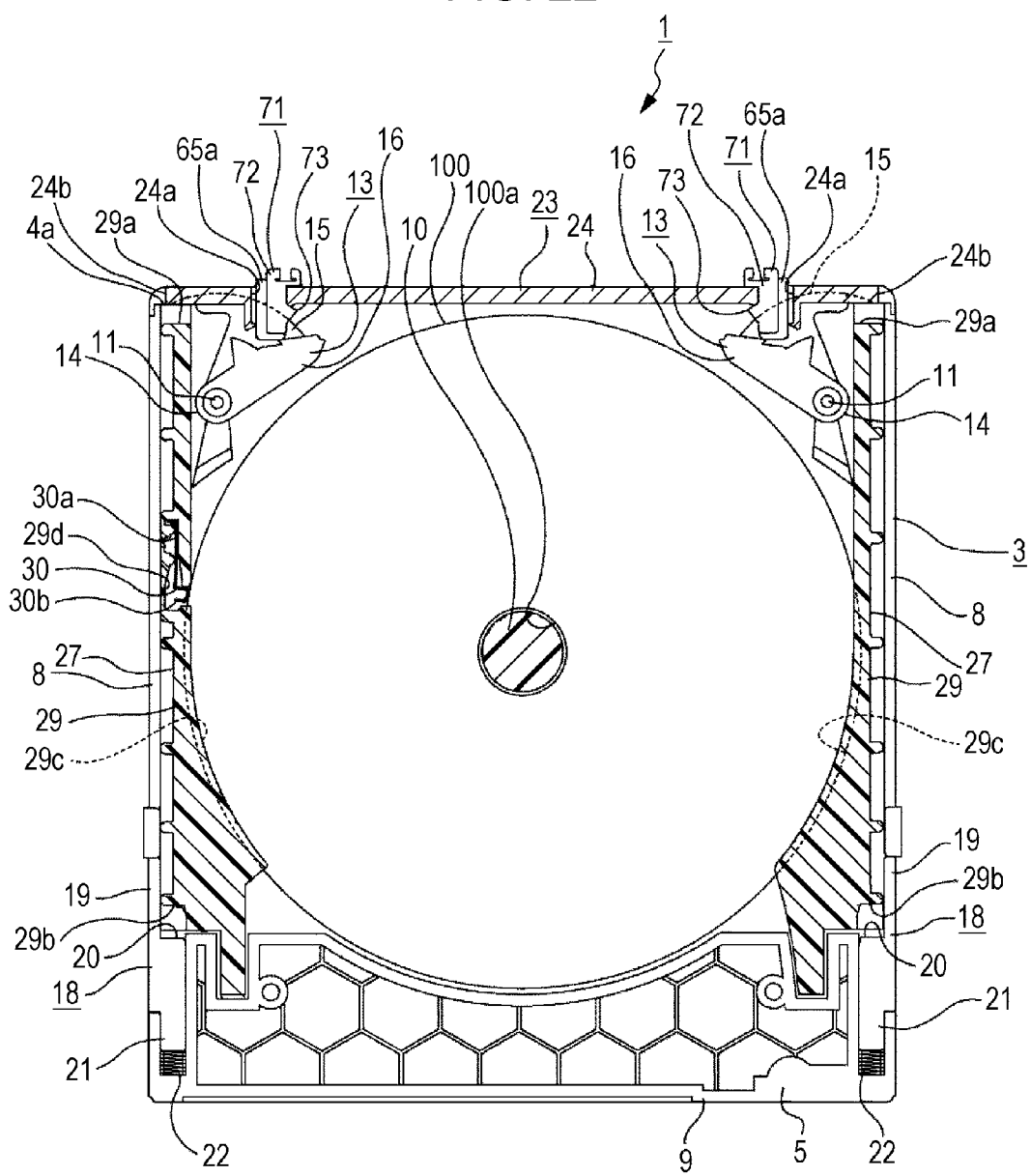
FIG. 22 is a cross-sectional view illustrating a state in which locking between the first shell and the second shell is unlocked.

Also, at this time, the unlocking pieces 65a provided to the disc holder 60 are inserted into the insertion holes 24a of the opening/closing panel 23 respectively (see FIG. 22). Upon the unlocking pieces 65a being inserted into the insertion holes 24a respectively, the unlocking portions 16 of the locking levers 13 are pressed backward by the unlocking pieces 65a respectively. Upon the unlocking portions 16 being pressed backward by the unlocking pieces 65a respectively, the locking levers 13 are turned against pressing force of the pressing springs 17, and the locking portions 15 are pulled out from the first recessed portions 29a for locking of the second shell 4. Upon the locking portions 15 being pulled out from the first recessed portions 29a for locking respectively, locking between the first shell 3 and the second shell 4 by the locking levers 13 is unlocked.

The above unlocking of locking between the first shell 3 and the second shell 4 by the locking levers 13 is performed at the same time as unlocking of locking between the first shell 3 and the second shell 4 by the locking sliders 18.

Upon locking between the first shell 3 and the second shell 4 by the locking levers 13, and the locking sliders 18 being unlocked, the first shell 3 and the second shell 4 proceed to a vertically separable state.

As described above, when the unlocking pieces 65a provided to the disc holder 60 are inserted into the insertion holes 24a of the opening/closing panel 23 respectively, at the same time the restricting levers 71 supported by the unlocking pieces 65a are gradually inserted into the insertion holes 24a from forward, respectively.

Figure 23:
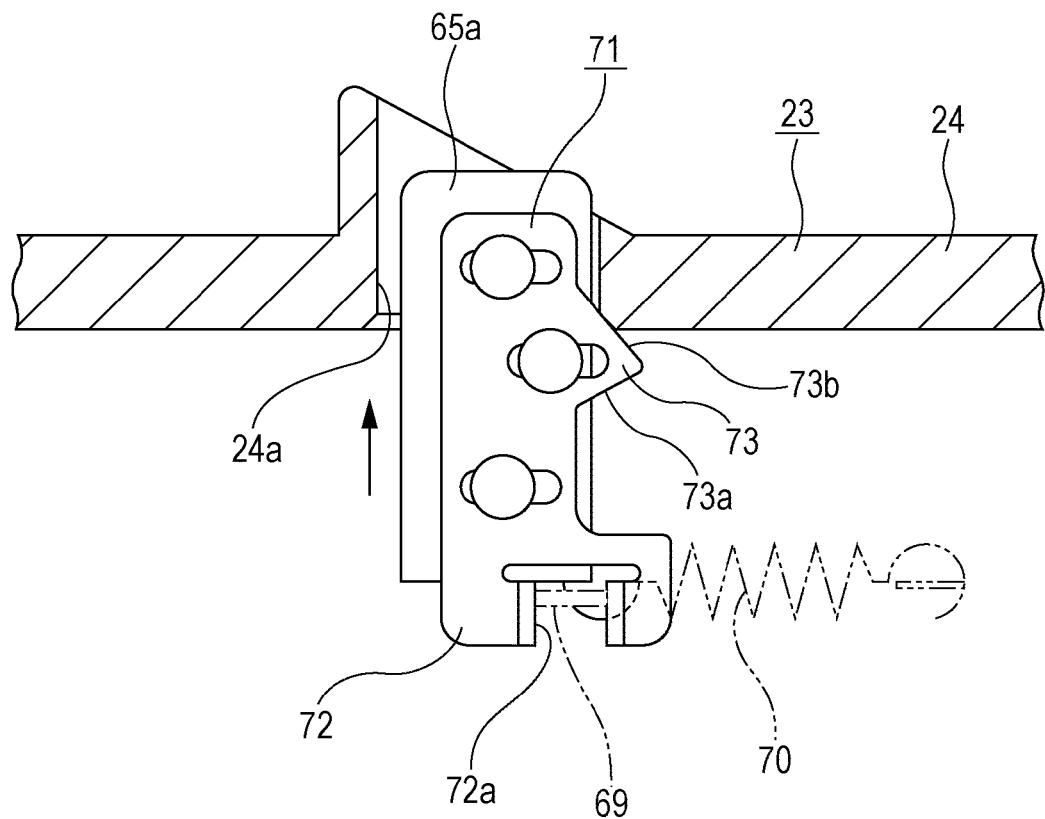
FIG. 23 is an enlarged plan view illustrating a state in which the restricting lever is inserted into an insertion hole, of which a part is illustrated with a cross section.

Upon the restricting levers 71 being gradually inserted into the insertion holes 24a, since the restricting levers 71 are positioned in the inner side movement edge by the springs 70, first the second slanting edge 73b slidably comes into contact with the front side opening edge of the insertion holes 24a, and are gradually moved outward against pressing force of the springs 70 (see FIG. 23).

Figure 24:
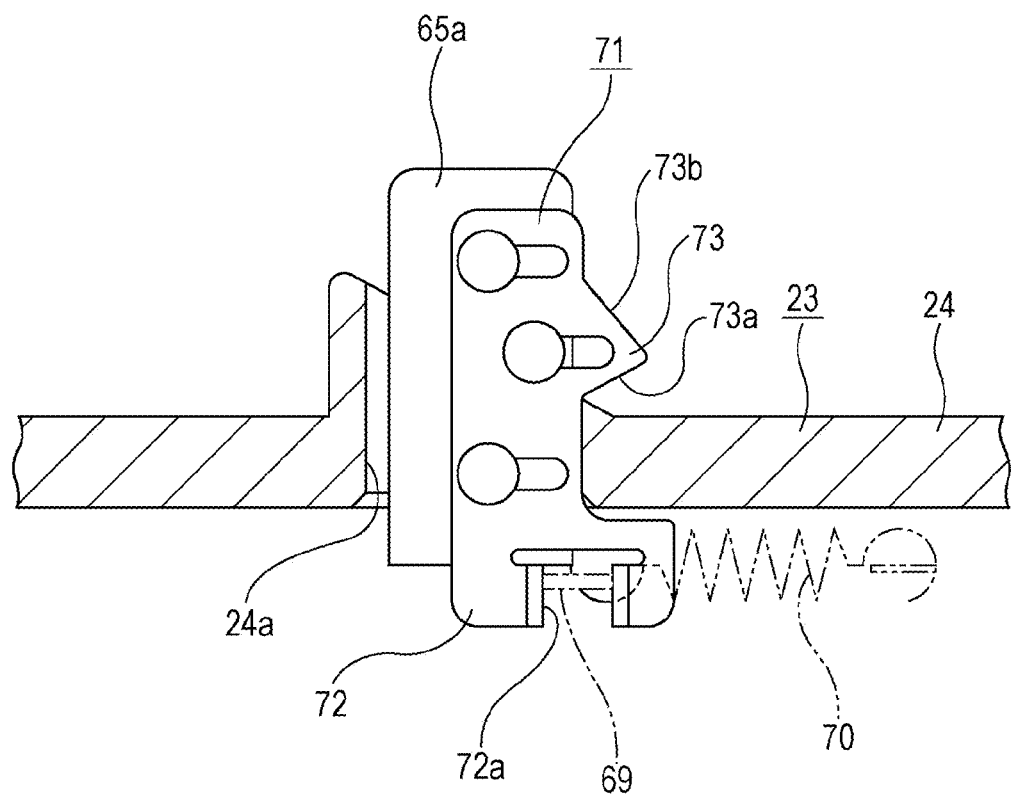
FIG. 24 is an enlarged plan view illustrating a state in which the restricting lever is inserted into the insertion hole, and movement of the disc cartridge is restricted by the restricting lever, of which a part is illustrated with a cross section.

Next, with the restricting levers 71, upon the tip of the restricting portion 73 slidably coming into contact with the opening edge of the insertion hole 24a, and the restricting portion 73 moving to the rear side of the insertion hole 24a, the restricting levers 71 are moved inward by pressing force of the springs 70, and the first slanting edge 73a is engaged with the rear side opening edge of the insertion hole 24a (see FIG. 24). Accordingly, backward movement (in the extracting direction) of the disc cartridge 1 is restricted by the restricting levers 71, and a state in which locking between the first shell 3 and the second shell 4 by the locking levers 13, and the locking sliders 18 is unlocked is held.

In this way, with the disc changer 40, there are provided the restricting levers 71 for restricting and holding backward movement of the disc cartridge 1 in a state in which locking as to the first shell 3 and the second shell 4 is unlocked, and accordingly, the holding state of the disc cartridge 1 by the disc holder 60 when the locking is unlocked can be secured. Accordingly, in a state in which the locking is unlocked, the disc cartridge 1 is prevented from being moved in the extracting direction, and state transition to an unintentional locked state is prevented, whereby the suitable holding state of the disc cartridge 1 by the disc holder 60 can be secured.

Also, the unlocking pieces 65a and restricting levers 71 of the disc holder 60 are inserted into the insertion holes 24a of the case body 2 at the same time, respectively, and accordingly, unlocking of the case body 2, and holding of the disc cartridge 1 by the restricting levers 71 are performed at the same time, whereby improvement in operating reliability, and speed-up of operation can be realized.

Further, the unlocking pieces 65a, and the restricting levers 71 are both formed in a plate shape, and are disposed in a state adjacent to the thickness direction, and accordingly, the insertion holes 24a can be reduced in size by that much, whereby reduction in the size of the disc cartridge 1 can be realized, and also entry of moisture and dust from the insertion holes 24a can be suppressed.

Note that, in a state in which restriction of movement of the disc cartridge 1 by the restricting levers 71 has been performed, when great external force (movement force) in the extracting direction is applied to the disc cartridge 1, e.g., when a user pulls out the disc cartridge 1 from the disc holder 60, the disc cartridge 1 can be pulled out from the disc holder 60 as follows.

Figure 25:
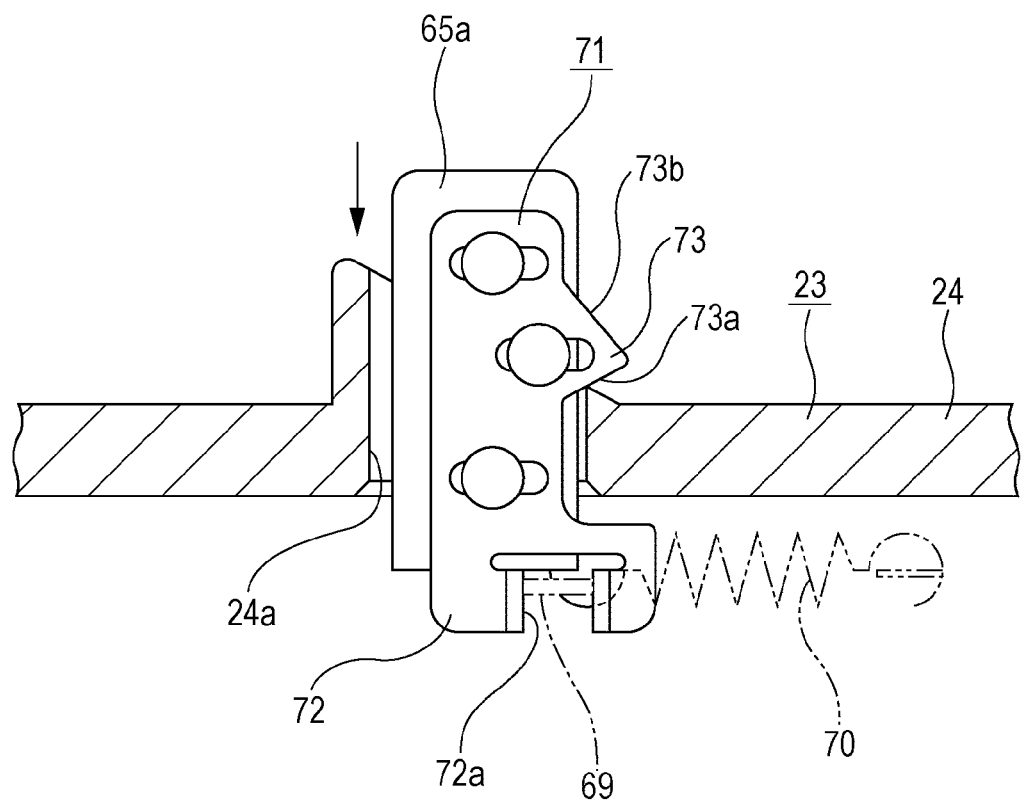
FIG. 25 is an enlarged plan view illustrating a state in which the disc cartridge is moved in the extracting direction in a state in which the restricting lever is inserted into the insertion hole, of which a part is illustrated with a cross section.

Upon significant force in the extracting direction being applied to the disc cartridge 1, the restricting lever 71 is moved outward against the pressing force of the spring 70 by the first slanting edge 73a of the restricting portion 73 slidably coming into contact with the rear side opening edge of the insertion hole 24a (see FIG. 25).

Next, upon the tip of the restricting portion 73 slidably coming into contact with the opening edge of the insertion hole 24a, and the restricting portion 73 moving to the front side of the insertion hole 24a, the restricting lever 71 is moved inward by the pressing force of the spring 70, and engagement of the restricting portion 73 as to the case body 2 is released. Accordingly, restriction by the restricting levers 71 is released, and the disc cartridge 1 is moved in the extracting direction.

In this way, with the disc changer 40, in the state that the motion of the disc cartridge 1 is restricted by the restricting levers 71, there are formed first slanting edges 73a for allowing movement of the disc cartridge 1 in the extracting direction when great movement force is applied to the disc cartridge 1 in the extracting direction.

Accordingly, when significant movement force is applied to the disc cartridge 1 in the extracting direction, no great load is applied to the disc cartridge 1 and disc changer 40, whereby damage of the disc cartridge 1 and disc changer 40 can be prevented.

As described above, when the disc cartridge 1 is inserted into the depth side of the disc holder 60, and movement in the extracting direction is restricted by the restricting levers 71, an unshown switch is operated by the disc cartridge 1, and the disc holder 60 and disc cartridge 1 are moved forward in an integral manner by an unshown transport mechanism.

Figure 26:
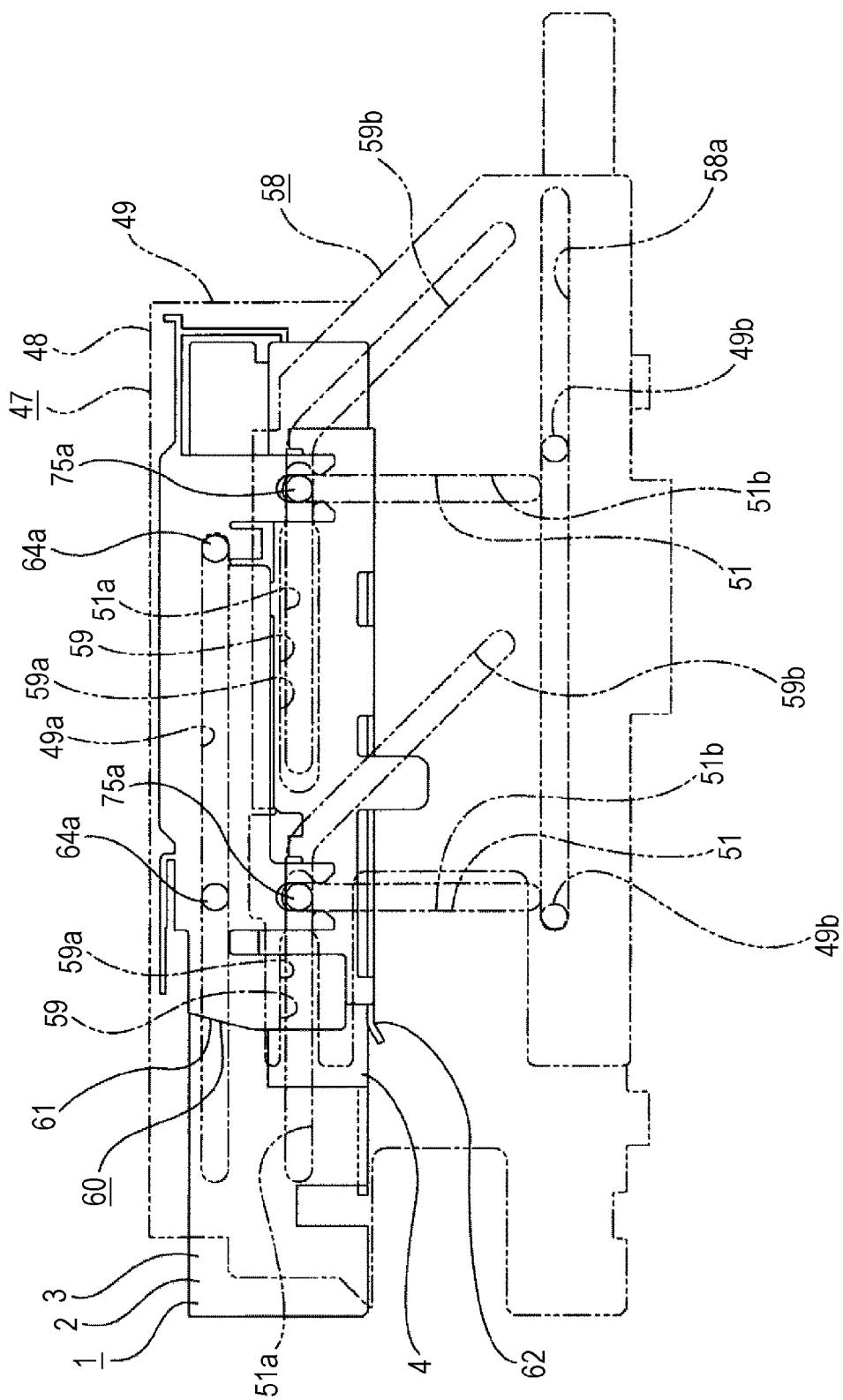
FIG. 26 is a schematic side view illustrating a state in which the disc holder is moved to a separable position.
Figure 27:
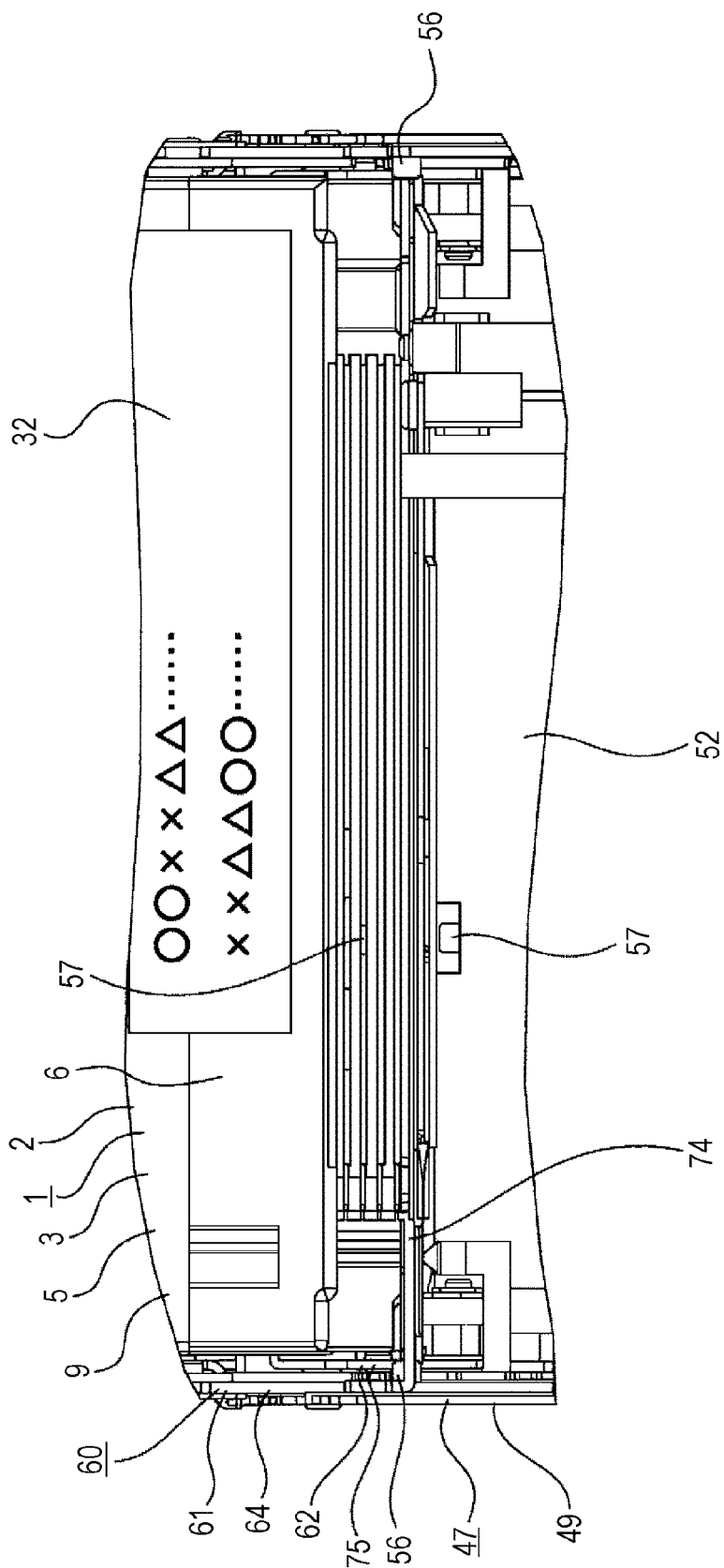
FIG. 27 is a rear view illustrating the position of an element for detection as to the disc cartridge.

With the disc holder 60, the slide pin 64a on the front side of the upper holder 61 is moved to the front edge portion of the support hole 49a in the holder cover 47, and with the lower holder 62, the slide pin 75a is moved to the front edge portion of the horizontal portion 51a of the cam support hole 51 in the holder cover 47, and to the front edge portion of the straight line portion 59a of the cam hole 59 in the slider 58 (see FIG. 26). A position where the slide pin 64a on the front side of the upper holder 61 is engaged with the front edge portion of the support hole 49a, and the slide pin 75a of the lower holder 62 is engaged with the front edge portion of the straight line portion 59a of the cam hole 59 is taken as a separation start position where separation between the upper holder 61 and lower holder 62 of the disc holder 60 is started.

When the disc holder 60 is moved to the separation start position, the entirety of the disc cartridge 1 is stored in the outer casing 41, and the cartridge insertion/ejection opening of the panel 43 is closed by the shutter 45 again.

When the disc holder 60 is moved to the separation start position, the disc holder 60 is positioned in an upward movement edge. At this time, the elements 56 for detection disposed in the side plate portions 49 of the holder cover 47 respectively are positioned in the same height as the lower face of the disc cartridge 1, for example (see FIG. 27). Upon the disc holder 60 being moved to the separation start position, the position of the lower face of the disc cartridge 1 is detected by the elements 56 for detection as the initial position in the vertical direction.

Note that, in a state in which the disc holder 60 has been moved to the separation start position, for example, the elements 56 for detection may be positioned in the same height as the lower face of the disc holder 60, and at this time, the position of the lower face of the lower holder 62 may be detected by the elements 56 for detection as the initial position in the vertical direction.

Also, an arbitrary position of the disc cartridge 1 or disc holder 60 may be detected as the initial position.

When the disc holder 60 is moved to the separation start position, information input to the information input sheet 32 adhered to the disc cartridge 1 is scanned by an unshown scanning device. Specifically, information relating to pitch between the disc-shaped recording media 100 stored in the case body 2, the number of stored disc-shaped recording media 100, and so forth are scanned by the scanning device.

Upon the disc holder 60 being moved to the separation start position, rotation of the second driving motor 86 is started, the driving force of the second driving motor 86 is propagated to the sliders 58 via the rack gears, and the sliders 58 are moved backward as to the holder cover 47. The sliders 58 are moved backward by the supported hole 58a being guided by the support protruding pins 49b of the holder cover 47.

Upon the slider 58 being moved backward, the slide pin 75a of the lower holder 62 in the disc holder 60 moves the slanting portion 59b of the cam hole 59 downward, and moves the vertical portion 51b of the cam support hole 51 in the holder cover 47 downward, and thus, the lower holder 62 is moved downward. At this time, with the disc cartridge 1, the first shell 3 is held by the unlocking pieces 65a and releasing pieces 64b of the upper holder 61, the second shell 4 is held by the holding pieces 75b of the lower holder 62, the first shell 3 is not moved downward, and the second shell 4 is moved downward integral with the lower holder 62. Consequently, the first shell 3 and the second shell 4 are separated.

Figure 28:
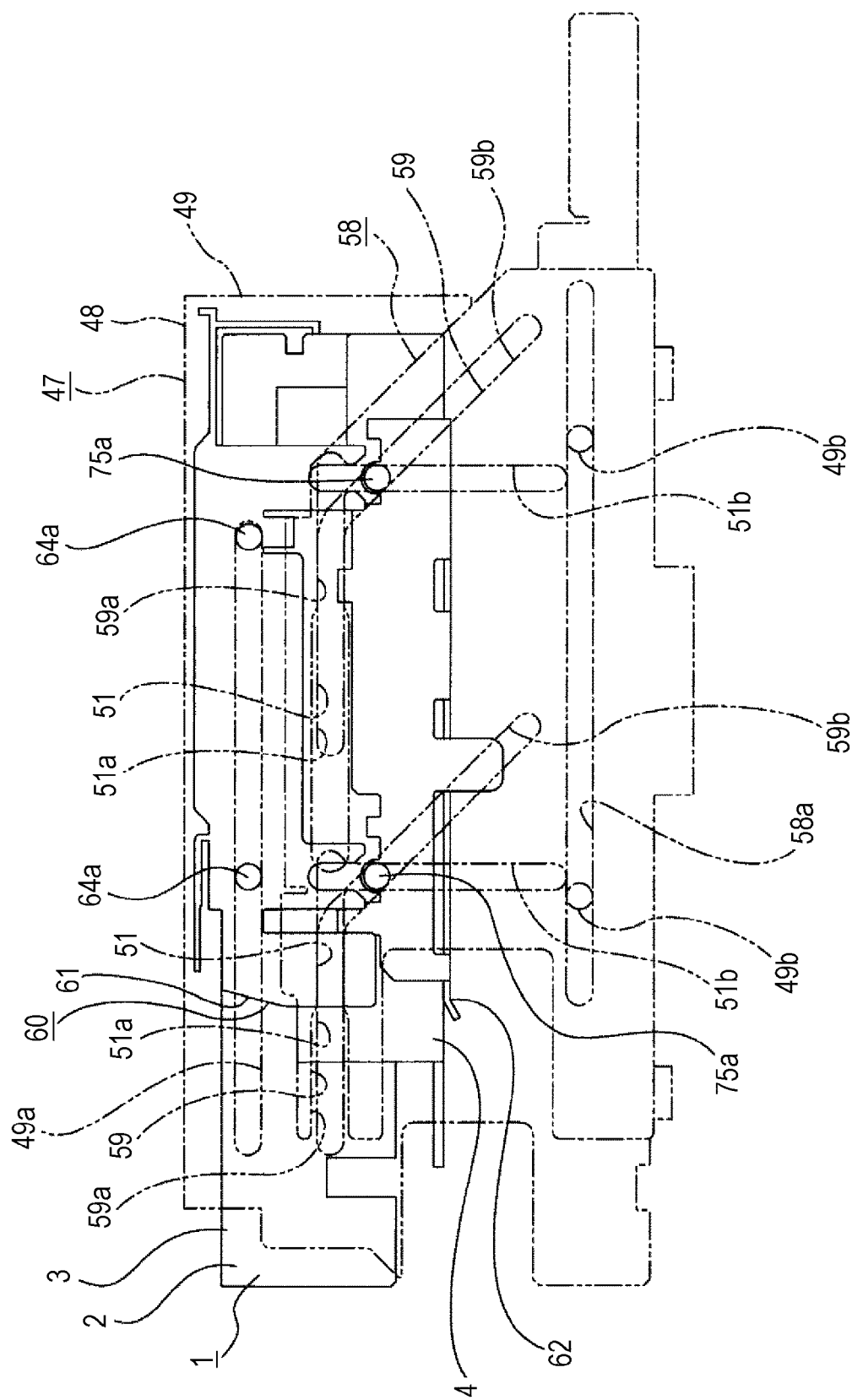
FIG. 28 is a schematic side view illustrating a state in the middle of the disc holder moving in the up-and-down direction.

Upon the slider 58 being moved backward, movement (descent) of the disc holder 60 is performed for a distance equivalent to difference between the lower face of the disc-shaped recording medium 100 held by the lowest side holding slots 29c formed in the case body 2, and the lower face of the second shell 4 (see FIG. 28).

Figure 29:
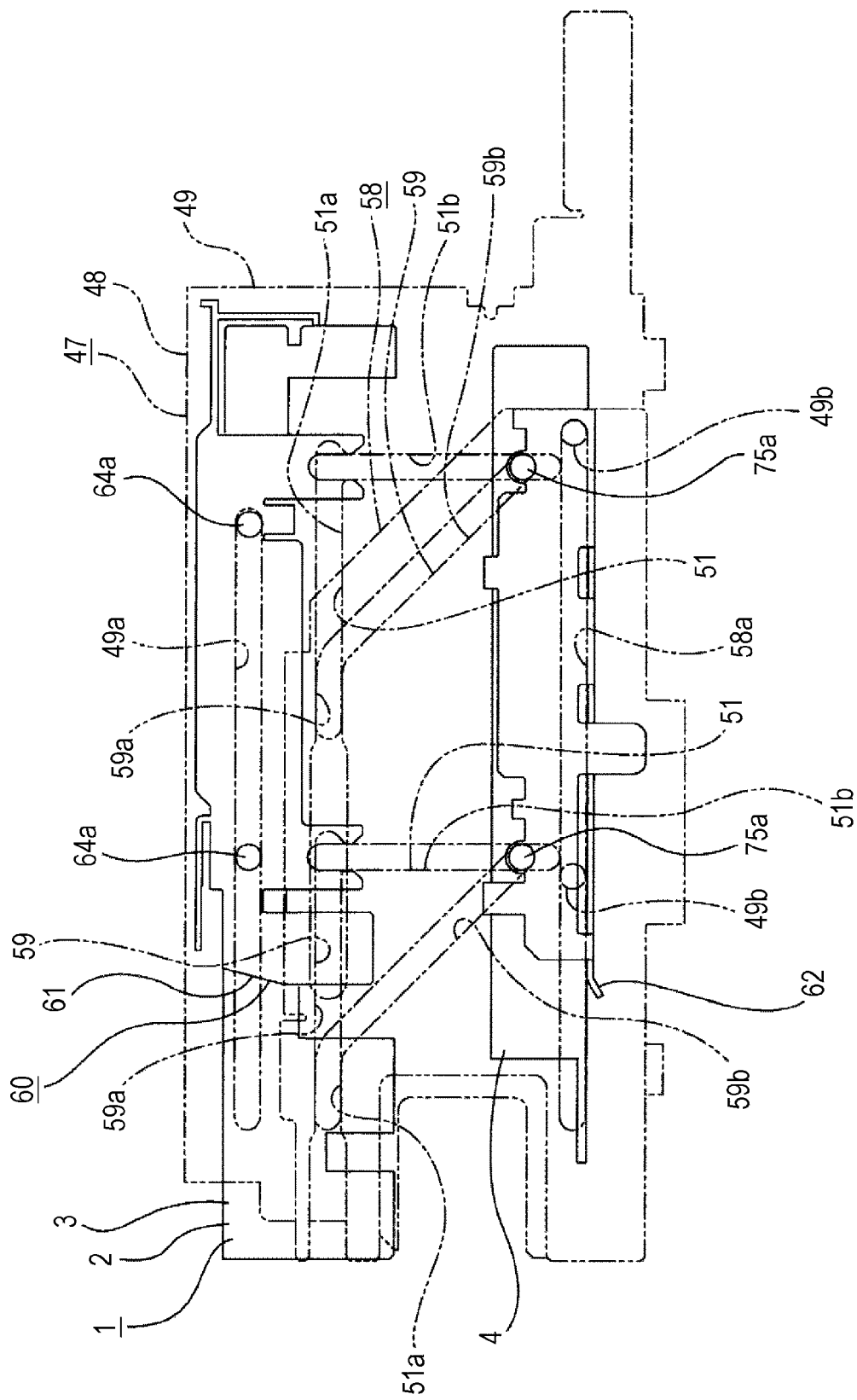
FIG. 29 is a schematic side view illustrating a state in which the disc holder is moved to a downward movement edge.

Subsequently, the slider 58 is moved backward by the driving force of the second driving motor 86, and the lower holder 62 is moved to the downward movement edge, for example (see FIG. 29). In a state in which the lower holder 62 has been moved to the downward movement edge, the slide pin 75a of the lower holder 62 is engaged with the lower edge portion of the slanting portion 59b of the cam hole 59, and the lower edge portion of the vertical portion 51b of the cam support hole 51.

Upon the lower holder 62 being moved and stopped by movement of the slider 58, rotation of the first driving motor 81 is started, and the ejection lever 78 is rotated.

Figure 30:
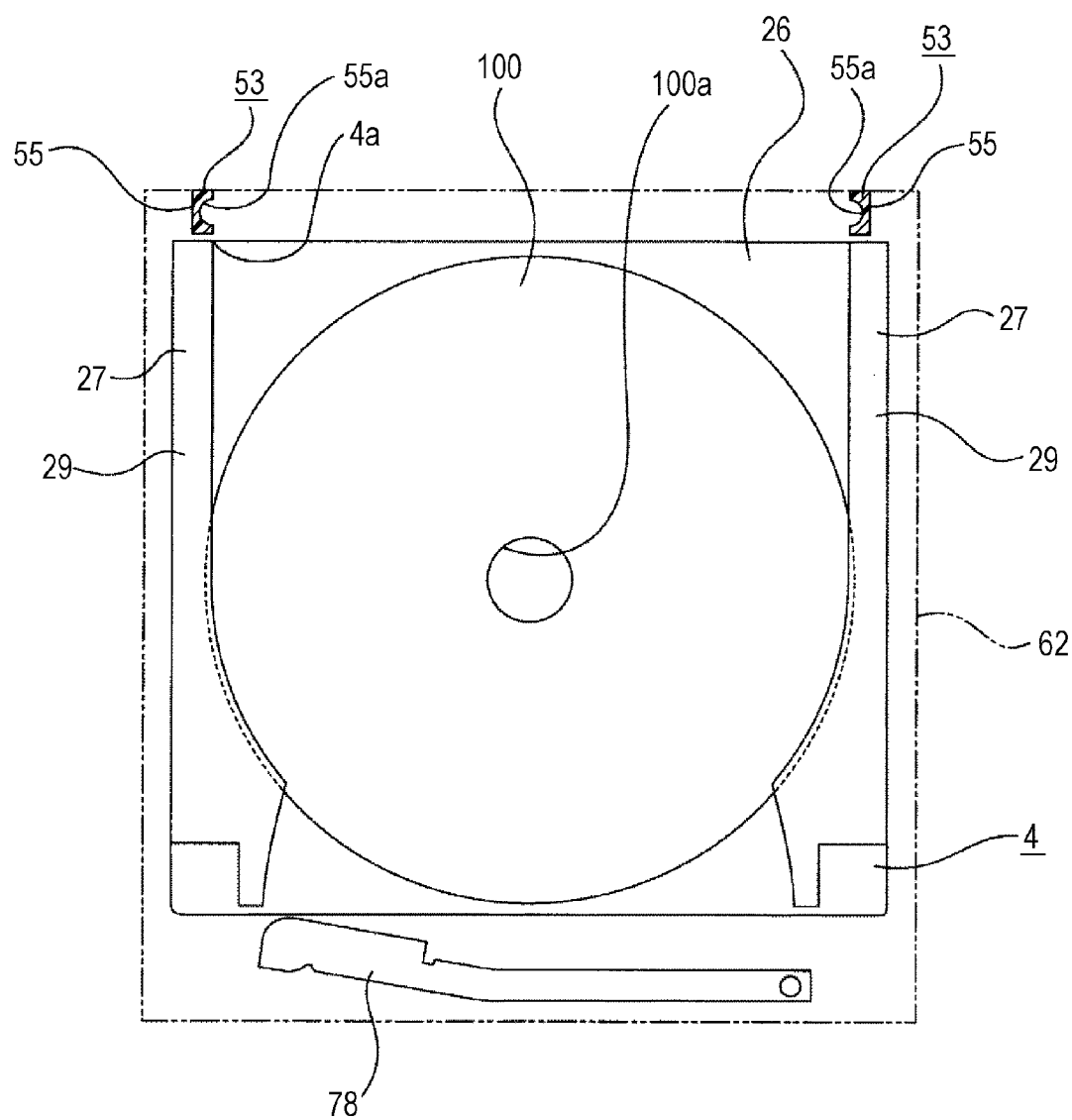
FIG. 30 is a schematic plan view illustrating a state before a disc-shaped recording medium is ejected from the second shell by an ejection lever.

The ejection lever 78 is positioned in a back slide of the second shell 4 held by the lower holder 62 during movement of the lower holder 62 (see FIG. 30).

Figure 31:
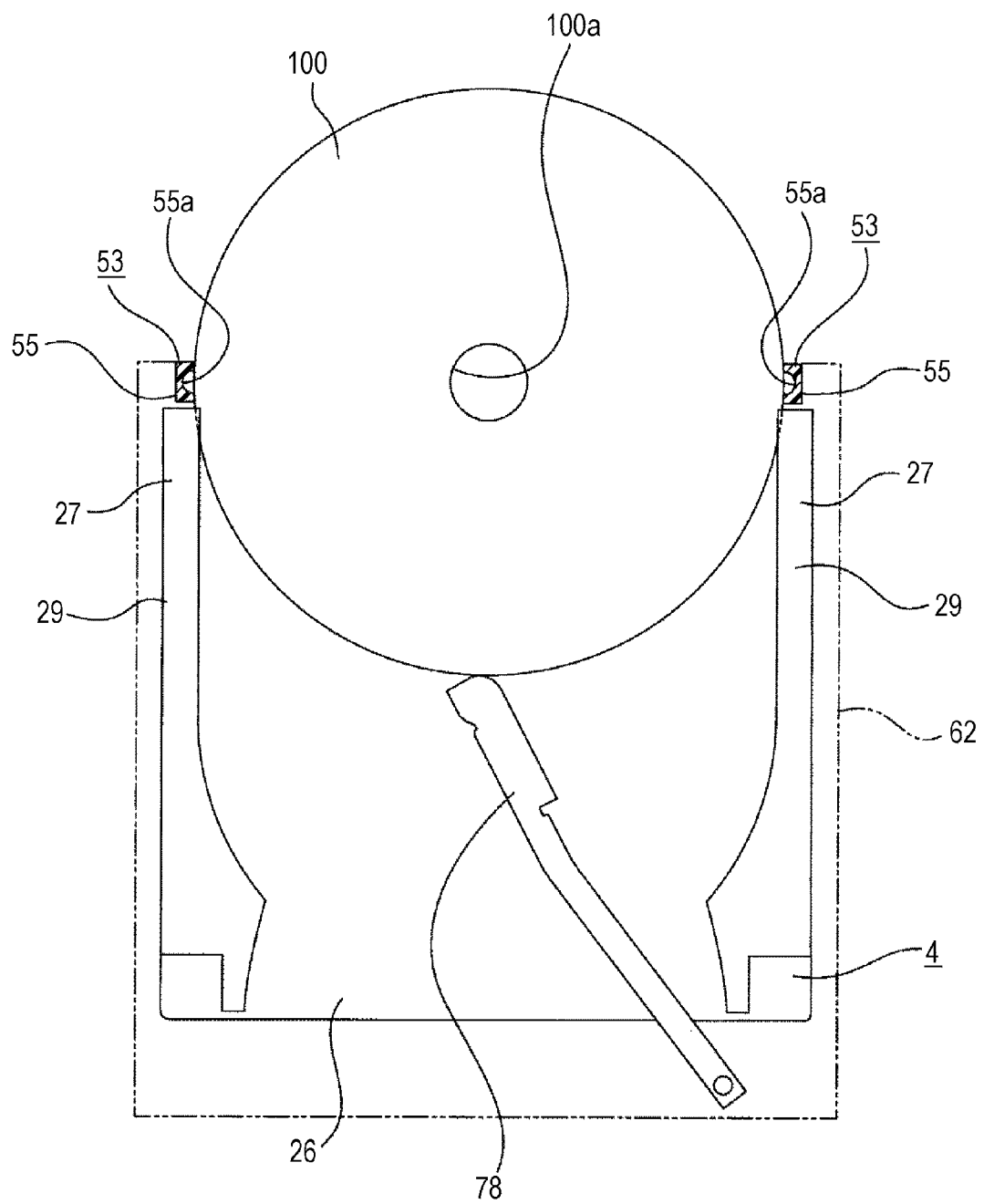
FIG. 31 is a schematic plane view illustrating a state in which the disc-shaped recording medium is ejected from the second shell by the ejection lever, and the disc-shaped recording medium is held by the holding member.

As described above, upon the ejection lever 78 being rotated, the outer face of the disc-shaped recording medium 100 existing at the height according to the stop position of the lower holder 62 is pressed forward by the ejection lever 78, and the pressed disc-shaped recording medium 100 is ejected to the drive unit 88 side from the second shell 4 (see FIG. 31). At this time, detection of the disc-shaped recording medium 100 to be ejected is performed by sensors 57 disposed on the protruding plate portion 50 and connecting member 52 in the holder cover 47.

With the disc changer 40, detection of the disc-shaped recording medium 100 to be ejected is performed by the sensors 57, and in the event that existence of the disc-shaped recording medium 100 has not been detected, the processing proceeds to the next operation.

Figure 32:
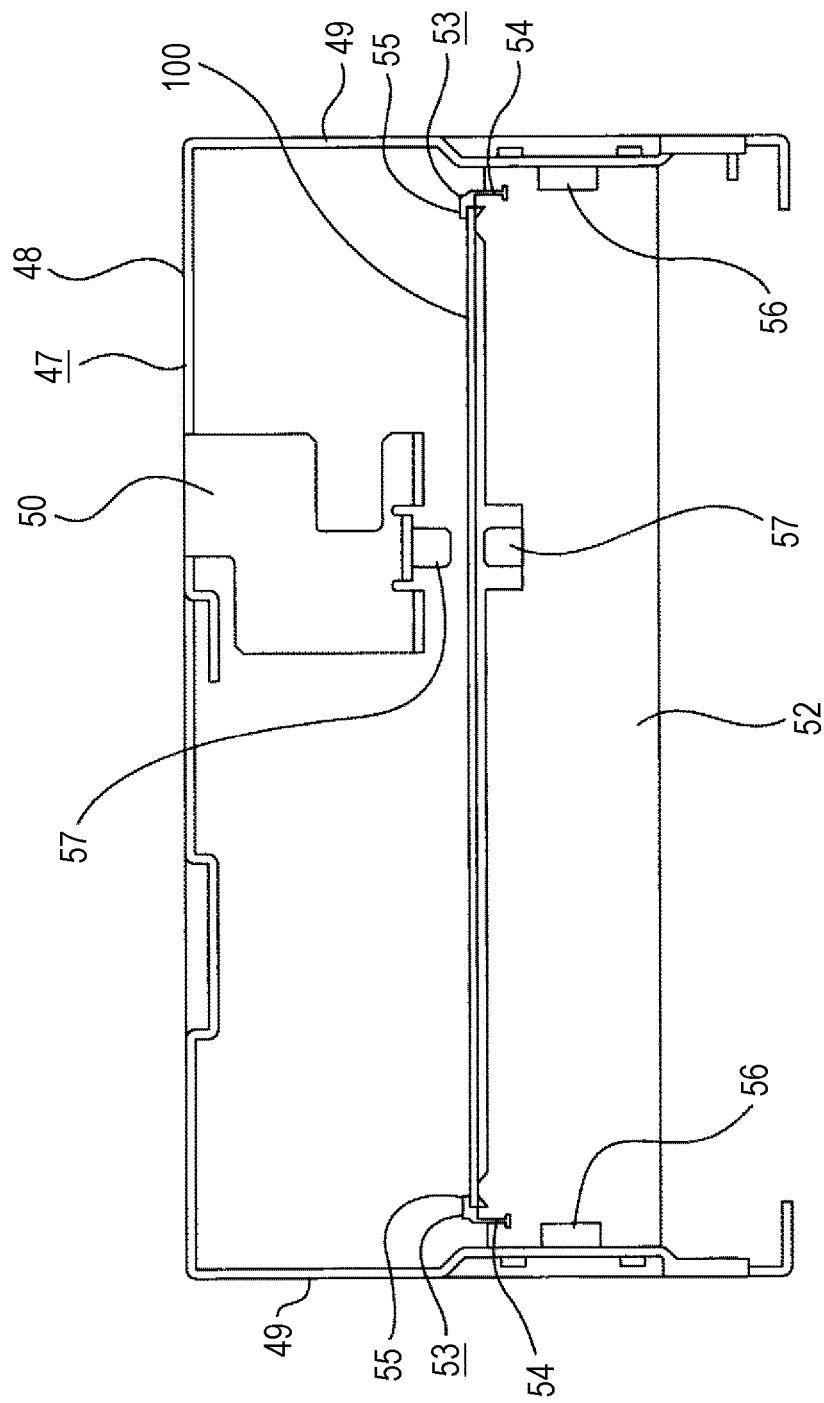
FIG. 32 is a front view illustrating a state in which the disc-shaped recording medium is ejected from the second shell by the ejection lever, and the disc-shaped recording medium is held by the holding member.
Figure 33:
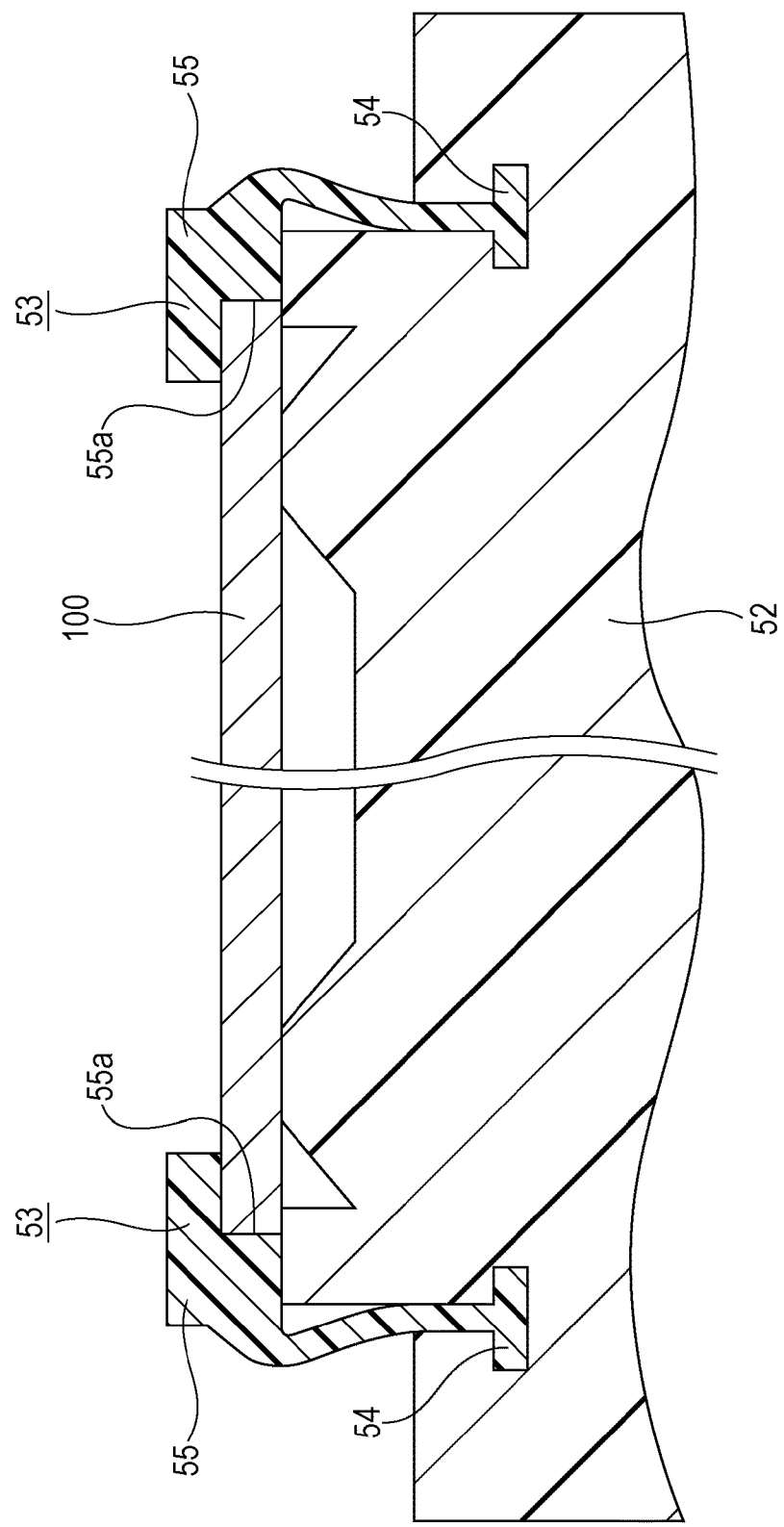
FIG. 33 is a conceptual diagram illustrating a state in which the disc-shaped recording medium is held by the holding member, and the holding member is subjected to elastic deformation.

When the disc-shaped recording medium 100 is ejected from the second shell 4 by the ejection lever 78, the disc-shaped recording medium 100 is inserted between the holding members 53, and the disc-shaped recording medium 100 is held by the holding faces 55a of the holding protruding portions 55 (see FIGS. 31 and 32). Distance between the holding members 53 is, as described above, slightly smaller than the diameter of the disc-shaped recording medium 100, and accordingly, the holding protruding portions 55 are subjected to elastic deformation in a mutually separated direction when the disc-shaped recording medium 100 is inserted between the holding members 53, and the disc-shaped recording medium 100 is held in a state sandwiched by the holding protruding portions 55 (see FIG. 33).

Figure 34:
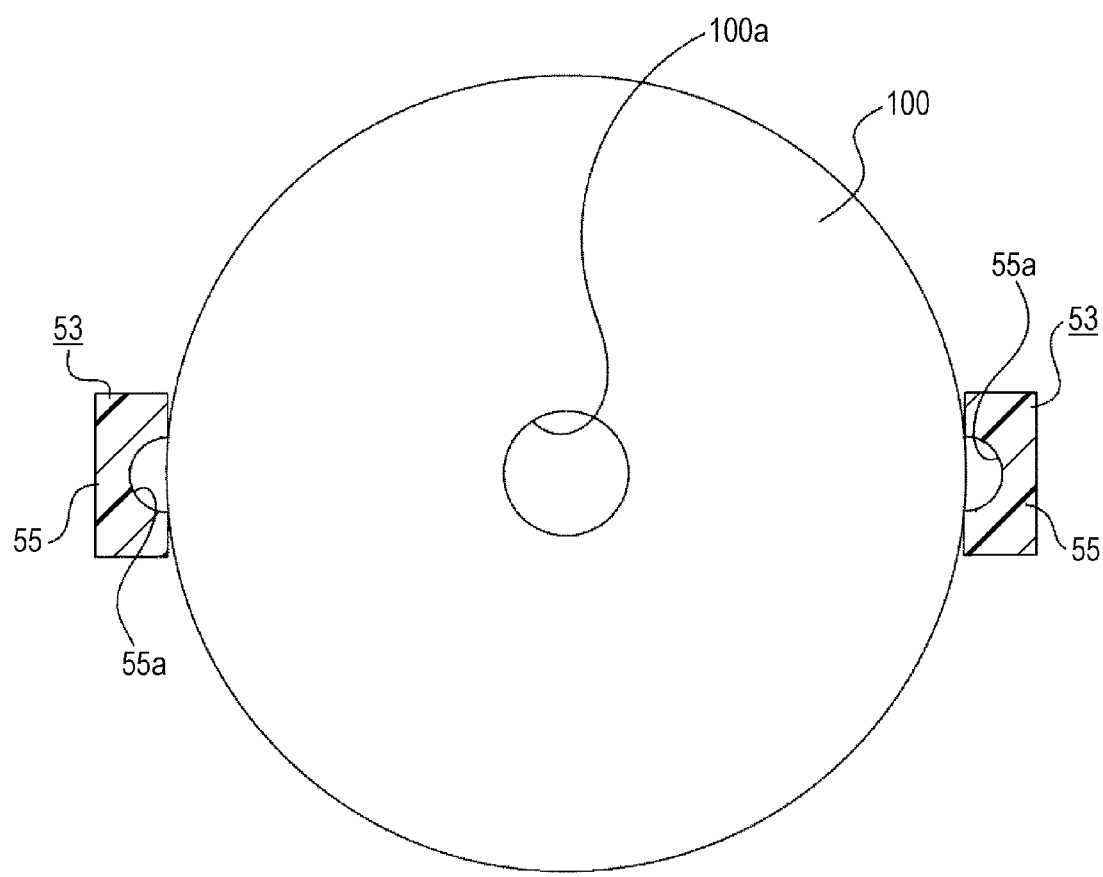
FIG. 34 is a conceptual diagram illustrating a state in which the disc-shaped recording medium is held by the holding member.
Figure 35:
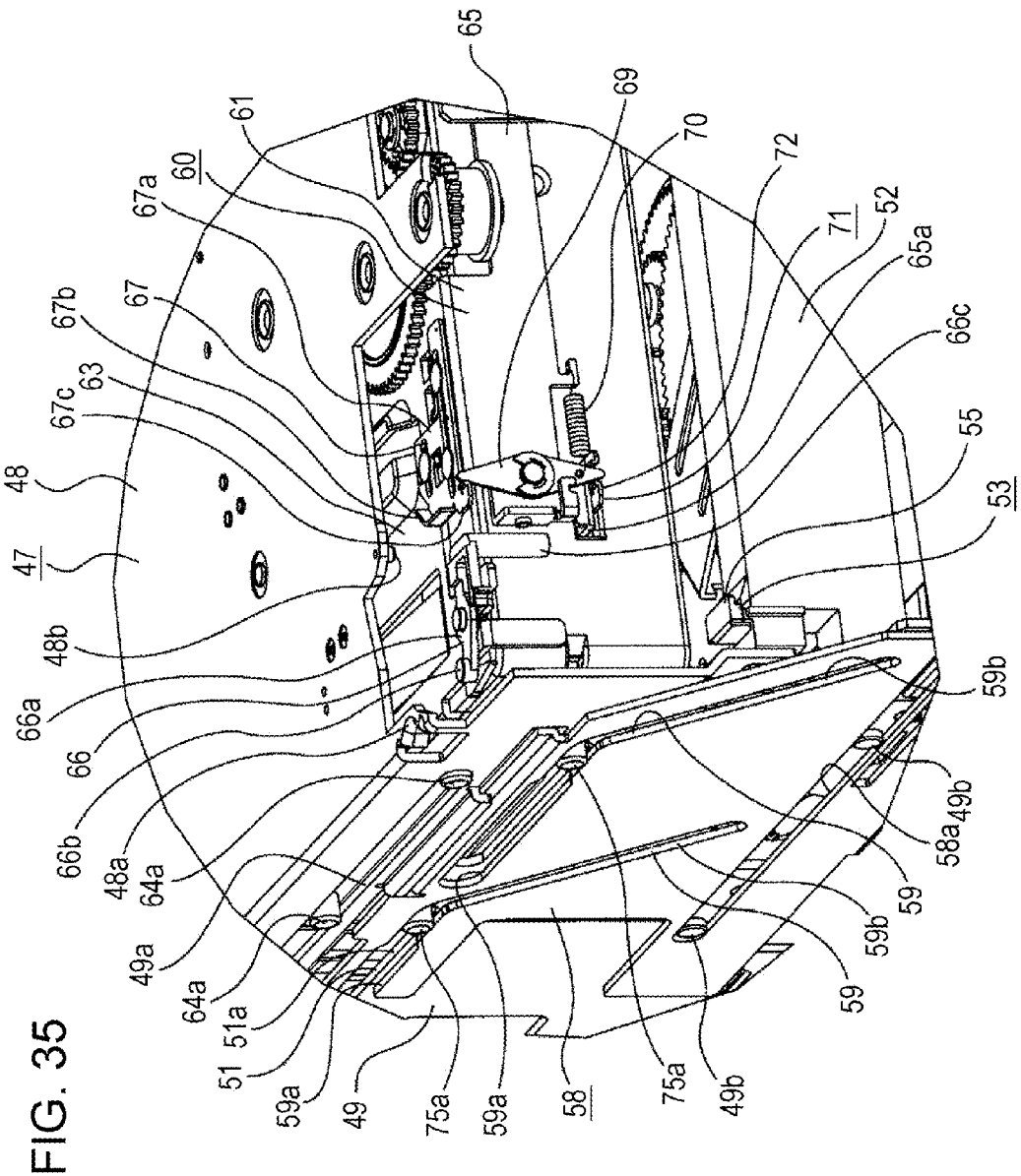
FIG. 35 is a perspective view illustrating a state in which the disc holder is positioned in a forward movement edge, during ejection operation.
Figure 36:
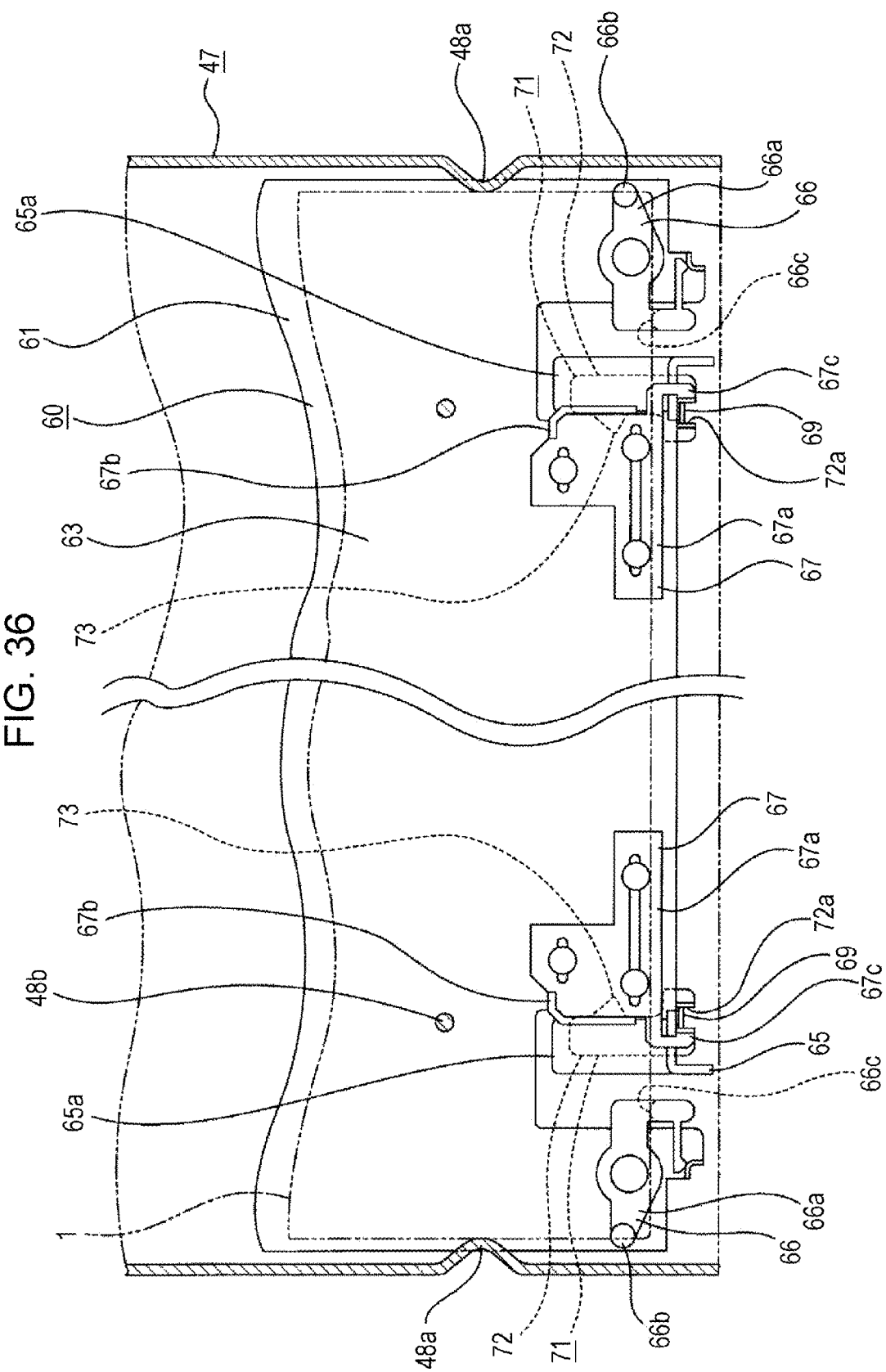
FIG. 36 is a schematic plan view illustrating a state in which the disc holder is positioned in the forward movement edge, during ejection operation.

Also, with regard to the holding faces 55a formed on the holding protruding portions 55 of the holding members 53, each of the curvatures is smaller than the curvature of the disc-shaped recording medium 100, and accordingly, the disc-shaped recording medium 100 is held in a state in which at least two portions of the holding protruding portions 55 are in contact with the outer face (see FIG. 34).

Upon the disc-shaped recording medium 100 being held by the holding members 53, the first driving motor 81 is inverted, and the ejection lever 78 is turned to the original position.

Upon the disc-shaped recording medium 100 being held by the holding members 53, the disc-shaped recording medium 100 held by the holding members 53 is ejected by an unshown disc ejection mechanism, and mounted on the drive unit 88, and recording or playback of information signals as to the disc-shaped recording medium 100 is performed.

In this way, the disc-shaped recording medium 100 ejected from the second shell 4 by the ejection lever 78 is temporarily held by the holding members 53, and accordingly, the ejection position of the disc-shaped recording medium 100 ejected from the second shell 4 becomes a fixed position, and suitability of the ejection operation of the disc-shaped recording medium 100 by the disc ejection mechanism can be realized.

Also, with the disc changer 40, pressing force of the ejection lever 78 as to the disc-shaped recording medium 100 is set smaller than the holding force of the holding members 53 as to the disc-shaped recording medium 100.

Accordingly, when the disc-shaped recording medium 100 is ejected from the second shell 4 by the ejection lever 78, the ejected disc-shaped recording medium 100 is held by the holding members 53 in a sure manner, whereby further suitability of ejection operation of the disc-shaped recording medium 100 by the disc ejection mechanism can be realized.

Note that there may be a case where the disc-shaped recording medium 100 is ejected from the second shell 4 in a direction where the disc-shaped recording medium 100 faces the horizontal direction and is mounted, depending on the type of the disc changer, but in this case, the ejected disc-shaped recording medium 100 is in a state of being easy to roll. Accordingly, as described above, there are provided the holding members 53 for holding the disc-shaped recording medium 100 ejected from the second shell 4 by the ejection lever 78, whereby suitability of the ejection operation of the disc-shaped recording medium 100 by the disc ejection mechanism can be realized by preventing rolling of the disc-shaped recording medium 100.

Also, the holding members 53 hold the disc-shaped recording medium 100 in a state subjected to elastic deformation, whereby holding of the disc-shaped recording medium 100 can be performed in an easy and sure manner.

Further, when the disc-shaped recording medium 100 is held by the holding members 53, the outer face of the disc-shaped recording medium 100 is in contact with at least two portions of the holding protruding portions 55 at a time, whereby stability of the holding state of the disc-shaped recording medium 100 by the holding members 53 can be realized.

Additionally, the holding faces 55a of the holding members 53 are formed in an arc face shape, and the curvatures of the holding faces 55a are set smaller than the curvature of the disc-shaped recording medium 100. Accordingly, the disc-shaped recording medium 100 is held by the holding members 53 in a state subjected to point contact, stability of the holding state of the disc-shaped recording medium 100 by the holding members 53 can be realized, and also damage of the outer face when holding the disc-shaped recording medium 100 can be prevented.

The disc-shaped recording medium 100 where recording or playback of information signals has been completed is ejected from the drive unit 88 by the disc ejection mechanism by the ejection button 46 disposed on the panel 43 of the outer casing 41 being operated, ejection operation is started. The disc-shaped recording medium 100 ejected by the disc ejection mechanism is held by the holding slots 29c existing in predetermined positions of the second shell 4 again.

Upon the disc-shaped recording medium 100 being held by the second shell 4, inversion of the second driving motor 86 is started, and the sliders 58 are moved forward as to the holder cover 47.

Upon the slider 58 being moved forward, the slide pin 75a of the lower holder 62 moves the slanting portion 59b of the cam hole 59 upward, moves the vertical portion 51b of the cam support hole 51 in the holder cover 47 upward, and the lower holder 62 is moved upward integral with the second shell 4.

The lower holder 62 is, for example, moved to the upward movement edge, and the second shell 4 is connected to the first shell 3 (see FIG. 26). In a state in which the lower holder 62 is moved to the upward movement edge, the slide pin 75a of the lower holder 62 is engaged with the front edge portion of the straight line portion 59a of the cam hole 59, and the upper edge portion of the vertical portion 51b of the cam support hole 51 of the holder cover 47.

In the event that the lower holder 62 has moved from the downward movement edge to the upward movement edge, the upper holder 61 is positioned in the forward movement edge. At this time, the pressure lever 66 is positioned apart in front of the cam protruding piece 48a provided to the top panel portion 48 of the holder cover 47, and the actuating lever 67 is positioned apart in front of the pressure pin 48b within the top panel portion 48 of the holder cover 47 (see FIGS. 35 and 36).

Upon the lower holder 62 being moved from the downward movement edge to the upward movement edge, and the second shell 4 being coupled with the first shell 3, the disc holder 60 is gradually moved backward integral with the disc cartridge 1 by the transport mechanism.

Figure 37:
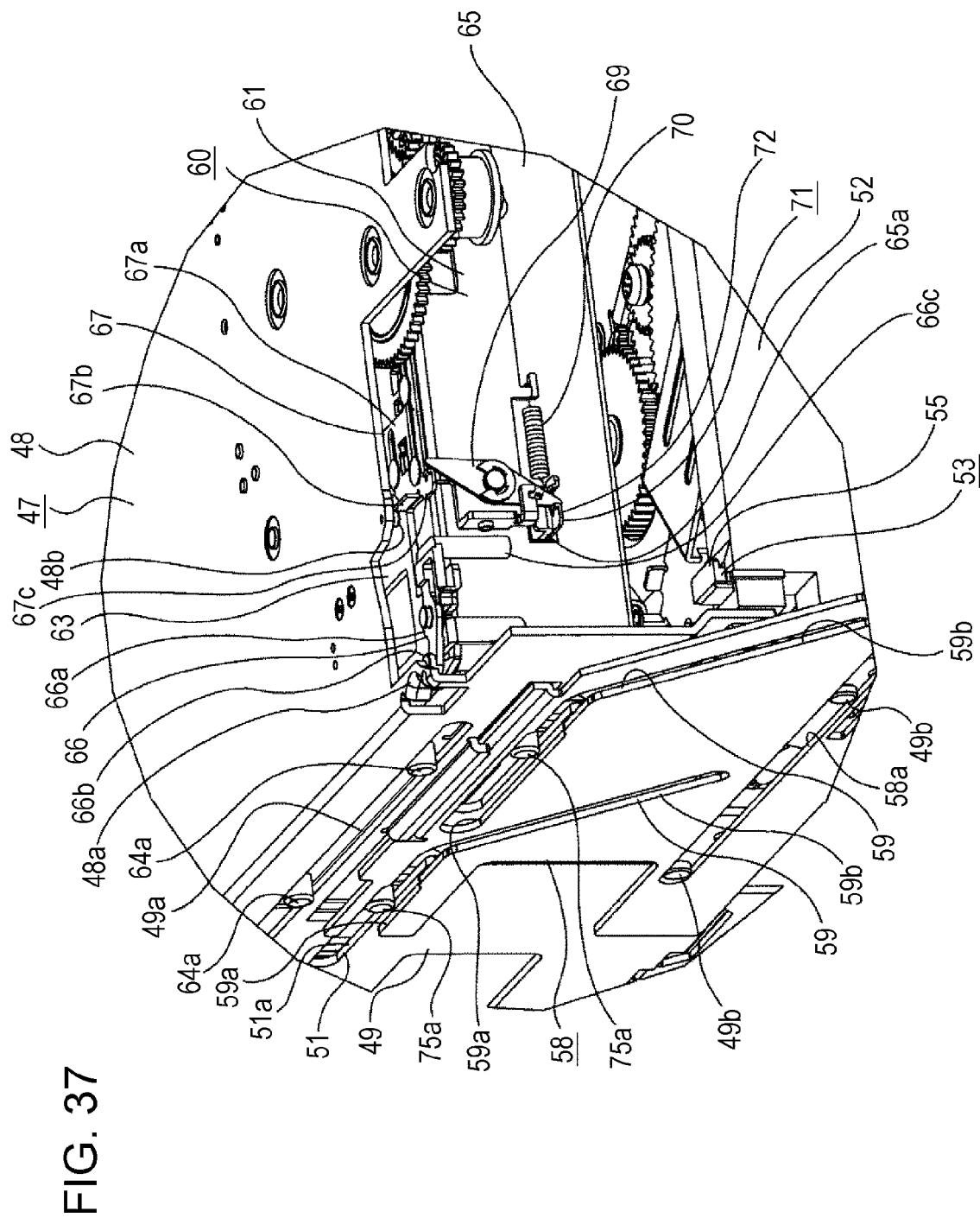
FIG. 37 is a perspective view illustrating a state in which the disc holder is moved backward, and a releasing lever is turned, during ejection operation.
Figure 38:
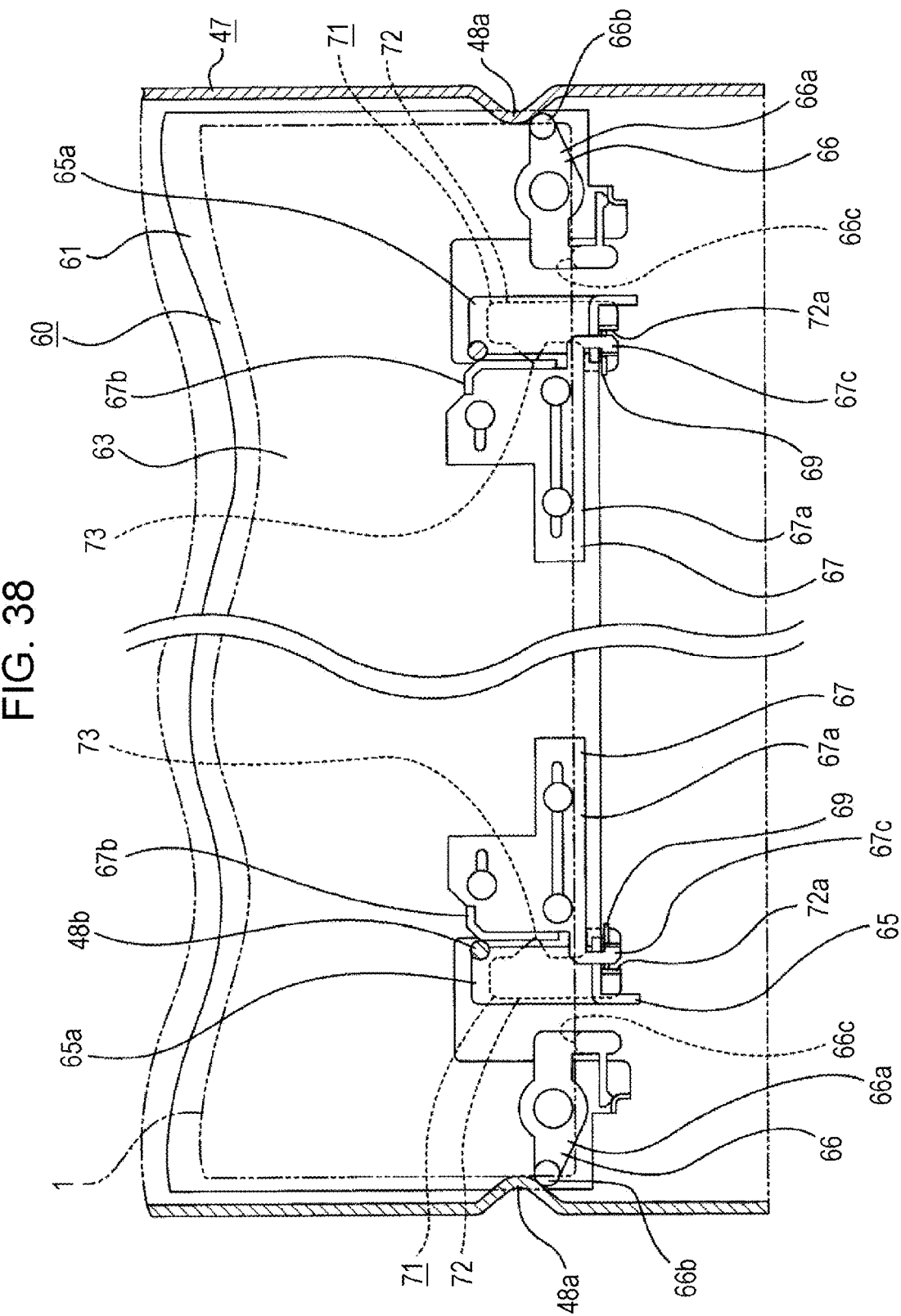
FIG. 38 is a schematic plan view illustrating a state in which the disc holder is moved backward, and an actuating lever is moved by a pressing pin, during ejection operation.
Figure 39:
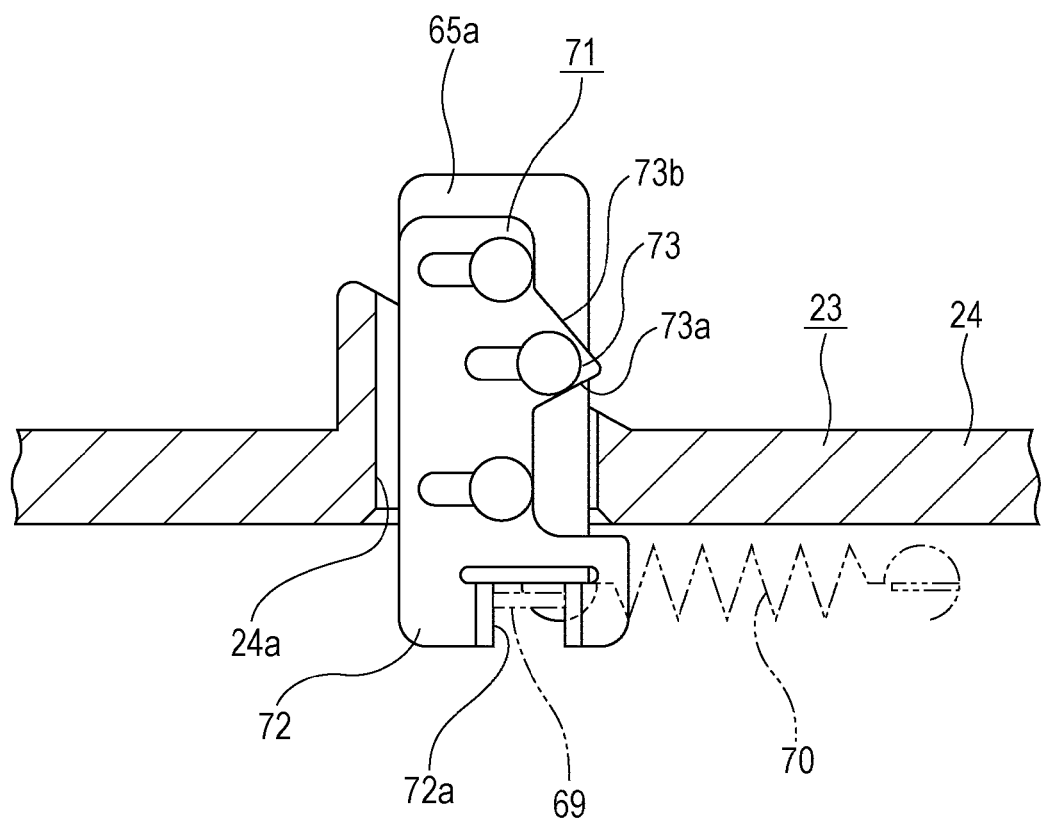
FIG. 39 is a schematic plan view illustrating a state in which the disc holder is moved backward, and restriction by the restricting lever is released, during ejection operation.

Upon the disc holder 60 being gradually moved backward integral with the disc cartridge 1, the pressure pin 48b of the holder cover 47 slidably comes into contact with the activating face portion 67b of the actuating lever 67, and the actuating lever 67 is moved inward against the pressing force of the spring 70 (see FIGS. 37 and 38). Upon the actuating lever 67 being moved inward, the upper edge portion of the releasing lever 69 being pressed by the activating protruding portion 67c of the actuating lever 67, the releasing lever 69 is turned, and the restricting lever 71 is moved outward. Accordingly, engagement of the restricting portion 73 of the restricting lever 71 as to the opening edge of the insertion hole 24a is released, and restriction for backward (extracting direction) movement of the disc cartridge 1 by the restricting lever 71 is released (see FIG. 39).

Figure 40:
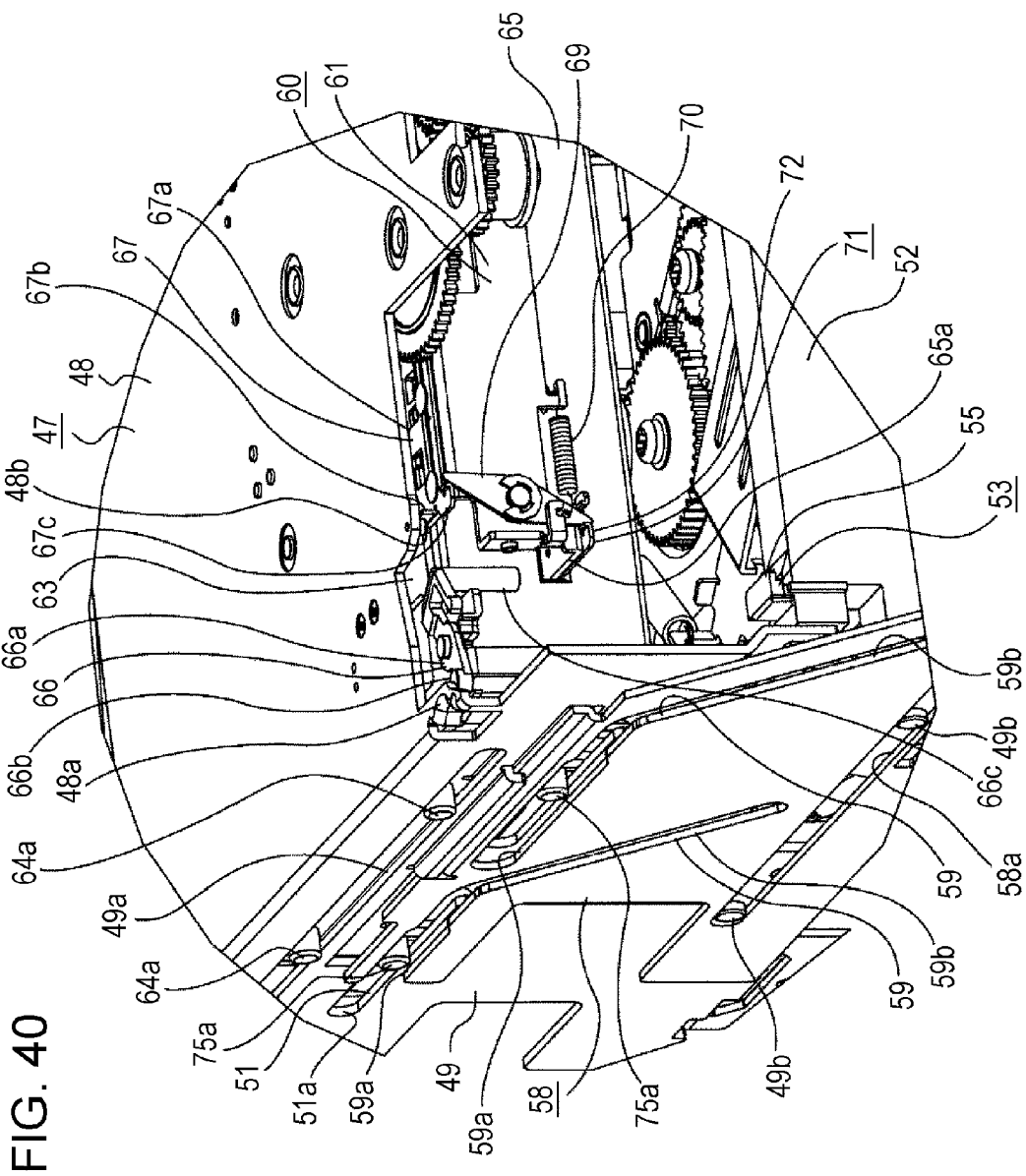
FIG. 40 is a perspective view illustrating a state in which the disc holder is moved backward, and a pressure lever is turned, during ejection operation.
Figure 41:
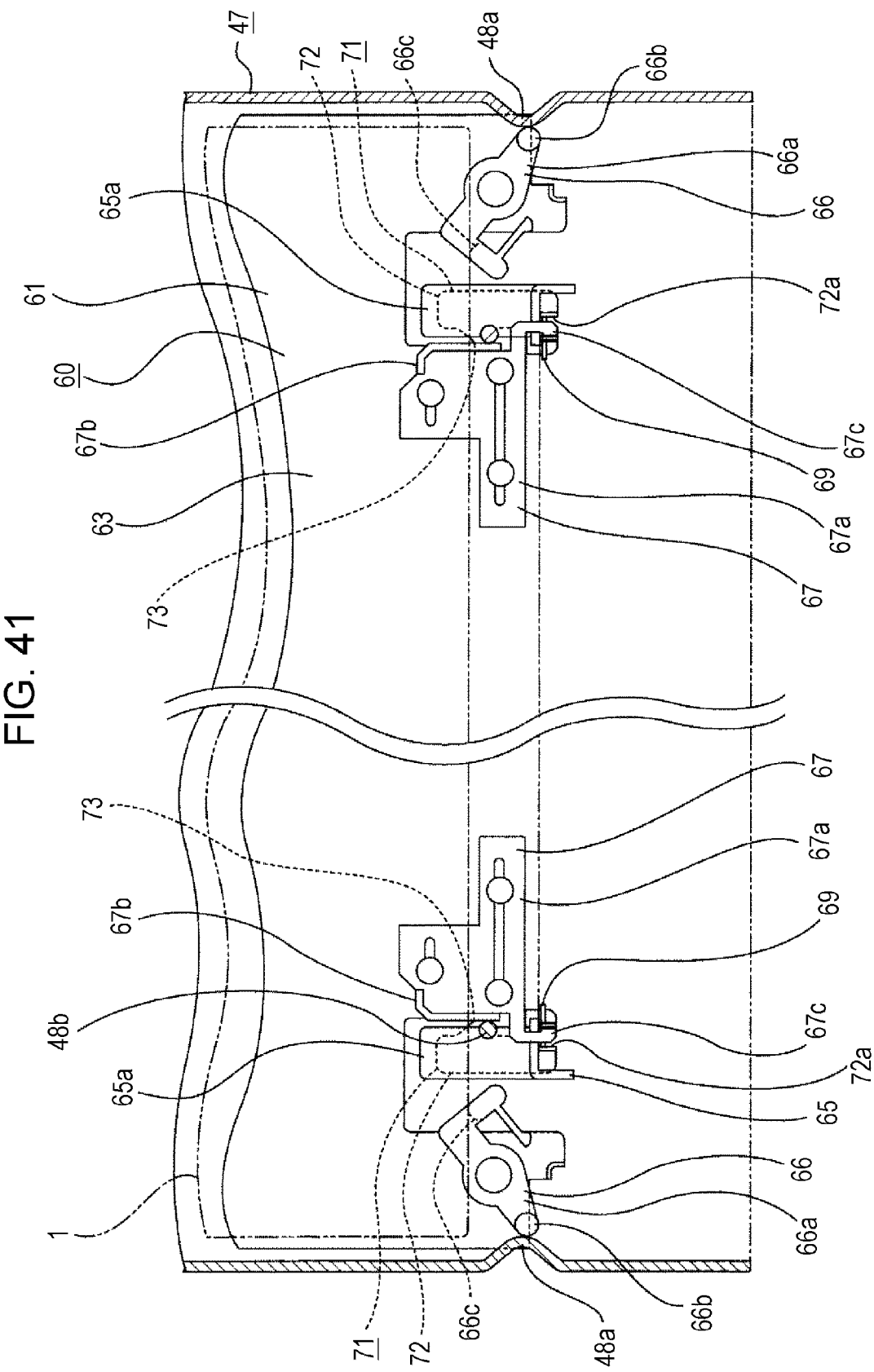
FIG. 41 is a schematic plan view illustrating a state in which the disc holder is moved backward, and the disc cartridge is pressed by the pressure lever, during ejection operation.

Subsequently, upon the disc holder 60 being moved backward integral with the disc cartridge 1, the cam protruding piece 48a of the holder cover 47 slidably comes into contact with the slide protruding portion 66b of the pressure lever 66, the pressure lever 66 is turned, and the pressure shaft portion 66c is moved generally backward (see FIGS. 40 and 41). Upon the pressure shaft portion 66c being moved generally backward according to turning of the pressure lever 66, the panel portion 24 of the case body 2 is pressed from the front by the pressure shaft portion 66c, and the disc cartridge 1 is moved backward as to the disc holder 60.

Backward movement of the disc cartridge 1 as to the disc holder 60 is smoothly performed since restriction by the restricting levers 71 is released as described above.

Upon the disc cartridge 1 being moved backward as to the disc holder 60, the unlocking pieces 65a provided to the upper holder 61 are pulled out from the insertion holes 24a of the opening/closing panel 23, respectively. Upon the unlocking pieces 65a being pulled out from the insertion holes 24a respectively, the locking lever 13 are turned by pressure force of the pressing springs 17, the locking portions 15 are inserted into and engaged with the first recessed portions 29a for locking of the second shell 4 respectively, and the first shell 3 and the second shell 4 are locked in a coupled state.

At the same time, according to backward movement of the disc cartridge 1 as to the disc holder 60, pressure as to the locking sliders 18 is released by the releasing pieces 64b provided to the upper holder 61. Upon pressure as to the locking sliders 18 being released by the releasing pieces 64b, the locking sliders 18 are moved forward by pressure force of the coil springs 22, the locking portions 20 are inserted into and engaged with the second recessed portions 29b for locking of the second shell 4 respectively, and the first shell 3 and the second shell 4 are locked in a coupled state.

As described above, with the disc changer 40, there are provided the releasing levers 69 for releasing restriction as to the disc cartridge 1 by the restricting levers 71 when the disc cartridge 1 is pulled out from the disc holder 60. Accordingly, pullout of the disc cartridge 1 from the disc holder 60 can be performed in a smooth and sure manner.

Also, with the disc changer 40, there are provided the pressure levers 66 for pressing the disc cartridge 1 in the pullout direction when restriction as to the disc cartridge 1 by the restricting levers 71 is released by the releasing levers 69.

Accordingly, the disc cartridge 1 can be pulled out from the disc holder 60 without receiving influence from the restricting levers 71, whereby pullout of the disc cartridge 1 from the disc holder 60 can be performed in a smooth and sure manner.

The disc holder 60 is moved to the backward movement edge by the transport mechanism (see FIG. 21), and the rear edge portion of the disc cartridge 1 protrudes backward from the cartridge insertion/ejection opening of the panel 43.

In a state in which the disc holder 60 has been moved to the backward movement edge, engagement between the activating face portion 67b of the actuating lever 67 and the pressure pin 48b of the holder cover 47 is released, and the actuating lever 67, releasing lever 69, and restricting lever 71 return to the initial state. Accordingly, the releasing lever 69 is positioned in a perpendicular state by the pressure force of the spring 70, the restricting lever 71 is held on the inner side movement edge, and the actuating lever 67 is moved to the outer side movement edge by the pressure force of the extension coil spring 68 (see FIG. 19).

Also, in a state in which the disc holder 60 has been moved to the backward movement edge, engagement between the slide protruding portion 66b of the pressure lever 66 and the cam protruding piece 48a of the holder cover 47 is released, and the pressure lever 66 also return to the initial state. Accordingly, the pressure lever 66 is set to a state in which the pressure shaft portion 66c is positioned in the backward side movement edge by the pressure force of the spring member (see FIG. 19).

The user is allowed to pull out the disc cartridge 1 from the disc changer 40 by gripping the rear edge portion of the disc cartridge 1 protruding backward from the cartridge insertion/ejection opening of the panel 43.

Note that pullout of the disc cartridge 1 from the disc changer 40 may also be performed by gripping and pulling out the grippers 6a formed on the case body 2 by an unshown disc gripping mechanism. Alternatively, the grippers 6a may be gripped by the disc gripping mechanism to insert the disc cartridge 1 into the disc changer 40.

With the disc changer 40, as described above, information input to the information input sheet 32 of the disc cartridge 1 is scanned by the scanning device, and movement in the vertical direction of the above-described lower holder 62 is performed based on this scanned information.

Figure 42:
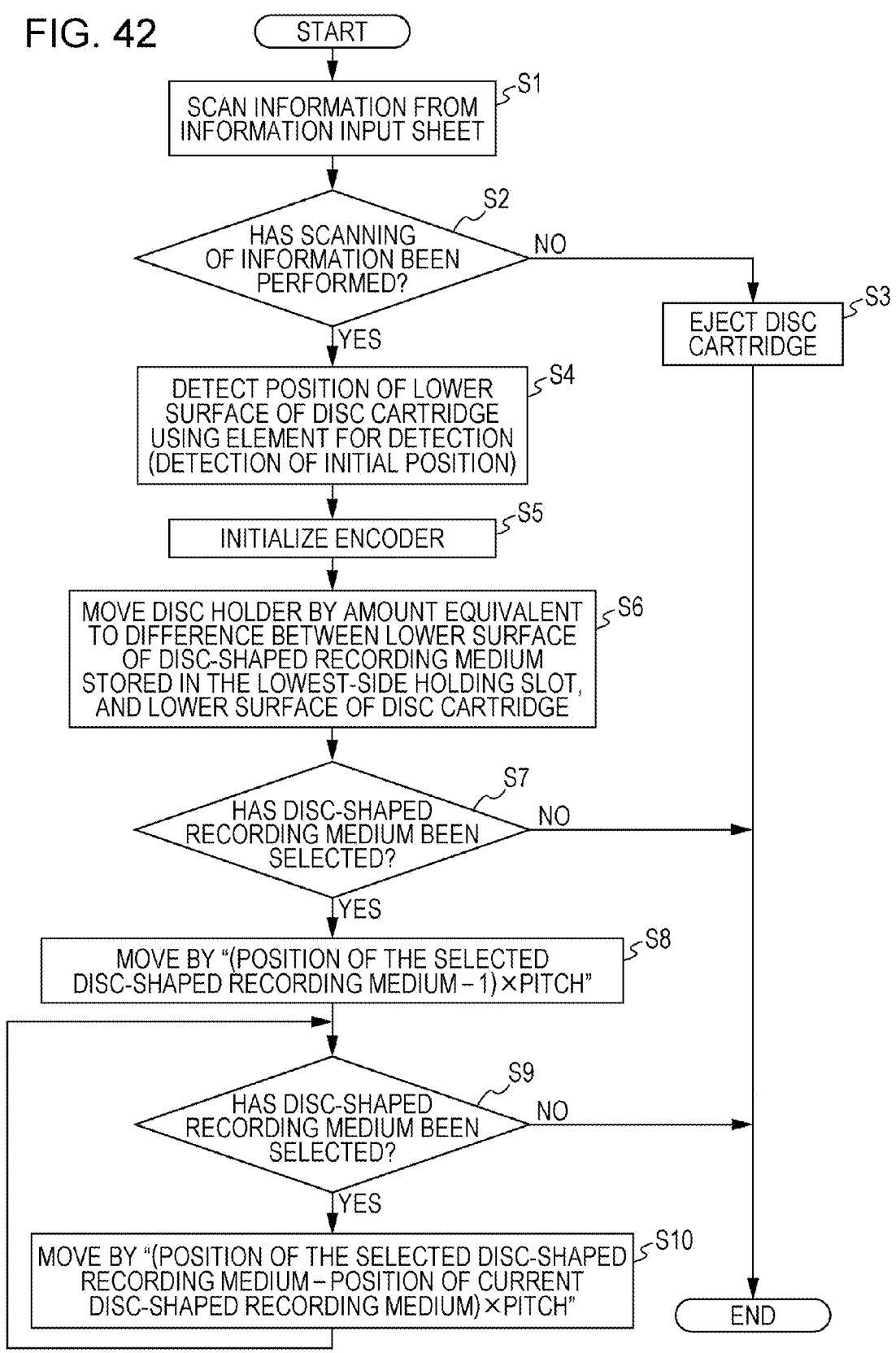
FIG. 42 is a flowchart illustrating the movement operation of the disc holder according to a movement mechanism.

Hereafter, description will be made regarding movement operation by the movement mechanism in the vertical direction of the lower holder 62 based on the information input to the information input sheet 32 (see FIG. 42).

Multiple patterns regarding relations between the number of disc-shaped recording media 100, stored in the disc cartridge 1 and the pitch between the disc-shaped recording media 100 are stored in unshown memory of the disc changer 40, and distance where the disc holder 60 is vertically moved is calculated according to the stored patterns, and the stop position of the disc holder 60 is determined.

(S1) Upon the disc cartridge 1 being inserted into the disc changer 40, as described above, information input to the information input sheet 32 adhered to the disc cartridge 1 is scanned by the scanning device. Accordingly, information regarding the pitch between the disc-shaped recording media 100 stored in the case body 2, the number of stored disc-shaped recording media 100, and so forth are scanned by the scanning device.

(S2) Detection is made regarding whether or not scanning of information has been performed by the scanning device. In the event that detection is made that scanning of information has not been performed, for example, in the event that no information is recorded in the information input sheet 32, or the like, the operation proceeds to (S3), and in the event that detection is made that scanning of information has been performed, the operation proceeds to (S4).

(S3) Ejection operation of the disc cartridge 1 is started, the disc cartridge 1 is ejected from the disc changer 40, and the operation ends.

(S4) In the event that the disc cartridge 1 has moved to the separation start position, as described above, the position of the lower face of the disc cartridge 1 is detected by the elements 56 for detection, and positional detection regarding the initial position is performed. The initial position is taken as a reference position when moving the disc holder 60 in the vertical direction, and determining the stop position of the disc holder 60.

(S5) The encoder is initialized.

(S6) Movement (descent) of the disc holder 60 is performed for a distance equivalent to difference between the lower face of the disc-shaped recording medium 100 held by the lowest side holding slots 29c formed in the case body 2, and the lower face of the second shell 4. This movement position is taken as the position of the disc-shaped recording medium 100 positioned most downward (the disc stop position of the first disc).

(S7) Detection is made regarding whether or not selection of the disc-shaped recording medium 100 to be ejected by the disc ejection mechanism has been performed. In the event that detection is made that selection of the disc-shaped recording medium 100 has not been performed, the operation ends. In the event that detection is made that selection of the disc-shaped recording medium 100 has been performed, the operation proceeds to (S8).

(S8) The disc holder 60 is moved for a distance obtained by multiplying a number obtained by subtracting 1 from the number of counts of the disc stop position of the selected disc-shaped recording medium 100 by the pitch, and is moved to a predetermined ejection position where the selected disc-shaped recording medium 100 is ejected from the disc ejection mechanism. This movement amount is calculated based on the information input to the information input sheet 32.

(S9) Detection is made regarding whether or not selection of the disc-shaped recording medium 100 to be ejected by the disc ejection mechanism has been performed. In the event that detection is made that selection of the disc-shaped recording medium 100 has not been performed, the operation ends. In the event that detection is made that selection of the disc-shaped recording medium 100 has been performed, the operation proceeds to (S10).

(S10) The disc holder 60 is moved for a distance obtained by multiplying a number obtained by subtracting the number of counts of the current disc stop position of the disc holder 60 from the number of counts of the disc stop position of the selected disc-shaped recording medium 100 by the pitch, and is moved to a predetermined ejection position where the selected disc-shaped recording medium 100 is ejected from the disc ejection mechanism. This movement amount is calculated based on the information input to the information input sheet 32.

As described above, with the disc changer 40, the stop position in the vertical direction of the disc holder 60 is determined based on the information input to the information input sheet 32.

Accordingly, the disc-shaped recording media 100 can be moved to a suitable stop position according to difference of the thickness or the number of stored disc-shaped recording media 100, and movement operation according to the type of the disc-shaped recording media 100, and the type of the disc cartridge 1 is enabled, whereby improvement in versatility can be realized.

Also, a predetermined position in the movement direction of the disc cartridge 1 or disc holder 60 is determined as the initial position in the movement direction of the disc holder 60, whereby detection of the initial position can readily be performed, and also the initial position can accurately be detected.

Further, the upper face or lower face of the disc cartridge 1 or disc holder 60 is determined as the initial position, whereby detection of the initial position can further readily be performed, and also the stop position of the disc holder 60 can accurately be calculated.

Moreover, as described above, in the event that the disc cartridge 1 has been inserted into and held at the disc holder 60, scanning of the information input to the information input sheet 32 is performed, whereby scanning of the information can be performed in the optimal position and at the optimal point-in-time.

Additionally, the information input sheet 32 adhered to the case body 2 of the disc cartridge 1 is employed as an information input mechanism, whereby scanning of the information can be performed by a simple mechanism without leading to runaway manufacturing costs.

Modification of Disc Holder

Figure 43:
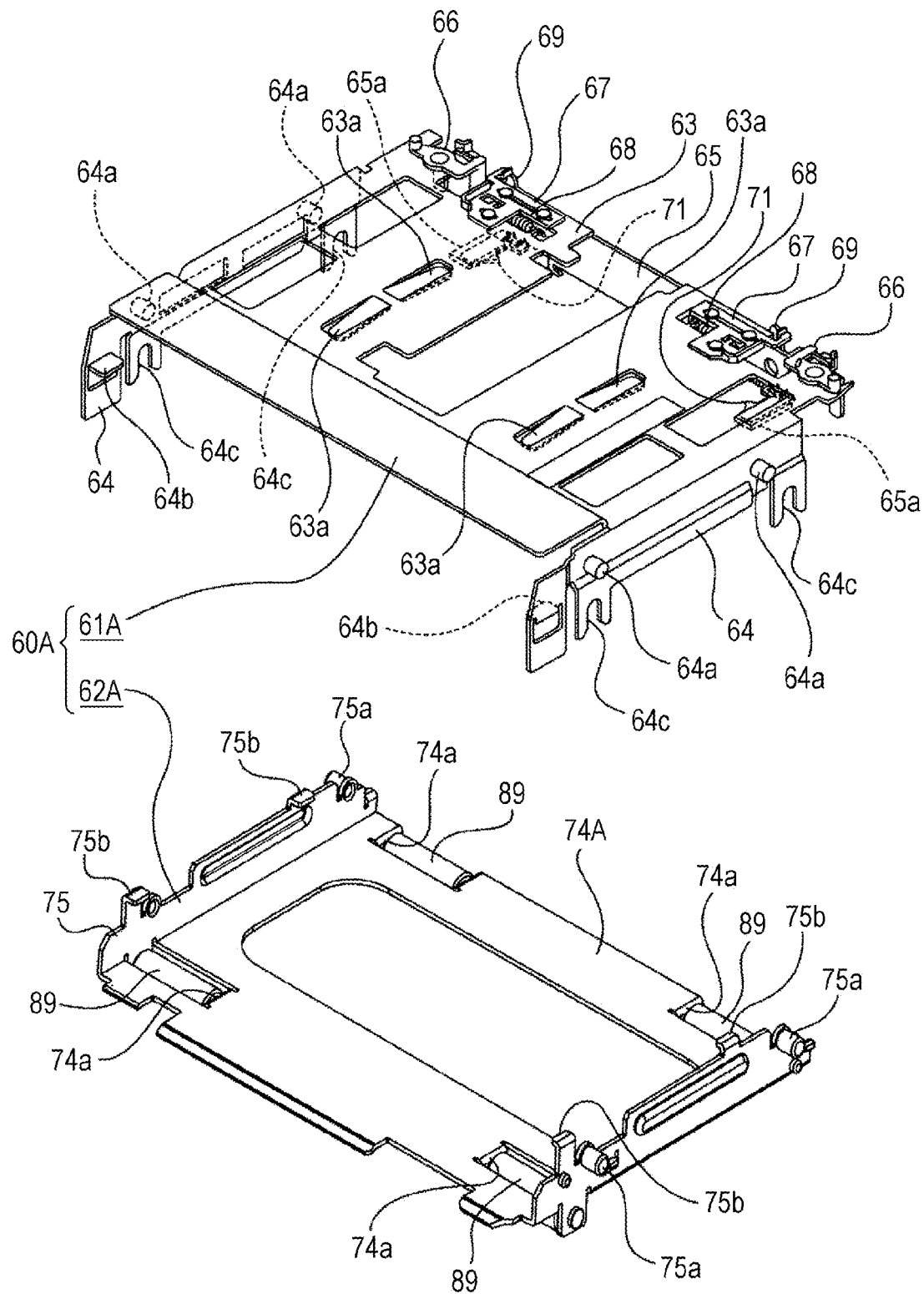
FIG. 43 is a perspective view illustrating a disc holder according to a modification.

Hereafter, a modification of the disc holder will be described (see FIG. 43).

Note that, with a disc holder according to the following modification, only a partial configuration differs from the configuration of the above disc holder 60. Accordingly, with regard to the disc holder according to the following modification, description will be made in detail only regarding a different portion as compared to the disc holder 60, and the other portions are denoted with the same reference numerals appended to the same portions in the disc holder 60, and description thereof will be omitted.

A disc holder 60A according to a modification is configured of an upper holder 61A and a lower holder 62A.

Springs 63a of which a part is formed by being folded in the downward side are provided to a top face portion 63A of the upper holder 61A, for example.

With a lower plate portion 74A of the lower holder 62A, four support holes 74a are formed in a state vertically and horizontally separated. With the lower holder 62A, rollers 89 are rotatably supported at the four support holes 74a.

The rollers 89 are each rotatable with a shaft extending in the horizontal direction as a supporting point. With the rollers 89, a part is in a state protruding upward from the upper face of the lower plate portion 74A.

In a state in which the disc cartridge 1 is inserted into the disc holder 60A, the upper face of the disc cartridge 1 is in contact with the springs 63a provided to the upper holder 61A, and the lower face of the disc cartridge 1 is pressed against the rollers 89 by the pressure force of the springs 63a. At this time, the lower face of the disc cartridge 1 is in a state separated upward from the lower plate portion 74A without contacting the lower plate portion 74A.

As described above, with the disc cartridge 1, the lower face is pressed against the rollers 89 by the pressure force of the springs 63a, and accordingly, the rollers 89 are rotated along with movement of the disc cartridge 1 at the time of movement in the forward/backward direction as to the disc holder 60A of the disc cartridge 1.

Accordingly, the disc cartridge 1 can smoothly be moved in the forward/backward direction as to the disc holder 60A.

Note that, in the event of including the restricting levers 71 like the disc changer 40, the disc cartridge 1 may be configured so as to move backward as to the disc holder 60A using the driving force of the motor in a state in which movement of the disc cartridge 1 as to the disc holder 60A is restricted by the restricting levers 71.

In the event that the disc cartridge 1 is moved in such a state, the first slanting edges 73a of the restricting levers 73 slidably come into contact with the rear side opening edges of the insertion holes 24a of the disc cartridge 1 respectively, and accordingly, that much load is placed on the motor. Also, in this case, in the event that the lower face of the disc cartridge 1 slidably comes into contact with the upper face of the lower plate portion 74A of the lower holder 62A, load as to the motor increases.

Therefore, as described above, the rollers 89 are provided to the lower plate portion 74A of the lower holder 62A to reduce frictional force between the disc cartridge 1 and the disc holder 60A, whereby smooth movement operation of the disc cartridge 1 can be secured by reducing the load of the motor. In this way, in the event that an arrangement is made wherein the disc cartridge 1 is moved using the driving force of the motor in a state in which movement of the disc cartridge 1 as to the disc holder 60A is restricted by the restricting levers 71, it is a particularly effective mechanism in light of reducing the load as to the motor to provide the rollers 89 to the disc holder 60A.

Also, the load as to the motor is reduced, whereby reduction in the size of the disc changer 1 according to reduction in the size of the motor can also be realized.

Further, at the time of movement of the disc cartridge 1 in the forward/backward direction, the disc cartridge 1 is pressed by the springs 63a, whereby the disc cartridge 1 can be in contact with the rollers 89 in a sure manner, and stability of the movement state of the disc cartridge 1 can be realized.

Note that an example has been illustrated wherein the four rollers 89 are provided to the lower plate portion 74A in a state separated forward, backward, leftward, and rightward, but with regard to the rollers 89 provided to the lower plate portion 74A, the number and positions of the rollers 89 are arbitrary as long as more than one roller 89 are provided in the movement direction (forward and backward directions) of the disc cartridge 1 in a separated manner.

Also, an example has been illustrated wherein the rollers 89 are provided to the lower plate portion 74A of the lower holder 62A, but in addition to this, multiple rollers may be provided to one of the lateral plate portions 75 sides of the lower holder 62A. In this case, it is desirable to provide a spring to one lateral plate portion 75 for pressing the disc cartridge 1 to the other lateral plate portion 75 side.

A roller is provided to one of the lateral plate portions 75 of the lower holder 62A, and thus, the roller provided to one of the lateral plate portions 75 is rotated along with movement of the disc cartridge 1, whereby the disc cartridge 1 can further smoothly be moved in the forward/backward direction as to the disc holder 60A.

The specific shape and configuration of each portion illustrated in the above preferred embodiment are only specific examples at the time of implementing the present invention, and the technical scope of the present invention should not be interpreted thereby in a restrictive manner.

The present application contains subject matter related to that disclosed in Japanese Priority Patent Application JP 2010-123334 filed in the Japan Patent Office on May 28, 2010 and Japanese Priority Patent Application JP 2010-253067 filed in the Japan Patent Office on Nov. 11, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc changer comprising:
   a disc cartridge, in which an insertion hole for unlocking is formed,
   a case body, into which said disc cartridge is inserted, said case body comprising
      a first shell and a second shell, which can be separated in an axial direction in which a plurality of disc-shaped recording media are storable by being arrayed in the axial direction of the center axis, and
      a lock lever for locking said first shell and said second shell in a connected state; and
   a disc holder configured to hold said inserted disc cartridge, including
      an unlocking piece that unlocks locking between said first shell and said second shell by being inserted into said insertion hole when said disc cartridge is inserted into said disc holder to press said lock lever, and
      a restricting lever supported by said unlocking piece, including a restricting portion that is engaged with said case body when said unlocking piece is inserted into said insertion hole, so that locking between said first shell and said second shell is unlocked, said restricting lever restricting movement in an extracting direction opposite to an insertion direction of said disc cartridge as to said disc holder.

2. The disc changer according to claim 1, wherein said restricting lever is movable as to said unlocking piece in an operating direction orthogonal to said axial direction and also orthogonal to said insertion direction;

and wherein said restricting lever is pressed to one direction in said operating direction by a spring;

and wherein the restricting portion of said restricting lever is engaged with said case body to restrict movement of said disc cartridge;

and wherein a slanting edge is formed on the restricting portion of said restricting lever, which slidably comes into contact with said case body when movement force in said extracting direction is applied to said disc cartridge in a state in which said restricting lever is inserted into said insertion hole, to allow movement in the extracting direction of said disc cartridge.

3. The disc changer according to claim 1, further comprising:

a releasing lever configured to release restriction as to said disc cartridge by said restricting lever when said disc cartridge is moved in said extracting direction as to said disc holder.

4. The disc changer according to claim 3, further comprising:

a pressure lever configured to press said disc cartridge in said extracting direction when restriction as to said disc cartridge by said restricting lever is released by said releasing lever.

5. The disc changer according to claim 1, wherein said unlocking piece and said restricting lever are configured so as to be inserted into the insertion hole of said case body.

6. The disc changer according to claim 1, wherein said unlocking piece and said restricting lever are both formed in a plate shape, and both are disposed in a state in contact in a thickness direction.

7. The disc changer according to claim 1, further comprising:

a rotatable roller, provided to said disc holder, so as to come into contact with an outer face of said disc cartridge inserted into said disc holder;

wherein said roller is rotated in a state in which said outer face of said disc cartridge is apart from the inner face of said disc holder, thereby moving said disc cartridge in said insertion direction or said extracting direction.

8. The disc changer according to claim 7, further comprising:

a spring provided to a surface facing another surface where said roller in said disc holder is provided, so as to press said disc cartridge against said roller.

* * * * *